(12) United States Patent
Murphy, Jr.

(10) Patent No.: US 11,155,416 B2
(45) Date of Patent: Oct. 26, 2021

(54) CONVEYOR BELT MONITORING SYSTEM AND METHOD

(71) Applicant: RCS TECHNOLOGIES LLC, Lombard, IL (US)

(72) Inventor: Donald Greene Murphy, Jr., Lake Barrington, IL (US)

(73) Assignee: RCS TECHNOLOGIES LLC, Lombard, IL (US)

( * ) Notice: Subject to any disclaimer, the term of this patent is extended or adjusted under 35 U.S.C. 154(b) by 0 days.

(21) Appl. No.: 16/869,085

(22) Filed: May 7, 2020

(65) Prior Publication Data

US 2020/0354149 A1 Nov. 12, 2020

Related U.S. Application Data

(60) Provisional application No. 62/844,969, filed on May 8, 2019, provisional application No. 62/970,582, filed on Feb. 5, 2020.

(51) Int. Cl.
*B65G 15/64* (2006.01)
*B65G 15/54* (2006.01)
*B65G 39/16* (2006.01)

(52) U.S. Cl.
CPC ............. *B65G 15/64* (2013.01); *B65G 15/54* (2013.01); *B65G 39/16* (2013.01); *B65G 2203/0283* (2013.01); *B65G 2203/042* (2013.01)

(58) Field of Classification Search
CPC ...... B65G 15/54; B65G 15/64; B65G 17/062; B65G 17/064; B65G 39/16; B65G 2203/042; B65G 2203/0283

USPC ............................ 198/806, 807, 810.03, 848
See application file for complete search history.

(56) References Cited

U.S. PATENT DOCUMENTS

| | | | | |
|---|---|---|---|---|
| 3,263,799 A * | 8/1966 | Bascom | ................ | B65G 17/08 198/848 |
| 6,852,050 B2 * | 2/2005 | Sands | .................... | B65G 39/16 198/810.03 |
| 7,131,529 B2 * | 11/2006 | Meade | .................... | B65G 23/44 198/810.03 |
| 7,815,039 B2 * | 10/2010 | Enomoto | ............... | B65H 5/224 198/806 |
| 8,857,602 B2 * | 10/2014 | Clevers | .................. | B65G 15/64 198/807 |
| 10,280,008 B2 * | 5/2019 | von Pohle | ............. | B65G 39/16 |
| 10,815,066 B2 * | 10/2020 | Carniato | ................ | B65G 39/16 |
| 2017/0069074 A1 * | 3/2017 | Milis | ...................... | B65G 23/44 |

\* cited by examiner

*Primary Examiner* — Gene O Crawford
*Assistant Examiner* — Keith R Campbell
(74) *Attorney, Agent, or Firm* — Knobbe, Martens, Olson & Bear, LLP

(57) ABSTRACT

A conveyor belt monitoring system may utilize one or more ultrasonic sensors to identify variations in the position of the conveyor belt. These variations may be minor variations in belt position, which can be identified by the belt monitoring system well before they would be readily perceptible by a user. The monitoring system may be operated in conjunction with one or more belt adjustment mechanisms which can be used to correct the path of the conveyor belt based on information gathered by the monitoring system.

24 Claims, 40 Drawing Sheets

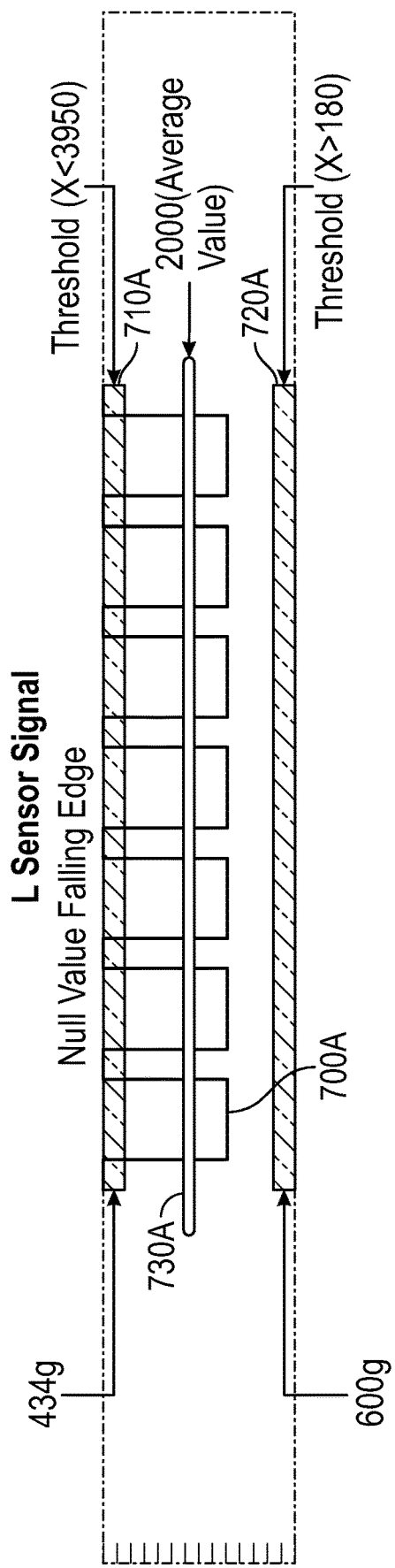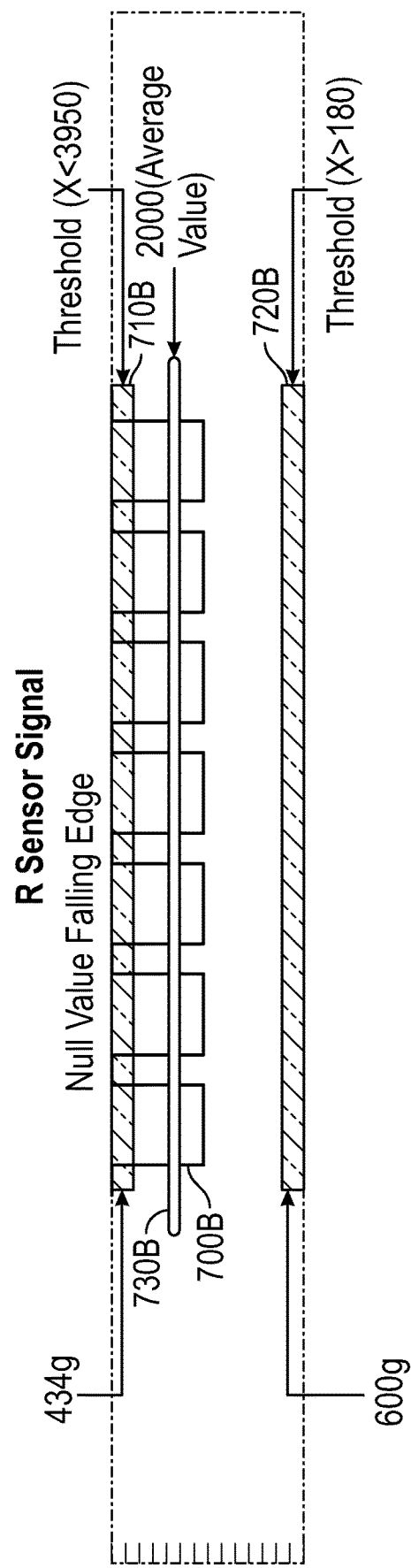

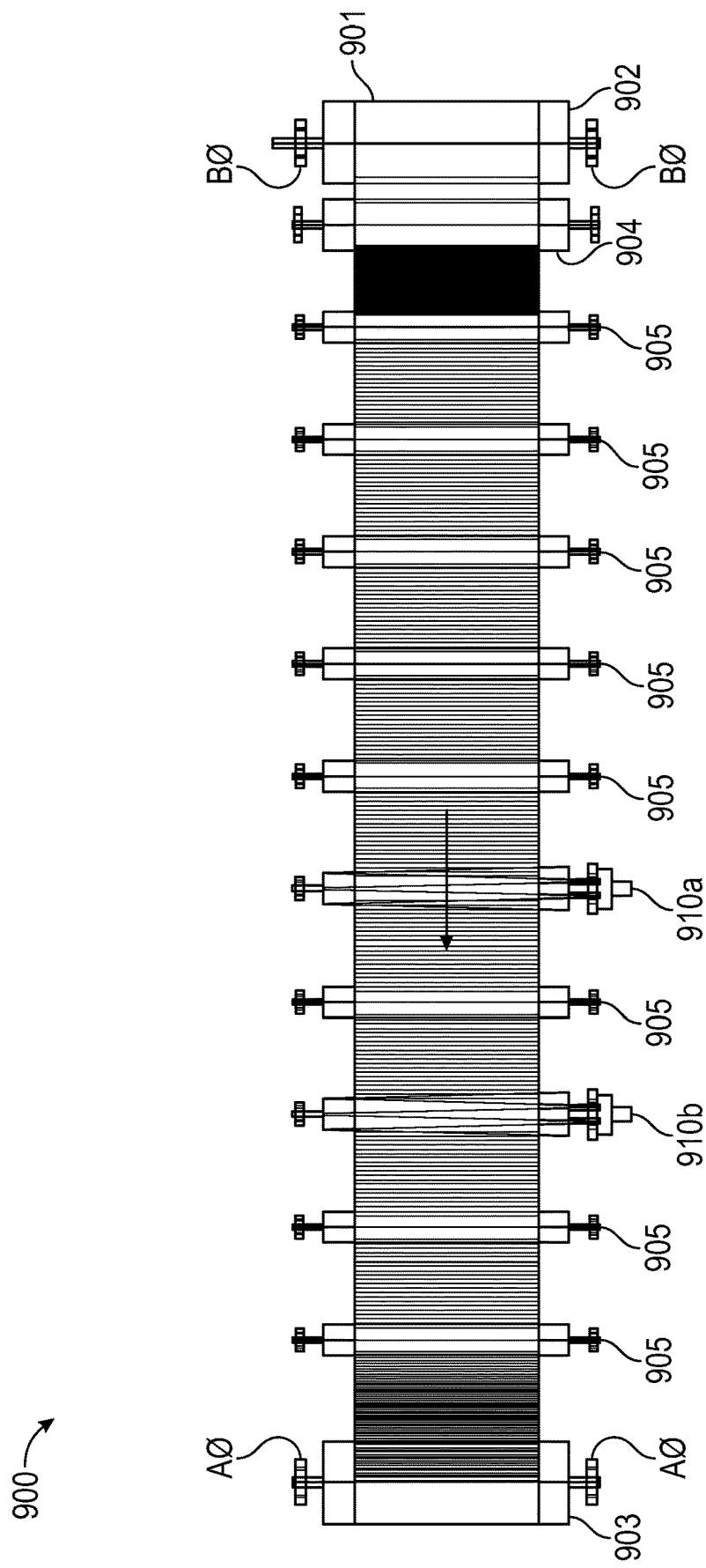

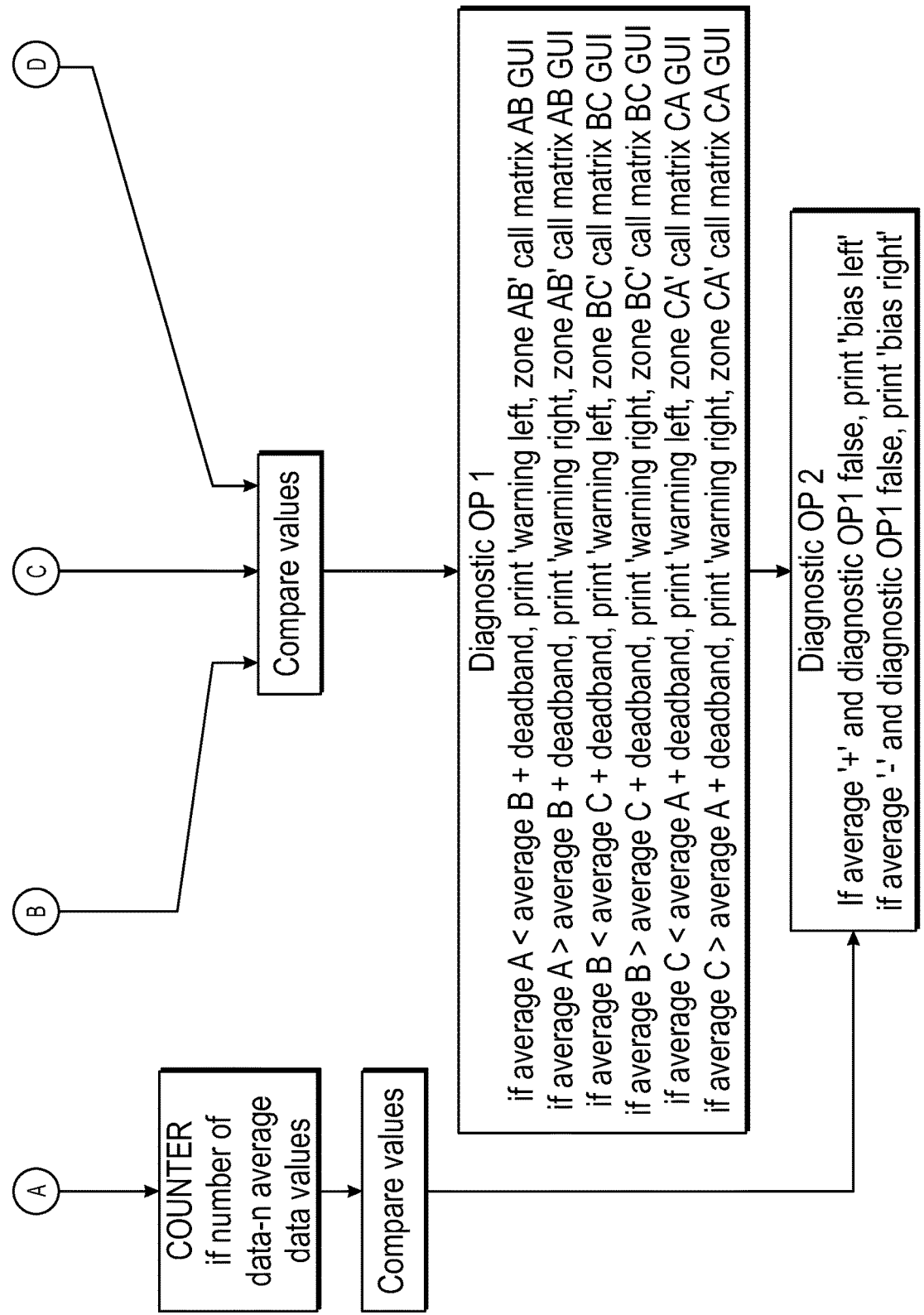

CONVEYOR BELT MONITORING SYSTEM AND METHOD

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Application No. 62/844,969, filed May 8, 2019 and entitled MONITORING SYSTEM AND METHOD FOR WOVEN WIRE CONVEYOR BELT, and claims the benefit of U.S. Provisional Application No. 62/970,582, filed Feb. 5, 2020 and entitled MONITORING SYSTEM AND METHOD FOR WOVEN WIRE CONVEYOR BELT. The disclosure of each of these applications is hereby incorporated by reference in its entirety.

BACKGROUND

Technical Field

Embodiments described herein relate to monitoring systems for conveyor belts.

Description of Related Technology

Many modern conveyor systems utilize balance-weave metal belts. These belts exhibit a symmetrical wire looping geometry that alternates in a spiral fashion along the lengths of individual connecting rods disposed perpendicularly to the centerline of the belt at regular intervals along the length of the belt. Despite the improvement in tracking stability observed in conveyor systems outfitted with balance-weave belts in lieu of uniformly looped belts, however, belt mistracking still occurs in such systems.

SUMMARY

In one aspect, a monitored conveyor belt system is provided, including a balance-weave conveyor belt including a first plurality of wire spirals wound in a first direction alternating along the length of the belt with a second plurality of wire spirals wound in a second direction, an ultrasonic sensor positioned adjacent a lateral edge of the belt at an oblique angle to the lateral edge of the belt, the ultrasonic sensor configured to emit ultrasonic energy towards the lateral edge of the belt, sense reflected ultrasonic energy reflected by the lateral edges of the first and second plurality of wire spirals, and generate a first output signal indicative of the reflected ultrasonic energy sensed by the ultrasonic sensor, and a belt adjustment mechanism operably coupled to the belt and configured to alter a path of the belt based at least in part on the first output signal generated by the ultrasonic sensor.

The system can further include a controller in communication with the ultrasonic sensor and the belt adjustment mechanism, the controller configured to receive the first output signal generated by the ultrasonic sensor and send a control signal to the belt adjustment mechanism. The controller can be further configured to determine a position of the belt based at least in part on the first output signal. The controller can also be further configured to determine a position of the belt based on a comparison between the first output signal and a second output signal generated by a second ultrasonic sensor positioned adjacent the other lateral edge of the belt at a location opposite the first ultrasonic sensor. The controller can also be configured to determine a position of the belt based on a comparison between the first output signal and a predetermined setpoint.

The system can further include a second ultrasonic sensor positioned adjacent the other lateral edge of the belt at a location opposite the first ultrasonic sensor, the second ultrasonic sensor configured to emit ultrasonic energy towards the other lateral edge of the belt, sense reflected ultrasonic energy reflected by the lateral edges of the first and second plurality of wire spirals, and generate a second output signal indicative of the reflected ultrasonic energy sensed by the second ultrasonic sensor, The first ultrasonic sensor can be oriented at a first oblique angle to the lateral edges of the belt, and the second ultrasonic sensor can be oriented at a second oblique angle to the lateral edges of the belt, the absolute values of the first and second oblique angles being equal.

The first ultrasonic sensor can be oriented at an angle substantially perpendicular to wire edges of the first plurality of wire spirals. The first ultrasonic sensor can include a targeting laser diode aligned with an ultrasonic transducer of the ultrasonic sensor to facilitate the targeting of the emitted ultrasonic energy at a specific set of wire edges of the first plurality of wire spirals.

The first ultrasonic sensor can include a plurality of field restrictor shields configured to constrain the field of ultrasonic energy emitted towards the lateral edge of the belt. The constrained field of ultrasonic energy can impinge the conveyor belt only in an area immediately adjacent the lateral edge of the belt.

In another aspect, a control system configured to monitor the position of a balance-weave conveyor belt is provided, the control system including a processor and a memory, the control system configured to receive a first sensor signal from an ultrasonic sensor positioned adjacent a lateral edge of the belt and oriented at an oblique angle to the lateral edge of the belt, the ultrasonic sensor configured to emit ultrasonic energy towards a lateral edge of a balance-weave conveyor belt, sense reflected ultrasonic energy reflected by the belt, and generate the first sensor signal indicative of the reflected ultrasonic energy sensed by the ultrasonic sensor, and determine, based at least in part on the first sensor signal, an indication of the position of the conveyor belt.

The control system can be further configured to send a control signal to a belt adjustment mechanism operably coupled to the belt and configured to alter a path of the belt. The control signal can be configured to result in the belt adjustment mechanism redirecting the path of the belt towards a desired path of the belt.

The control system can be further configured to receive a second sensor signal from an ultrasonic sensor positioned adjacent the other lateral edge of the belt at a location opposite the first ultrasonic sensor and configured to emit ultrasonic energy towards the opposite lateral edge of the belt, sense reflected ultrasonic energy reflected by the belt, and generate the second sensor signal indicative of the reflected ultrasonic energy sensed by the ultrasonic sensor. The control system can be configured to determine the indication of the position of the belt based on a comparison between the first sensor signal and the second sensor signal generated by a second ultrasonic sensor positioned adjacent the other lateral edge of the belt at a location opposite the first ultrasonic sensor.

The control system can be configured to determine the indication of the position of the belt based on a comparison between the first sensor signal and a predetermined setpoint. The control system can be configured to determine an indication of the belt width based at least on part on the first sensor signal.

The control system can be configured to receive sensor signals from each of a plurality of ultrasonic sensors positioned at a plurality of locations adjacent the lateral edges of the belt. The control system can be configured to determine an indication of the position of the conveyor belt at each of a plurality of locations, based at least in part on the sensor signals from each of the plurality of ultrasonic sensors.

The control system can be further configured to store measurement data from the plurality of ultrasonic sensors and to analyze the stored measurement data to identify potential causes of performance issues of a conveyor belt system including the belt.

In another aspect, a conveyor belt adjustment mechanism is provided, including a driving surface configured to contact a balance-weave conveyor belt, and an adjustment mechanism configured to, in response to a control signal, alter an orientation of the driving surface to adjust a path of the balance-weave conveyor belt in contact with the driving surface.

The conveyor belt adjustment mechanism of can include an adjustable bearing roller. The driving surface can be a surface of the adjustable bearing roller. The adjustment mechanism can include an eccentric cam connected to a camshaft of a motor at a point radially offset from the center of the eccentric cam. The eccentric cam can be seated within an obround aperture in an eccentric socket. The adjustment mechanism is configured to alter the orientation of a rotational axis of the adjustable bearing roller. The adjustment mechanism can be configured to cant the rotational axis of the adjustable bearing roller downward in the direction of a desired correction to the path of the balance-weave conveyor belt in contact with the driving surface.

The conveyor belt adjustment mechanism can be dimensioned to replace a component of an existing conveyor belt system. The conveyor belt adjustment mechanism can be configured to communicate with a controller to receive the control signal.

The conveyor belt adjustment mechanism can be supported on one side of the driving surface by a fixed support and on the other side of the driving surface by a movable support, where the conveyor belt adjustment mechanism is configured to alter the position of the movable support based at least in part on the control signal.

The adjustment mechanism can include a lead screw operably coupled to a bearing housing supported by a stabilizing rail, the lead screw controllable to control a longitudinal position of the bearing housing along the rail. The lead screw can be operably coupled to a motor.

The adjustment mechanism can include an eccentric cam support operably coupled to a tiltable tray, where a position of an eccentric cam in the eccentric cam support can be varied to control a tilt of the tiltable tray. The tray can support a plurality of rollers.

The conveyor belt adjustment mechanism can be supported on one side of the driving surface by a fixed support and on the other side of the driving surface by a movable support, where the conveyor belt adjustment mechanism is configured to alter the position of the movable support based at least in part on the control signal.

BRIEF DESCRIPTION OF THE DRAWINGS

Embodiments of this disclosure will now be described, by way of non-limiting example, with reference to the accompanying drawings.

FIG. 6 illustrates a cutaway side view of an ultrasonic transducer assembly equipped with field restrictor shields, viewed end on.

FIG. 7A illustrates an exemplary square wave based on output from an exemplary ultrasonic transducer mounted alongside a conveyor system and aimed at a lateral edge of a balance-weave belt. FIG. 7B illustrates an exemplary square wave based on output from another exemplary ultrasonic transducer mounted alongside a conveyor system and aimed at the other lateral edge of a balance-weave belt.

FIG. 9B illustrates a top view of the conveyor system depicted in FIG. 9A.

DETAILED DESCRIPTION

Figure 1A:
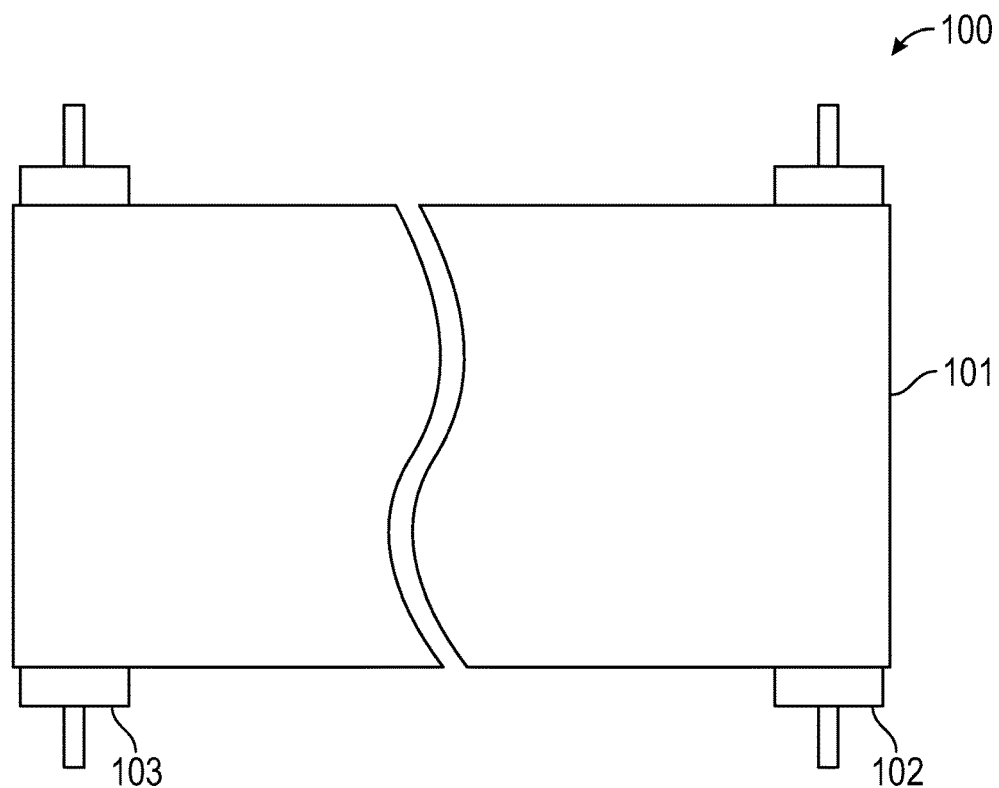
FIG. 1A illustrates an embodiment of a conveyor system.

The following description of certain embodiments presents various descriptions of specific embodiments. However, the innovations described herein can be embodied in a multitude of different ways, for example, as defined and covered by the claims. In this description, reference is made to the drawings, where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1A illustrates an embodiment of a conveyor system 100. The system 100 utilizes a conveyor belt 101 centered on and tensioned between a head pulley 102, also referred to as a drive pulley, which may be operably connected to a motor (not depicted in FIG. 1A), and a tail pulley 103. In some embodiments, the conveyor belt 101 may include a metallic material. In the illustrated embodiment, the conveyor belt 101 is a balance-weave conveyor belt.

Figure 1B:
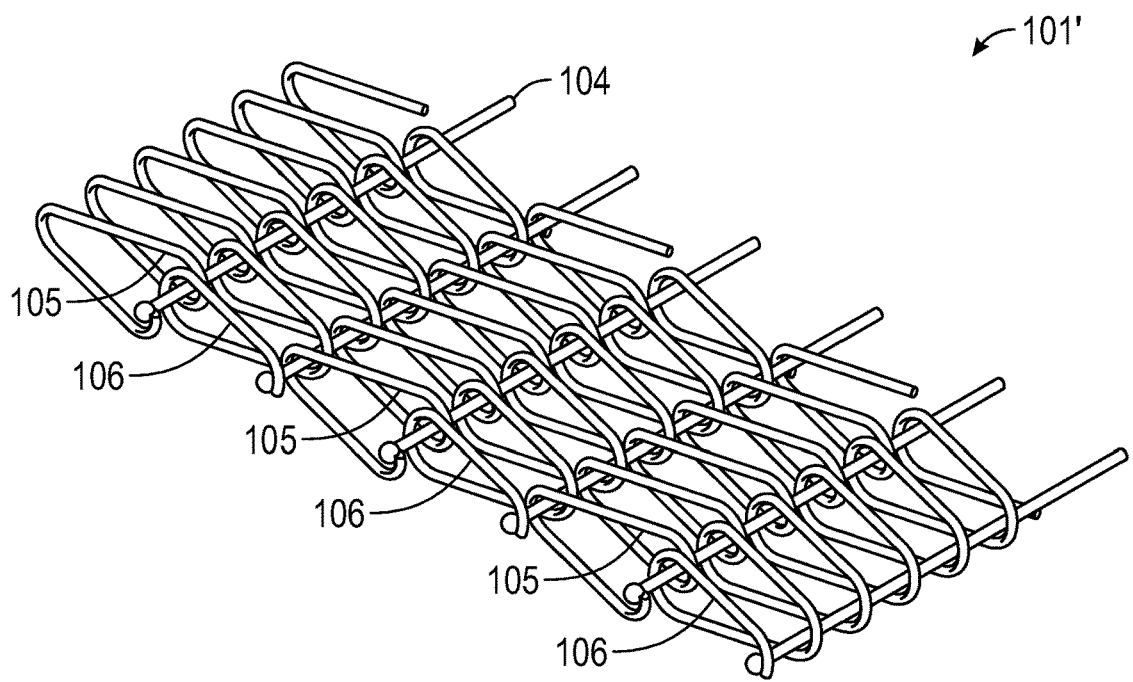
FIG. 1B illustrates a detail perspective view of a segment of the balance-weave belt in conveyor system shown in FIG. 1A.

FIG. 1B illustrates a detail perspective view of a segment 101' of the balance-weave belt 101 in conveyor 100 shown in the system of FIG. 1A. As shown, segment 101' includes a plurality of counter-rotated wire spirals—alternating between right-hand wire spirals and left-hand wire spirals—each wire spiral being flexibly connected to an adjacent wire spiral of opposite handedness by a connecting rod 104 extending through portions of adjacent interior right-hand wire spirals and left-hand wire spirals In the illustrated embodiment, the leftmost wire spiral of segment 101' is a right-hand spiral, which is rotationally joined to a left-hand spiral by a connecting rod extending through both spirals, and this left-hand spiral is joined to yet another right-hand spiral through another connecting rod. Each wire spiral thus loops around a leading connecting rod and a trailing connecting rod.

In the illustrated embodiment, the terminal end of each wire spiral at the lateral edge of segment 101' shown in FIG. 1B is welded to or otherwise connected to the end of the connecting rod 104 nearest to same at that edge. Likewise, the terminal end of each wire spiral on the opposite lateral edge (not visible in FIG. 1B) of belt 101 is welded to the opposite end (not visible in FIG. 1B) of the connecting rod 104 nearest to same on the opposite lateral edge of belt 101.

In some embodiments, the terminal ends of the wire spirals comprising the particular balance-weave belt used are not welded to the ends of connecting rods 104. Instead, the terminal ends of the connecting rods 104 are bent or crimped, constraining at least outwardly lateral movement of the wire spirals of such a balance-weave belt 101. In still other embodiments, successive wire spirals of alternating handedness in a given balance-weave belt are anchored to crimping wire elements having a zigzag or other undulating, nonlinear profile, to maintain the structural integrity of such a balance-weave belt.

As further illustrated in FIG. 1B, the terminal wire edge 106 of each left-hand wire spiral in segment 101', and in the entirety of belt 101, is oriented at an angle to the lateral edge of the belt 101 identical to that at which the terminal wire edge 106 of every other left-hand wire spiral shown in FIG. 1B is oriented. Taken together, all such terminal wire edges 106 at the lateral edge of segment 101' shown in FIG. 1B constitute a first set of parallel wire edges oriented at a first angle to the lateral edge of the belt 101. Similarly, the penultimate wire edge 105 near the end of each right-hand wire spiral in FIG. 1B is oriented at an angle to the lateral edge of the belt 101 identical to that at which the penultimate wire edge 105 near the end of every other right-hand wire spiral shown in FIG. 1B is oriented. Taken together, all such penultimate wire edges 105 near the lateral edge of partial segment 101' shown in FIG. 1B constitute a second set of parallel wire edges oriented at a second angle, the second angle being different from the first angle.

Figure 2A:
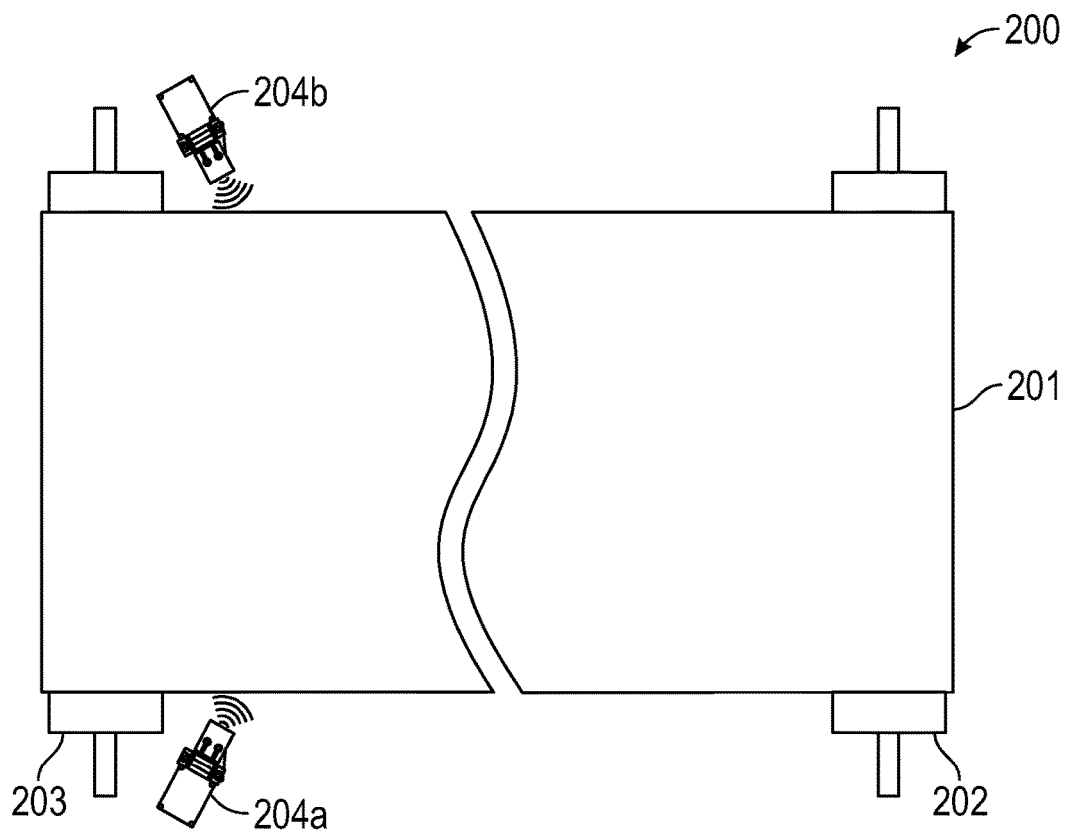
FIG. 2A illustrates a top view of an embodiment of a conveyor system.

FIG. 2A illustrates a top view of an embodiment of a conveyor system 200. As shown, first and second ultrasonic transducer units 204a and 204b are positioned to monitor the lateral position of a balance-weave belt 201 centered on and tensioned between head pulley 202 and tail pulley 203. In operation, each ultrasonic transducer unit 204a or 204b periodically emits ultrasonic pulses directed at the lateral edge of balance-weave belt 201 on its respective side of system 200 while belt 201 is in motion. With the placement of head pulley 202 relative to tail pulley 203 shown in system 200 of FIG. 2A, balance-weave belt 201 travels from left to right in FIG. 2A. The first and second ultrasonic transducer units 204a and 204b are oriented at oblique angles to the lateral edges of the belt 201.

Figure 2B:
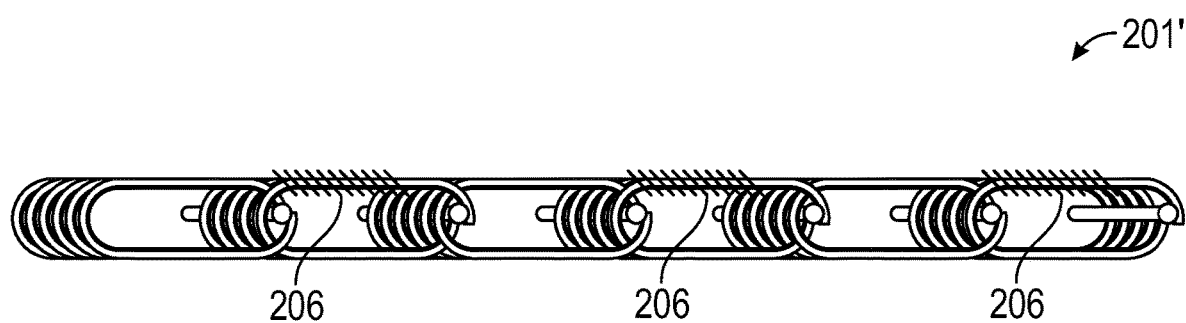
FIG. 2B illustrates a perspective side view of a partial segment of the balance-weave belt of the system shown in FIG. 2A.

FIG. 2B illustrates a perspective side view of a partial segment 201' of the balance-weave belt 201 of system 200 shown above in FIG. 2A. As shown, several target areas presented by the terminal wire edges 206 of the left-hand wire spirals in segment 201' have been highlighted. Oriented as depicted in FIG. 2A, a longitudinal centerline of each ultrasonic transducer unit 204 in FIG. 2A is orthogonal to the target areas formed by the terminal wire edges 206 of the left-hand wire spirals in partial segment 201' shown in FIG. 2B. Echo sensors such as those housed in ultrasonic transducer units 204a and 204b receive the strongest reflected signals, also referred to as echoes, from target areas oriented orthogonally to the longitudinal centerline of the ultrasonic transducer that emits the ultrasonic pulses.

Figure 2C:
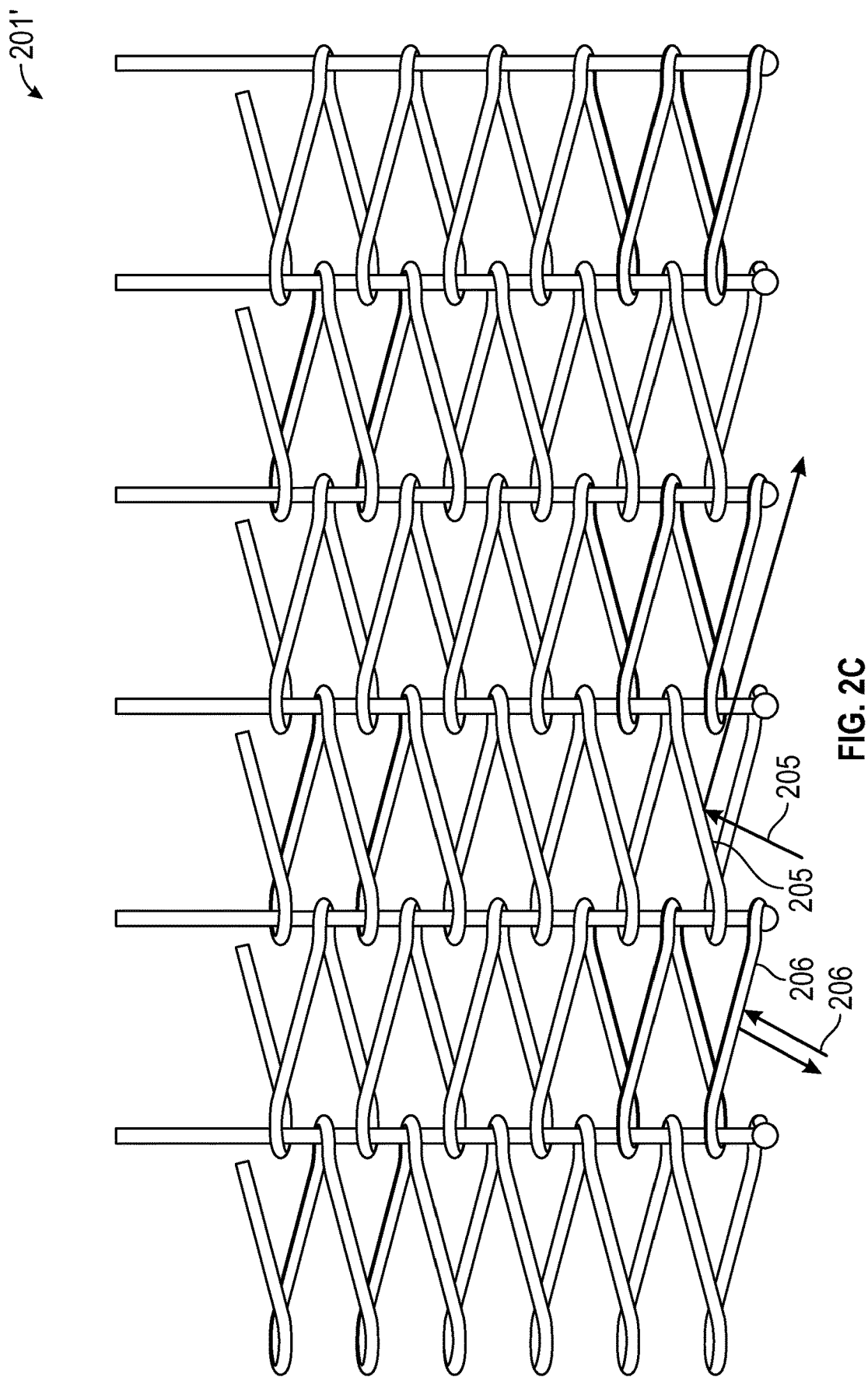
FIG. 2C illustrates a top view of the partial segment of the balance-weave conveyor belt of the system shown above in FIG. 2A, near a lateral edge of the belt.

FIG. 2C illustrates a top view of the partial segment 201' of the balance-weave conveyor belt 201 of system 200 shown above in FIG. 2A, near a lateral edge of belt 201. As shown, two distinct pairs of arrows have been drawn. The first pair of arrows has been drawn relative to a target area along a terminal wire edge 206 of a left-hand wire spiral. The first arrow of the first pair of arrows, shown with its arrowhead touching a terminal wire edge 206, represents an ultrasonic pulse emitted by an ultrasonic transducer unit 204—such as one of the pair of transducer units 204a and 204b shown in FIG. 2A—oriented orthogonally to the target area of a terminal wire edge 206. The second arrow of the first pair of arrows, shown with its arrowhead directed parallel to but in a direction opposite to that of the first arrow of the first pair of arrows, represents the ultrasonic feedback or echo field being reflected back to a transducer unit 204, where it can be detected as a positive reading.

The first arrow of the second pair of arrows shown in FIG. 2C, shown with its arrowhead touching the penultimate wire edge 205 of a right-hand wire spiral, represents an ultrasonic pulse, emitted by an ultrasonic transducer unit 204, incident upon a penultimate wire edge 205. The second arrow of the second pair of arrows illustrates the fact that ultrasonic energy reflected by penultimate wire edge 205 is not reflected back toward either transducer unit 204a or 204b, the longitudinal centerline of each transducer unit being oriented orthogonally to a terminal wire edge 206, not to a penultimate wire edge 205.

Based on the foregoing, each transducer 204 of the first and second ultrasonic transducers units 204a and 204b shown in FIG. 2A will produce an alternating output of positive readings and null readings, depending on the orientation of the alternating individual wire edges, terminal or penultimate, passing through its target area. As described in greater detail elsewhere in the specification, these positive and null values can be analyzed to provide information about the location and status of the conveyor belt. For example, these values can be averaged to produce a numerical value that represents the distance from each sensor to the lateral edge of the belt on its respective side of the conveyor system. Other types of analysis may also be performed.

The ultrasonic transducer units 204a and 204b are spaced from both the penultimate wire edges 205 and terminal wire edges 206 near the respective lateral edges of belt 201 at a distance that exceeds a dead zone for the particular ultrasonic transducer used. The dead zone represents a range of distances, shorter than the minimum detection range of each ultrasonic transducer, within which the sensor will not detect the first echo or echo from the portion of a wire spiral passing through the target region of the transducer, but may detect a second or third echo, resulting in an erroneous measurement value for the separation between the sensor and the targeted belt-edge parallel wire set, penultimate or terminal. In particular, this may result in a measurement value which reflects a distance greater than the actual separation distance.

In other embodiments, each ultrasonic transducer unit, 204a or 204b, may individually be oriented at an oblique angle to the lateral edge of the belt. In particular, the ultrasonic transducer units 204a and 204b may be oriented so that a projection of the longitudinal centerline of each transducer unit, 204a or 204b, within the plane of the belt 201 is perpendicular to the angle at which the penultimate wire edges 205 near the lateral edges of balance-weave belt 201 are oriented. Such an orientation can be seen in the penultimate wire edges 205 depicted in and described above with regard to the detail perspective view of the segment of balance-weave belt 201 in FIG. 2C. Such an orientation differs from an orientation in which a projection of the longitudinal centerline of each transducer unit, 204a or 204b, within the plane of the belt 201 is perpendicular to the angle at which the terminal wire edges 206 are oriented, as described above with regard to FIG. 2B.

In some embodiments, each of the ultrasonic transducer units, 204a and 204b, may comprise a unitary device, in which the component, such as a piezoelectric crystal, that converts electrical energy into ultrasonic pulses that are emitted is the same component that receives the ultrasonic echoes reflected by the targeted wire edges and converts these into analog electrical output signals. The transducer unit may include dedicated control circuits for performing these complementary conversion processes. In other embodiments, however, the components responsible for emitting and detecting ultrasonic energy, respectively, may be distinct and physically separated. The orientation of the longitudinal centerline of each ultrasonic transducer unit may, in such embodiments, be oriented non-orthogonally at an angle to the loops of one of the wire spiral types, such that the reflections from certain wire spirals of a properly-operating belt 101 will be directed towards the separate ultrasonic detector, rather than directly back to the ultrasonic transducer unit that emitted the pulses.

An analog output from each ultrasonic transducer unit 204 may be transmitted to or otherwise made available to a computer/processor system. This system may include, among other elements, counters, registries, and a display, which may be configured to display relevant system information. The computer/processor system, which may further comprise a graphical user interface (GUI), may be implemented in any suitable location, such as near a loading point of the conveyor system, near an end of the system, such as near the head or tail pulley, or any other suitable location.

Figure 3A:
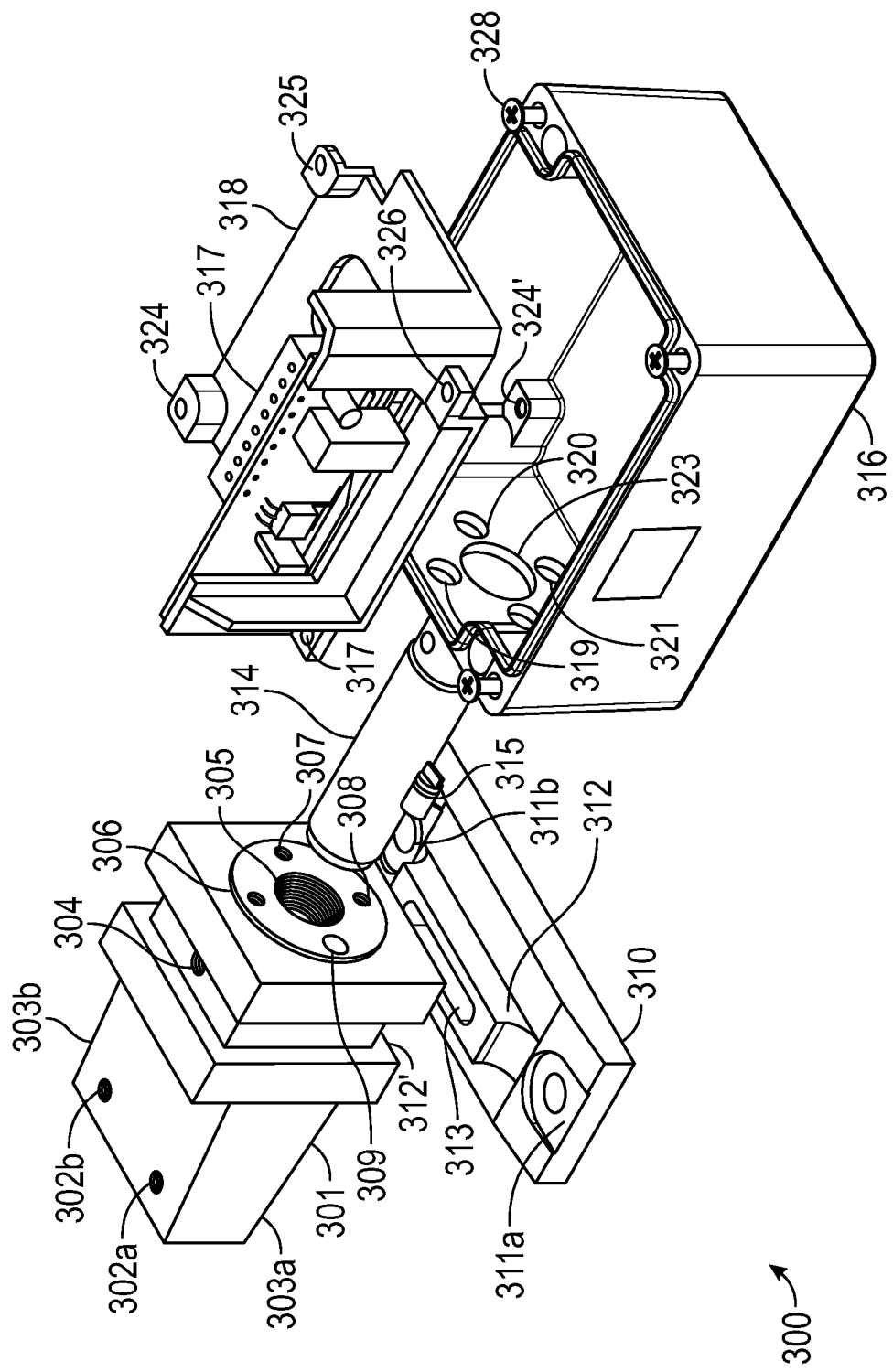
FIG. 3A illustrates an exploded perspective view of an embodiment of an individual ultrasonic transducer unit, such as the ultrasonic transducer units depicted in and described above with regard to FIG. 2A.
Figure 3B:
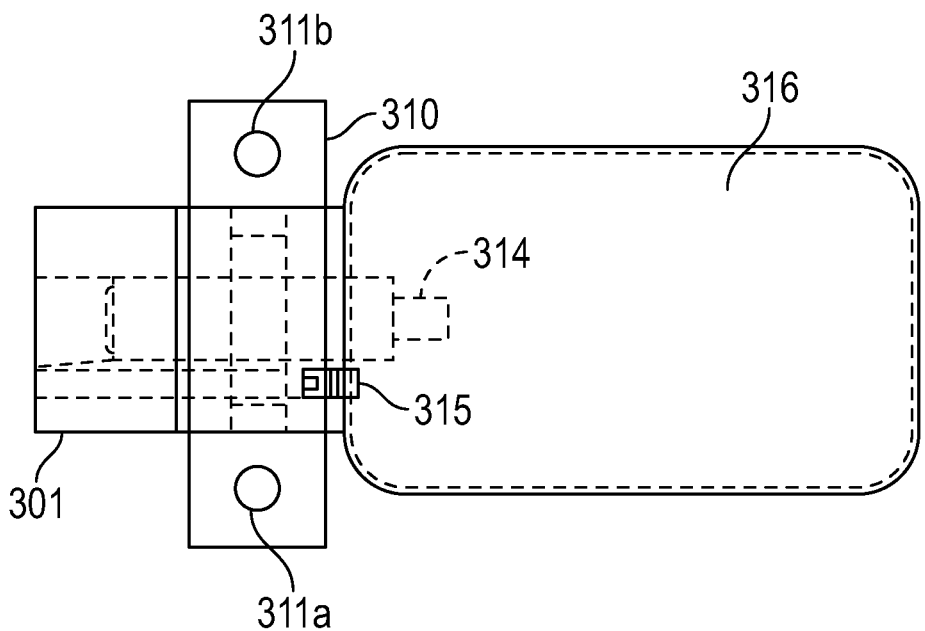
FIG. 3B illustrates a top view of an assembled version of the individual ultrasonic transducer unit of FIG. 3A.
Figure 3C:
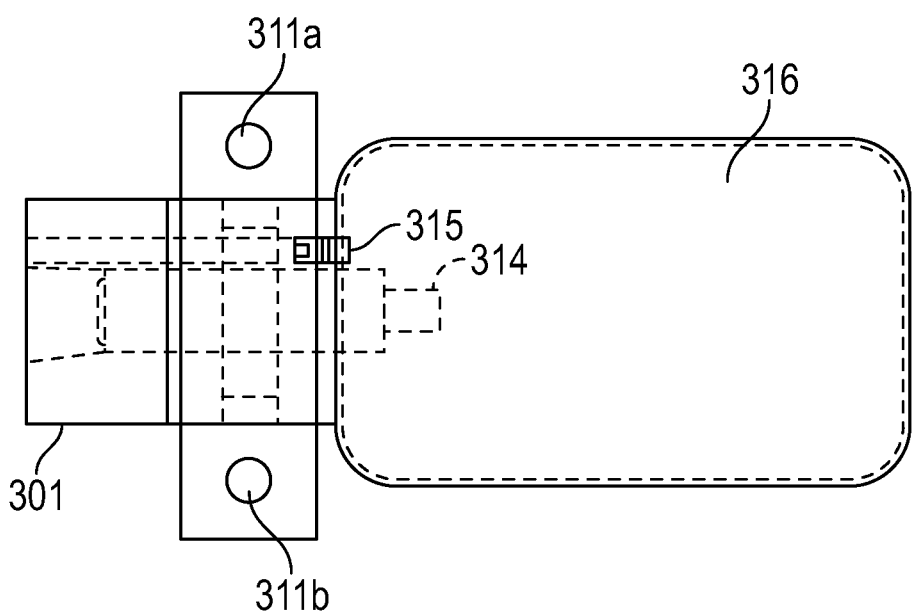
FIG. 3C illustrates a bottom view of the assembled version of the individual ultrasonic transducer unit of FIG. 3A.
Figure 3D:
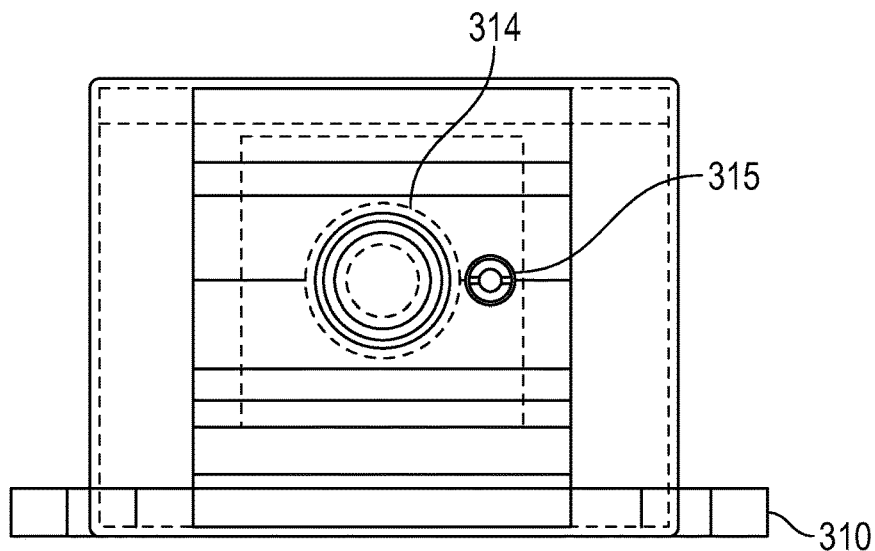
FIG. 3D illustrates a front view of an assembled version of the individual ultrasonic transducer unit of FIG. 3A.
Figure 3E:
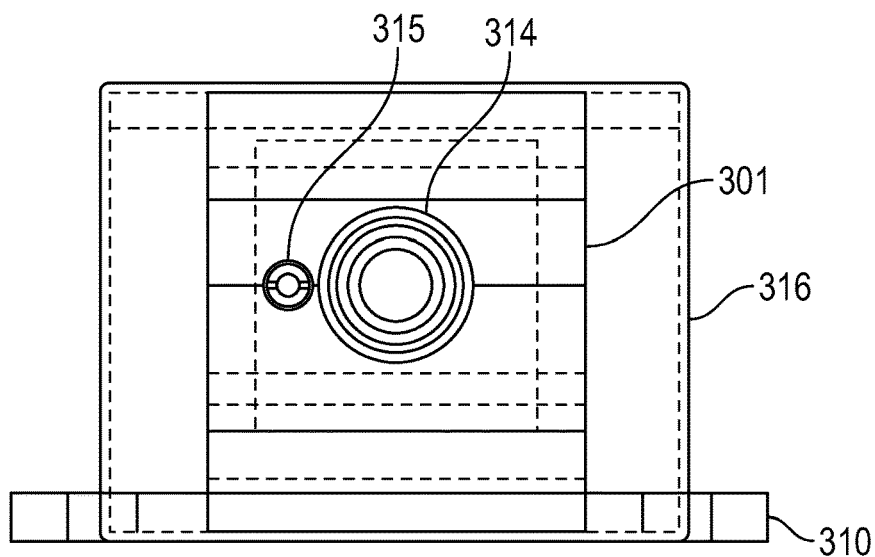
FIG. 3E illustrates a back view of an assembled version of the individual ultrasonic transducer unit of FIG. 3A.
Figure 3F:
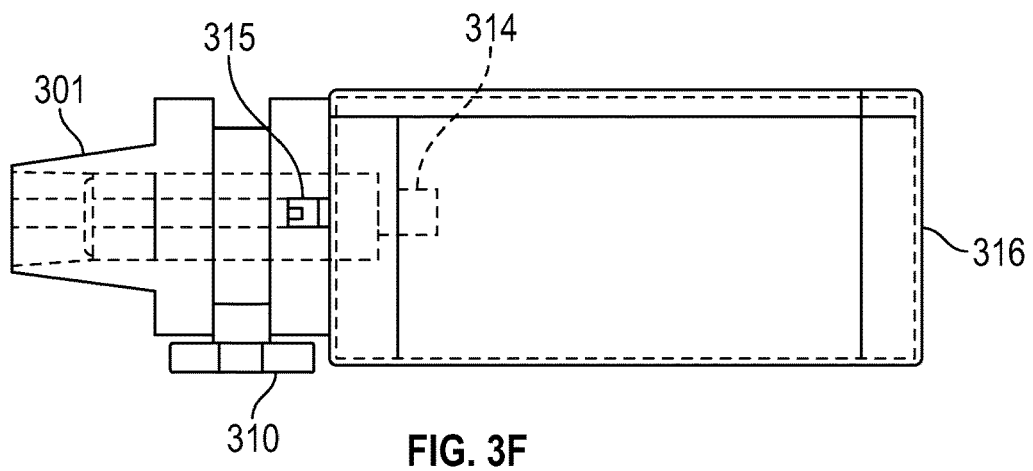
FIG. 3F illustrates a side view of an assembled version of the individual ultrasonic transducer unit of FIG. 3A.

FIG. 3A illustrates an exploded perspective view of an individual ultrasonic transducer unit 300, such as ultrasonic transducer unit 204a or 204b depicted in and described above with regard to FIG. 2A. FIG. 3B illustrates a top view of an assembled version of the individual ultrasonic transducer unit 300 described above and depicted in exploded perspective view in FIG. 3A. FIG. 3C illustrates a bottom view of the assembled version of the individual ultrasonic transducer unit 300 described above and depicted in exploded perspective view in FIG. 3A. FIG. 3D illustrates a front view of an assembled version of the individual ultrasonic transducer unit 300 described above and depicted in exploded perspective view in FIG. 3A. FIG. 3E illustrates a back view of an assembled version of the individual ultrasonic transducer unit 300 described above and depicted in exploded perspective view in FIG. 3A. FIG. 3F illustrates a side view of an assembled version of the individual ultrasonic transducer unit 300 described above and depicted in exploded perspective view in FIG. 3A.

As shown, a sensor chassis body 301, having a front end and a back end, is disposed at the left end of ultrasonic transducer unit 300 shown in FIG. 3A. As further shown, the profiles of a portion of both the top and bottom surfaces of sensor chassis body 301 are tapered from approximately the midpoint of body 301 toward the front end of the body 301. Two threaded holes 302a and 302b, spaced apart horizontally with respect to one another, are, as shown, located near the front edge of the top-tapered surface of sensor chassis body 301, each dimensioned to accommodate a threaded screw (not shown). An additional two threaded holes 303a and 303b, neither of which are visible in FIG. 3A, may be provided near the front edge of the bottom-tapered surface of sensor chassis body 301, spaced apart horizontally with respect to one another. The body 301 also includes yet another pair of threaded holes, hole 304 and another threaded hole, not visible in FIG. 3A, each dimensioned to accommodate a set screw. Hole 304 is located in the top surface of sensor chassis body 301, and the other hole is located in the bottom surface of chassis body 301, so that ultrasonic sensor 314 may be secured in body 301 after it has been inserted in the chassis body 301. A substantially cylindrical through hole 305, dimensioned to accommodate a portion of the length of ultrasonic sensor 314, runs the axial length, back to front, of chassis body 301. As further shown, an additional three threaded holes 306, 307, and 308 are disposed at 90-degree rotational intervals, on the top, right side, and bottom, on the back face of sensor chassis body 301. These holes allow body 301 to be mechanically attached, via screws (not shown), to electronics housing 316, by inserting the screws through holes 319, 320, and 321 in the front end of electronics housing 316. A non-threaded through hole 309, located 90 degrees counter-clockwise from top threaded hole 306, made in chassis body 301, is dimensioned to accommodate targeting laser diode 315, described in greater detail below with respect to laser diode 615 in FIG. 6. When inserted in non-threaded hole 309, the longitudinal centerline of targeting laser diode 315 is parallel to and in the same horizontal plane as the longitudinal centerline of ultrasonic sensor 314. On-board electronics 317, which control the emission and detection of ultrasonic signals, targeting laser diode 315, and communication to/from ultrasonic transducer 314, are housed in electronics housing 316, the cover of which is not shown in FIG. 3A.

An adjustable mounting element 310 of a generally rectangular horizontal form factor is, as shown, disposed beneath sensor chassis body 301. First and second through holes 311a and 311b, respectively disposed at each end of mounting element 310, facilitate the mounting of ultrasonic transducer units, such as 204 described above and depicted in FIG. 2A, on either side of a balance-weave belt in an embodiment of a conveyor system. As can be seen in FIG. 3A, the upper surface of mounting element 310 has a projection 312 dimensioned to fit into a horizontal channel 312' on a bottom surface of sensor chassis body 301. After body 301 has been mechanically attached to mounting element 310, the projection 312 will prevent sensor chassis body 301 from rotating about a longitudinal centerline of ultrasonic transducer unit 300 after installation. Electrical chassis 318, on which control electronics on a printed circuit board (PCB) are mounted, may be secured in electronics housing 316, by inserting screws (not shown) into shoulder projections 324-327 disposed at the corners of electrical chassis 318, then tightening these screws into respective standoffs 324'-327' disposed at the inside corners at the bottom of electronics housing 316. A cover may be mounted atop electronics housing 316 using screws 328.

Figure 4A:
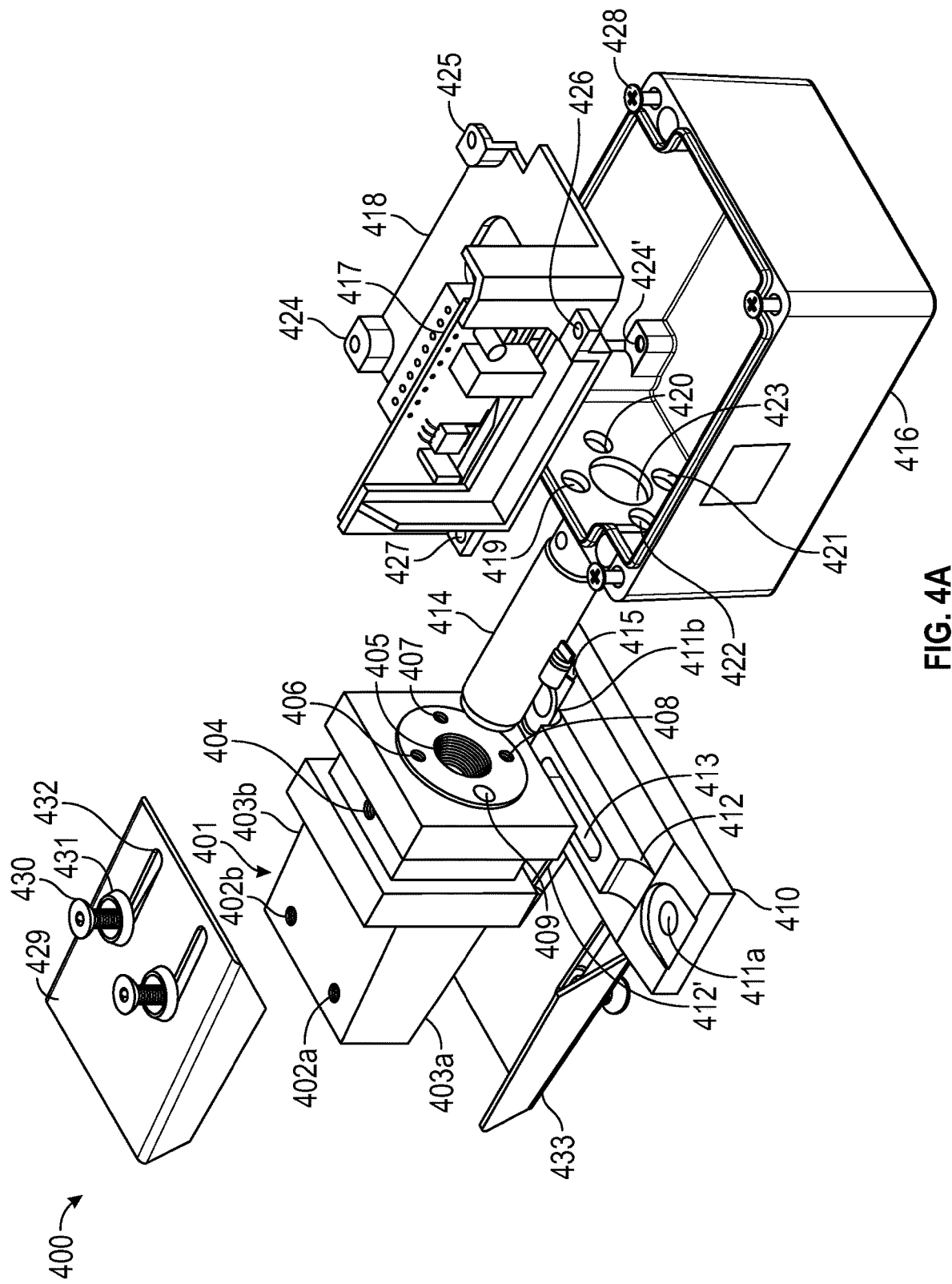
FIG. 4A illustrates an exploded perspective view of an embodiment of an individual ultrasonic transducer unit additionally including two field restrictor shields.

FIG. 4A illustrates an exploded perspective view of an individual ultrasonic transducer unit 400 including the same elements as those depicted in and described above with regard to ultrasonic transducer unit 300 in FIG. 3A, but additionally including two field restrictor shields 429 and 433, which may be similar or identical to field restrictor shields 629 and 633 described in greater detail below with respect to FIG. 6.

Figure 4B:
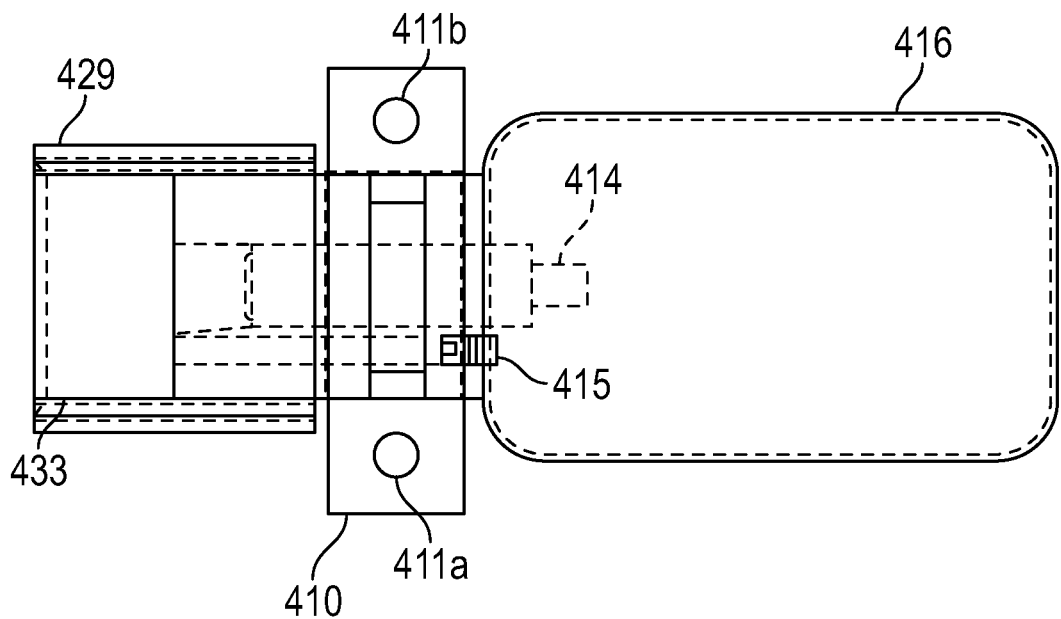
FIG. 4B illustrates a top view of an assembled version of the individual ultrasonic transducer unit of FIG. 4A.
Figure 4C:
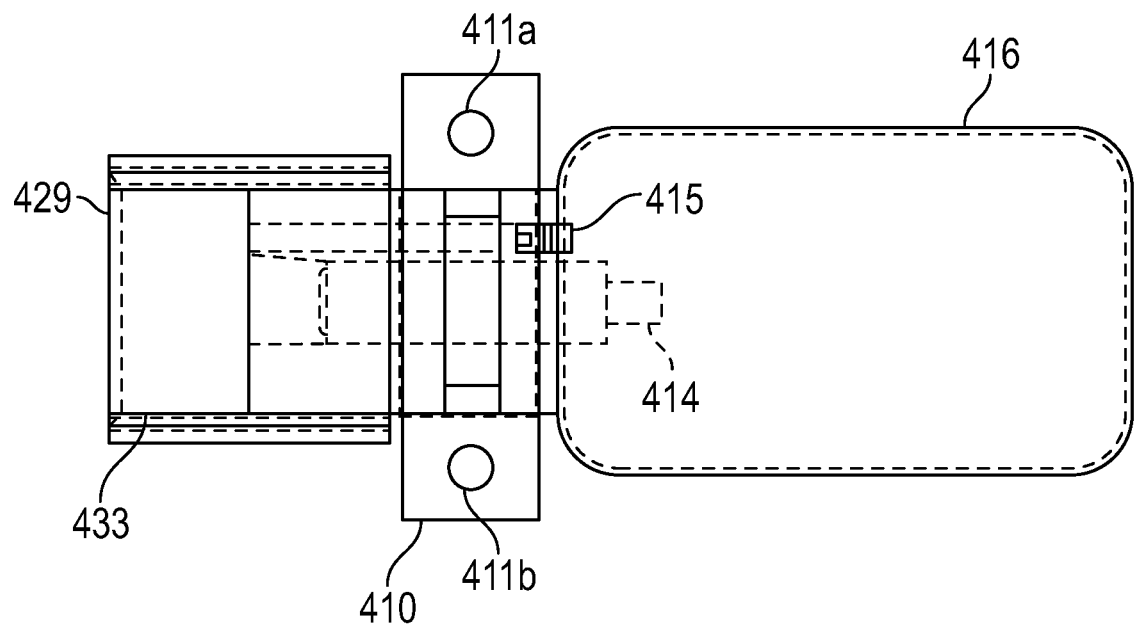
FIG. 4C illustrates a bottom view of an assembled version of the individual ultrasonic transducer unit of FIG. 4A.
Figure 4D:
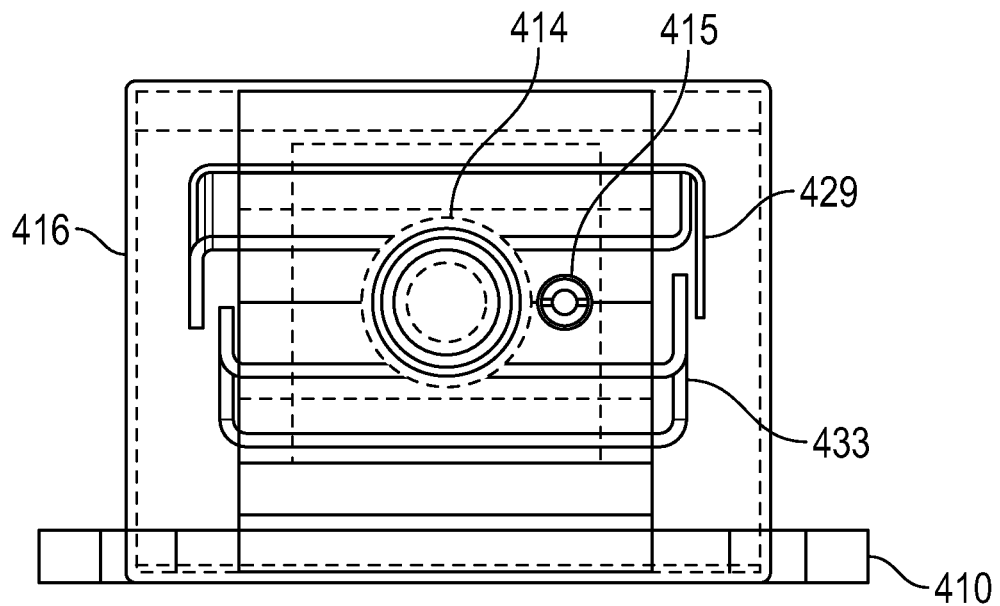
FIG. 4D illustrates a front view of an assembled version of the individual ultrasonic transducer unit of FIG. 4A.
Figure 4E:
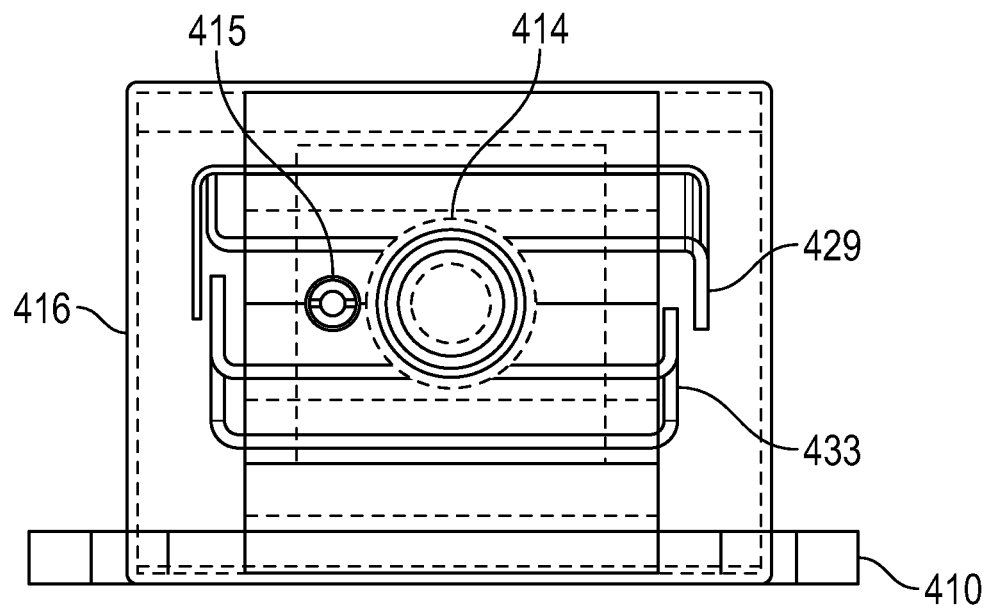
FIG. 4E illustrates a back view of an assembled version of the individual ultrasonic transducer unit of FIG. 4A.
Figure 4F:
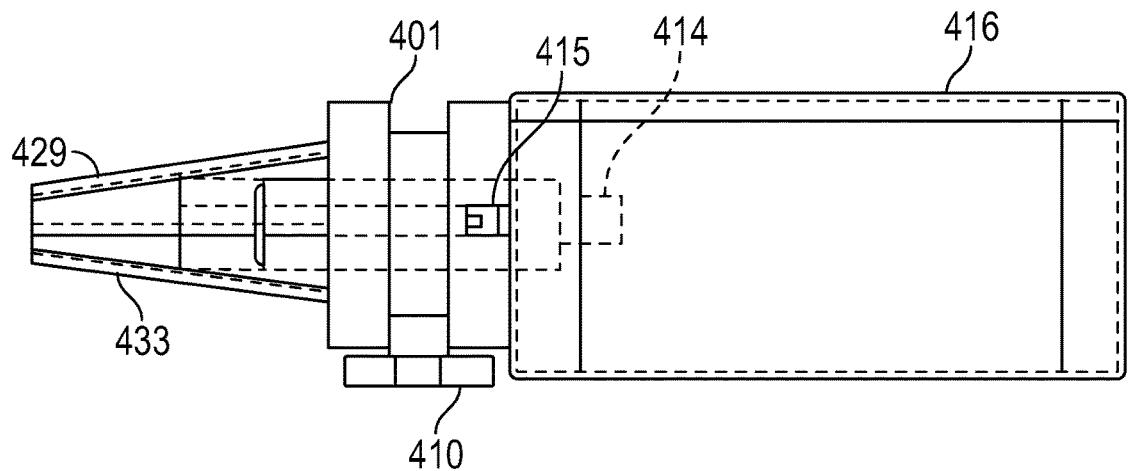
FIG. 4F illustrates a side view of an assembled version of the individual ultrasonic transducer unit of FIG. 4A.

FIG. 4B illustrates a top view of an assembled version of the individual ultrasonic transducer unit 400 described above with respect to and depicted in exploded perspective view in FIG. 4A. Screws 430 and washers 431, used to secure uppermost field restrictor shield 429 into threaded holes 402a and 402b, are not visible in FIG. 4B. Also not visible in FIG. 4B are slots 432, in uppermost field restrictor shield 429, slots 432 being visible in FIG. 4A. FIG. 4C illustrates a bottom view of an assembled version of the individual ultrasonic transducer unit 400 described above and depicted in exploded perspective view in FIG. 4A. FIG. 4D illustrates a front view of an assembled version of the individual ultrasonic transducer unit 400 described above and depicted in exploded perspective view in FIG. 4A. FIG. 4E illustrates a back view of an assembled version of the individual ultrasonic transducer unit 400 described above and depicted in exploded perspective view in FIG. 4A. FIG. 4F illustrates a side view of an assembled version of the individual ultrasonic transducer unit 400 described above and depicted in exploded perspective view in FIG. 4A.

Field restrictor shield 429 may be secured to the top surface of sensor chassis body 401 using screws 430, paired with washers 431, inserted through respective slots 432, and tightened in threaded holes 402a and 402b, respectively. Similarly, field restrictor shield 433 may be secured to the bottom surface of sensor chassis body 401 using screws and washers inserted through respective slots and tightened in threaded holes.

Figure 5A:
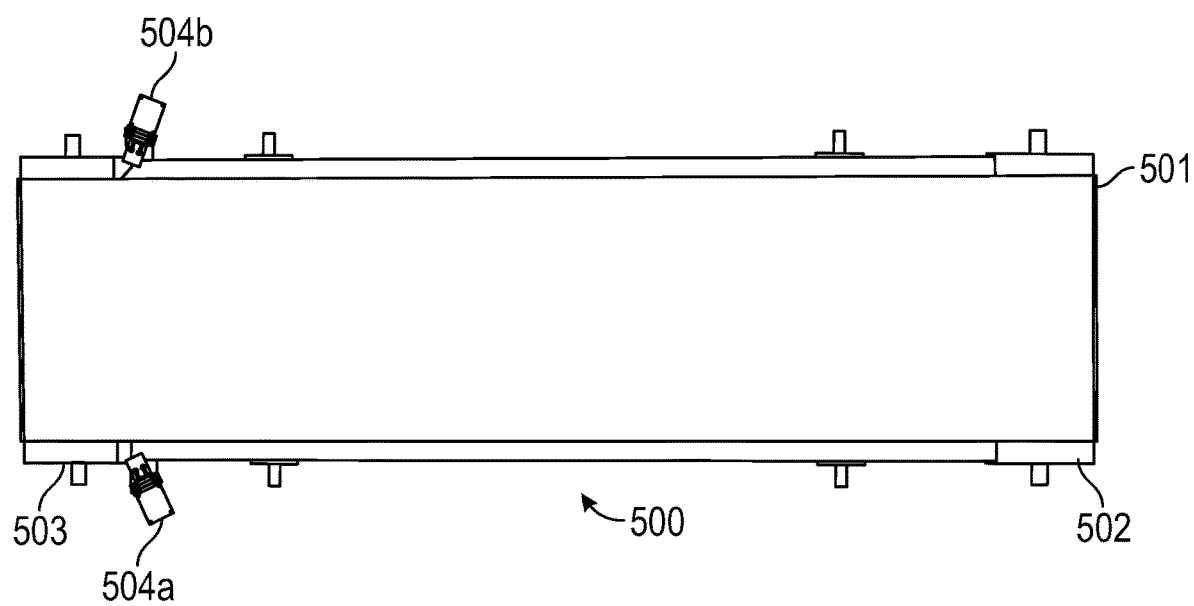
FIG. 5A illustrates an embodiment of a conveyor system including first and second ultrasonic sensor units oriented at oblique angles to the conveyor belt.

FIG. 5A illustrates a conveyor system 500 comprising, among other elements, first and second ultrasonic sensor units 504a and 504b mounted near the tail pulley 503. In some embodiments, the sizes of the target areas for each ultrasonic sensor 504a and 504b, may range between 1 mm and 3 mm, but in other embodiments, may be any diameter suitable for a particular application. These target areas may also referred to as a set of wire edges, penultimate or terminal, near or at the lateral edges of a balance-weave belt. Because angular alignment may be critical in the positioning of ultrasonic sensors directed at the irregular lateral edges of a balance-weave belt, a targeting laser diode (such as laser diodes 315, 415, in FIGS. 3 and 4, respectively) may be provided and mounted alongside the ultrasonic transducer of ultrasonic sensors 504a and 504b. During installation of a conveyor system, a specific set of parallel wire edges, penultimate or terminal, of the properly centered and tensioned balance-weave belt may be targeted.

Figure 5B:
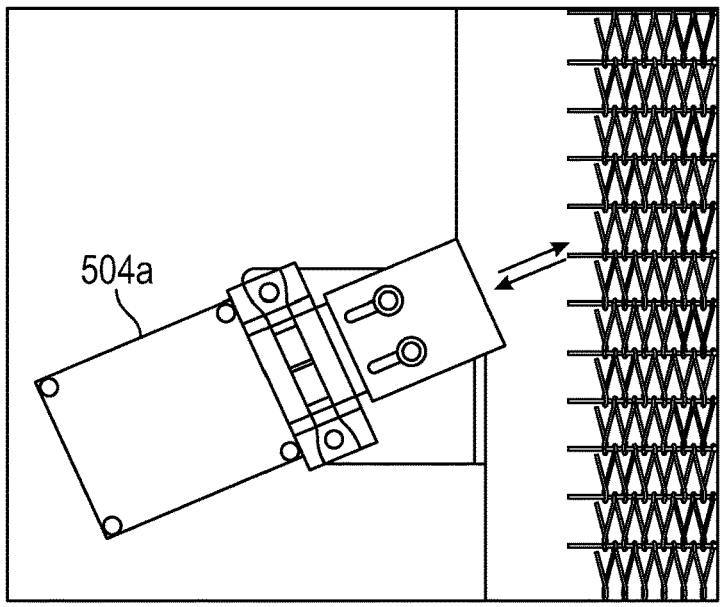
FIG. 5B illustrates a detail top view of the ultrasonic transducer shown in FIG. 5A.

FIG. 5B illustrates a detail top view of ultrasonic transducer 504a shown in the system of FIG. 5A. As shown, transducer 504a, as with transducer 504b visible in FIG. 5A, is aligned so that a projection of its longitudinal centerline in the plane of the belt 501 is orthogonal to targeted terminal wire edges at a lateral edge of balanced weave belt 501. With each transducer unit 504a and 504b so oriented with respect the terminal wire edges at the lateral edges of belt 501, each transducer unit 504a and 504b will receive a positive reading or echo, where the resulting amplitude of the analog output from each transducer 504a and 504b is proportional to the physical separation/distance between each transducer and the targeted belt-edge wire. Wire edges oriented orthogonally with respect to the longitudinal centerline of a given transducer are referred to herein as "leading edges," while the other set of wire edges, which are oriented non-orthogonally with respect to the longitudinal centerline of a given transducer are referred to herein as "falling edges."

Figure 5C:
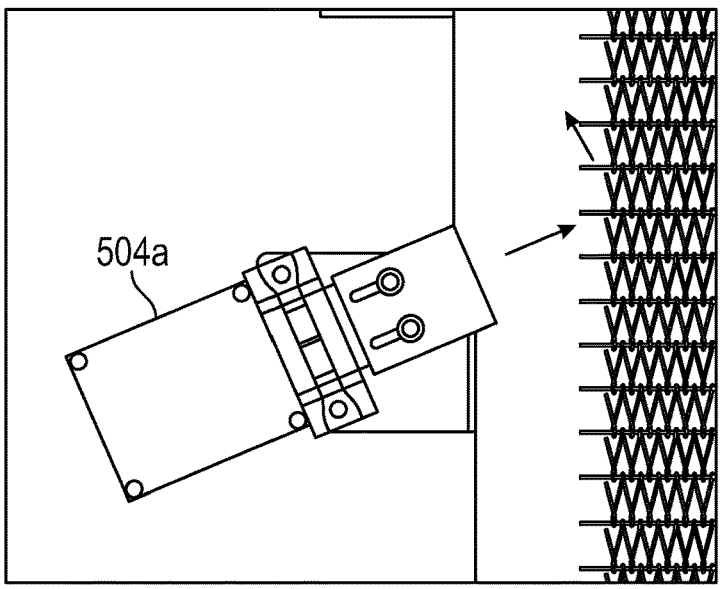
FIG. 5C illustrates a detail top view of the ultrasonic transducer shown in FIG. 5A.

FIG. 5C illustrates a detail top view of the ultrasonic transducer 504a depicted in FIG. 5A, showing an ultrasonic pulse impinging upon a falling edge and being reflected away from transducer unit 504a.

The rate at which a balance-weave belt moves in a given conveyor system does not affect the accuracy with which the positions of the lateral edges of such belts are made and recorded. The alternating positive and null readings detected by the first and second ultrasonic transducer units comprising each pair of transducers units, properly mounted and aimed at one of the two parallel wire edge sets (terminal or penultimate), may be continuously or periodically monitored and stored as a balance-weave belt continuously moves past each such pair of ultrasonic transducers.

Figure 5D:
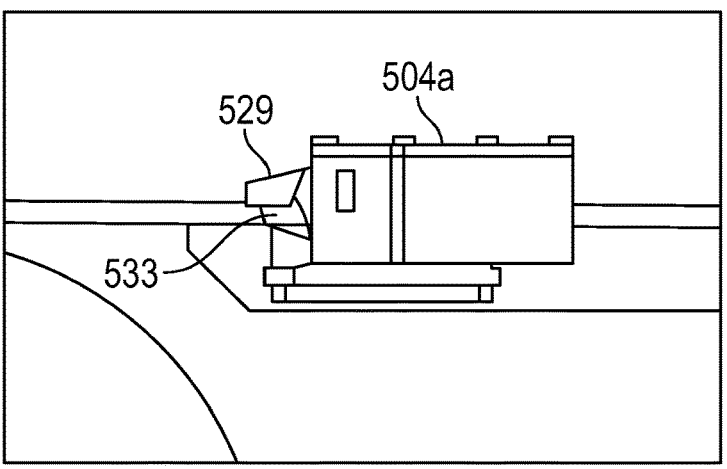
FIG. 5D illustrates a detail side view of the ultrasonic transducer shown in FIG. 5A.

FIG. 5D illustrates a detail side view of ultrasonic transducer 504a depicted in FIG. 5A. As illustrated, a pair, upper and lower, of field restrictor shields 529 and 533 are shown in profile at the front of the transducer 504. These are described below in greater detail with respect to similar shields 629 and 633 illustrated in FIG. 6.

Figure 6:
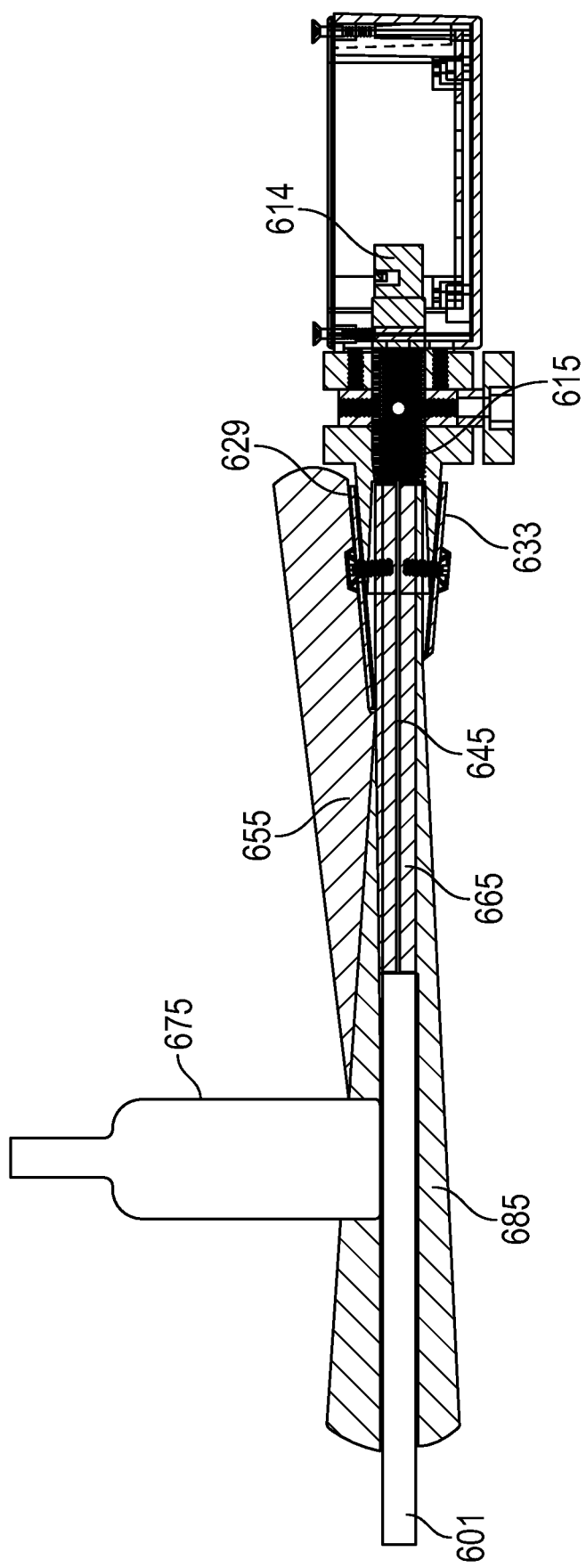

FIG. 6 illustrates a cutaway side view of an ultrasonic transducer assembly 604, equipped with field restrictor shields 629 and 633, and a targeting laser diode 615, configured to emitting an ultrasonic beam 685, also referred to as an ultrasonic pulse or an ultrasonic field, at a lateral edge of a targeted balance-weave belt 601, viewed end on. Targeting laser beam 645 is shown aimed at a chosen wire-edge set. Conveyor belt 601 is carrying a payload in the form of one or more bottles 675 very close to its lateral edge. Analog ultrasonic sensors may operate on a strongest-signal-in-range model and may be unable to discern between targets. Because bottle 675 is a very discernible target surface for ultrasonic beam 685, as can be seen by the unwanted feedback field 655 generated by the reflection of ultrasonic beam 685 from bottle 675, the presence of a payload such as bottles 675 very close to a lateral edge of belt 601 could lead to erroneous belt position signals.

To prevent such erroneous belt position signals, the ultrasonic transducer assembly 604 is equipped with a pair of adjustable field restricting shields 629 and 633 that limit its field of view to a narrow field or plane. For example, the field restricting shields 629 and 633 may limit the field of view of the ultrasonic transducer assembly 604 to a plane parallel to the particular set of wire edges (penultimate or terminal) of belt 601, at either the top or bottom of its spirals, that each transducer has been aligned to target. Field restricting shields 629 and 633 may be set at an angle relative to one another to minimize the possibility of noise occurring from deliberately clipping the sensor's emitted field 685, as well as allowing for the finite adjustment of the report area. In some embodiments, this angle between field restricting shields 629 and 633 may be less than 10 degrees.

As illustrated in FIG. 6, the useable feedback field 665 reflected by the targeted wire edges of belt 601 enters the aperture created by field restrictor shield pair 629 and 633, whereas feedback field 655 reflected by bottle 675 is excluded. The field restrictor shield pair 629 and 633 thus serves to reject noise from external sources, to improve the signal-to-noise (SNR) ratio. The field restrictor shields 629 and 633 also provide physical protection for the sensor 604, prohibit target entry into the sensor 604's dead zone, and protect operators from incidental laser flash.

In some embodiments, the field restricting shields 629 may include a polycarbonate material. In some embodiments, only a single field restricting shield 629 may be used, rather than a pair of field restricting shields 629. In some embodiments, the targeting laser may be omitted, and the ultrasonic transducer assembly 604 may be aligned using other methods, including but not limited to monitoring of the output of the sensor 604.

In some embodiments, one or more set screws or other positioning structures or tools may be used to control the orientation or alignment of the sensor 604. In some embodiments, a servo motor may be used in conjunction with a set screw or similar structure to allow remote and/or automatic adjustment of the sensor 604. In some embodiments, the sensor 604 may be self-targeting, using the output of the sensor 604 in conjunction with a controllable alignment adjustment component such as a servo motor in conjunction with a set screw, or any other suitable mechanism which can be used to adjust the alignment of the sensor 604.

FIG. 7A illustrates an exemplary square waveform 700A based on output from an exemplary ultrasonic transducer, such as the left (L) ultrasonic transducer 504a depicted in FIG. 5A. This transducer 504a may be mounted alongside a conveyor system, and aimed such that its longitudinal centerline is perpendicular to a chosen set of wire edges, penultimate or terminal, near or at a lateral edge of a balance-weave belt. As shown, the square wave output is inverted, with the null output, associated with the falling edge wire-edge set, at the top 710A of the waveform 700A shown in FIG. 7A. This "null" output is not a true "zero." Because the falling edge wire edges do not return echoes to the ultrasonic transducers, as described in greater detail above with regard to FIG. 5C, each such falling edge wire edge can be viewed as representing an incidental target at an infinite target distance. As such, falling edge wire edges are in fact out of range on the high side, and the transducer unit's output goes to the high limit of the output scale.

Conversely, as the leading edge wire edges of the belt return echoes, as depicted above in FIG. 5B, and as such represent targets closer to the transducer, the corresponding output value from a transducer decreases, relative to the output resulting from no return echo from a falling edge wire edge. In other words, as a belt gets closer to a given transducer, the output value from that transducer decreases, as depicted for the output associated with the leading edge wire edges, at the bottom 720A of the square wave output shown in FIG. 7A. The line 730A drawn across the waveform 700A, as annotated in FIG. 7A, represents an average value of the L Sensor's output.

FIG. 7B illustrates an exemplary square waveform 700B based on output from an exemplary ultrasonic transducer, such as right (R) transducer 504*b* described above and depicted in FIG. 5A. This transducer 504*b* may be mounted alongside a conveyor system, not visible in FIG. 7B, and aimed such that its longitudinal centerline is perpendicular to a chosen set of wire edges (penultimate or terminal) near or at a lateral edge of a balance-weave belt. As with the L Sensor Signal waveform 700A, described above and depicted in FIG. 7A, the R Sensor signal waveform 700B is also inverted, with the null output, associated with the falling edge wire edge set, at the top 710B of the waveform 700B and the maximum sensor output, associated with the leading edge wire edge set, at the bottom 720B of the waveform 700B. The bold solid line 730B drawn across the waveform 700B, as annotated in FIG. 7B, represents the average value of the R sensor's output.

Figure 7C:
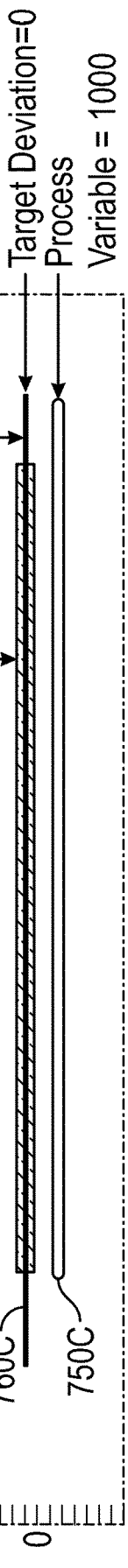
FIG. 7C graphically represents a dual sensor control model for a belt that is mistracking to one side.

FIG. 7C graphically represents a Dual Sensor Control Model for a belt that is mistracking to the left. In one embodiment of the conveyor system, the default operational mode of the system is a dual sensor mode in which the two analog output signals from each pair of ultrasonic transducers/sensors, each such analog output being indicative of the physical distance between the sensor and the belt edge, are continuously compared against each other, thereby keeping the belt in the center unless the processor is given an offset value. While operating in this condition, the output signals need only be compared to one another, and a fixed reference point need not be used. When both sensors are operating as intended, the deviation of the target is zero, as represented by the target deviation line 760C at zero.

However, because FIG. 7C represents a belt mistracking to the Left, the actual deviation of the target, shown by line 750C, is not zero but 1,000 units (mean R−mean L=3,000−2000=1,000). As described in greater detail below with respect to the flowcharts in FIGS. 13-15, a control system may utilize this information to steer the belt toward the right, relative to the belt's centerline, to a degree that is proportional to this differential.

When one sensor fails, a predefined setpoint may be used to determine deviation of the belt using only a single operating sensor. In such a scenario, the controller, not visible in FIG. 7C, may switch the system to a single sensor mode and may also send a notification that a sensor has failed, calling for help. A fixed setpoint, also referred to as a preprogrammed constant, would then be used to control the belt to a predetermined, nominally centered, position, by comparing the mean value of the operational sensor to the fixed setpoint. A difference between the mean value of the operational sensor and an appropriately chosen fixed setpoint will indicate deviation of the belt from its intended operating path.

In other embodiments, when a sensor remains operational but has drifted too far out of range, the system may treat that sensor as a failed sensor, and the other sensor may operate in a single sensor mode.

Figure 8A:
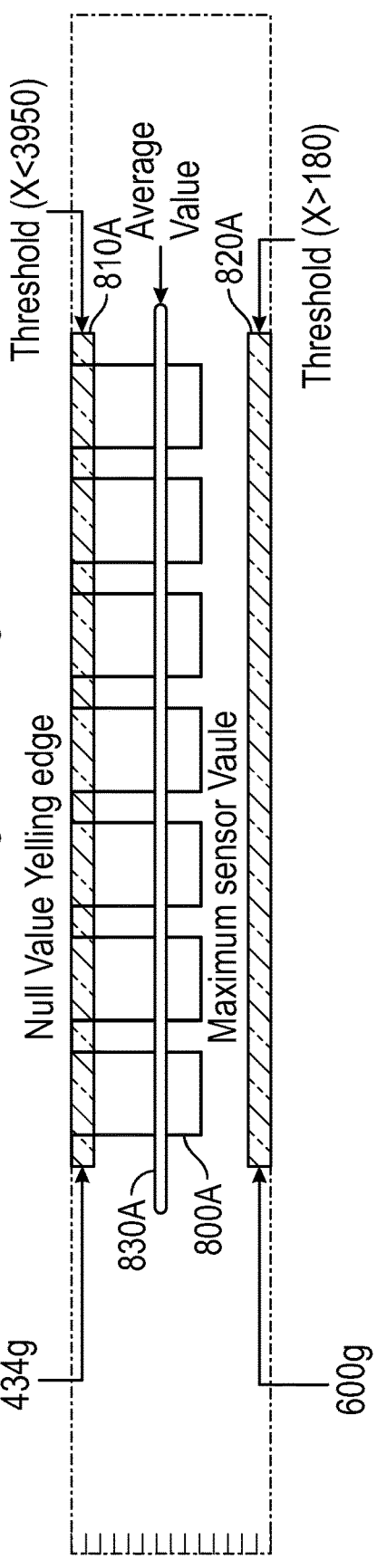
FIG. 8A illustrates the square wave output from a single ultrasonic transducer.

FIG. 8A illustrates an exemplary square waveform 800A output from a single ultrasonic transducer, not visible in FIG. 8A, in an exemplary embodiment of a conveyor system. As shown, the depicted waveform is inverted, and as described above with regard to FIGS. 7A-7C, the null output at the top 810A of the square waveform 800A associated with the falling edge wire edge set is not a true zero output.

In addition, as shown, the output value from the single transducer decreases from the null output until it reaches the bottom 820A of the square wave 800A. The bold solid line 830A drawn across the waveform, as annotated in FIG. 8A, represents the average value of the sensor's output.

Figure 8B:
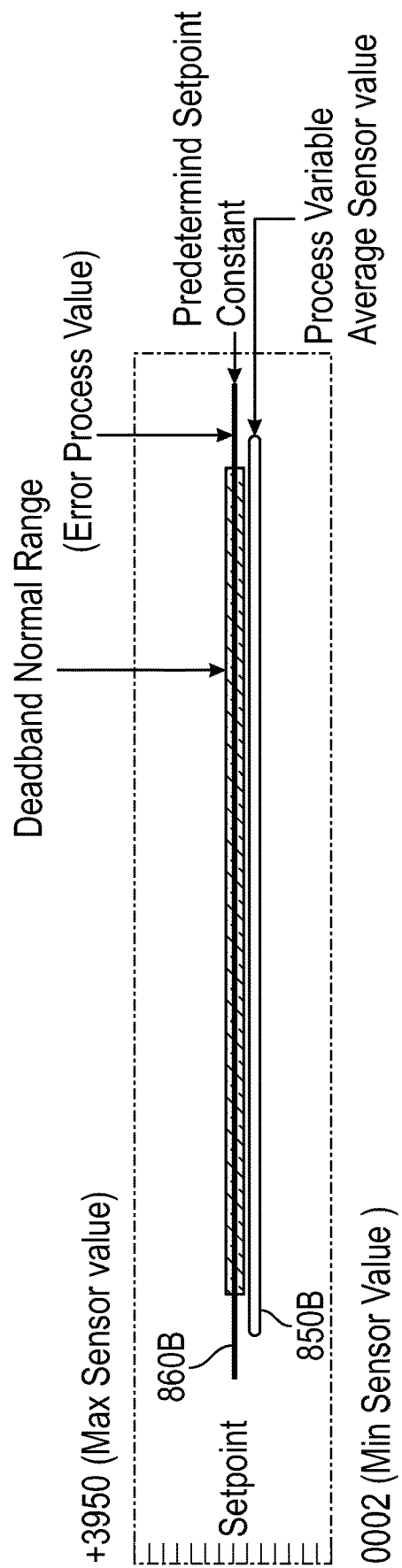
FIG. 8B illustrates a single sensor control model, an alternative operational mode.

FIG. 8B illustrates a Single Sensor Control Model, which is an alternative operational mode. In some embodiments, the conveyor system may switch from a default Dual Sensor Control Model, such as that depicted in and described above with regard to FIGS. 7A-7C. This may occur, for example, when one of either a first transducer unit or a second transducer unit constituting a pair of ultrasonic transducers units fails. Failure of a transducer unit may be detected, for example, when one of the transducer units has a true zero output. In such an embodiment, the average value 850A of the single sensor output may be compared to the setpoint 860B, which may correspond to, for example, the expected average value of the single sensor output when the belt is tracking correctly. In such an embodiment, when the differential between the setpoint 860B and the average value 850A of the single sensor output, the belt is deviating from its intended operating path. As in a dual sensor control model, a control system may utilize this information to steer the belt toward the belt's centerline, to a degree that is proportional to this differential.

Figure 9A:
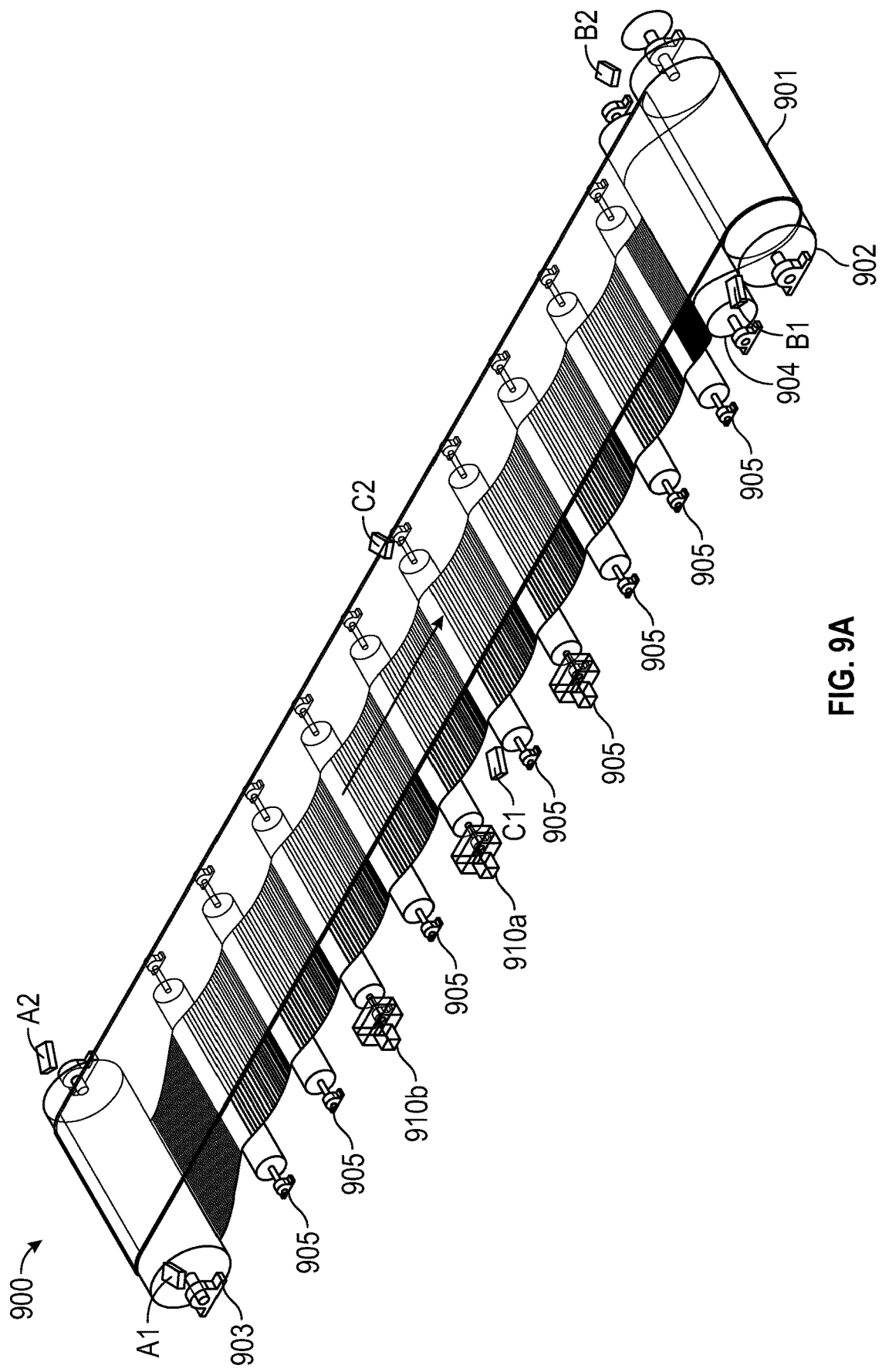
FIG. 9A illustrates a perspective view of a conveyor system.

FIG. 9A illustrates a perspective view of a conveyor system 900 in which the upper surface of balance-weave conveyor belt 901 has been rendered transparent, primarily in order to present more clearly all the elements utilized along the return portion, also referred to as the slack portion, of the system. As illustrated, system 900 comprises, among other elements, a head pulley 902, which may be operably connected to a motor (not shown), a snub roller 904, return rollers 905, adjustable bearing rollers 910, and tail pulley 903. The system 900 also includes three pairs of ultrasonic transducers. A first pair of ultrasonic transducers A1-A2 is mounted on either side of belt 901 near tail pulley 903. A second pair of ultrasonic transducers B1-B2 is mounted on either side of belt 901 near head pulley 902. A third pair of ultrasonic transducers C1-C2 is mounted on either side of belt 901 mid-span on the return side of system 900. Adjustable bearing rollers 910 may be used in some embodiments to correct errors in the operation of balance-weave conveyor belts such as belt 901.

In accordance with certain embodiments described herein, the data generated by the sensor pairs A1-A2, B1-B2, and C1-C2 may be used in real-time for the immediate purpose of positional correction. However, the the data generated by the sensor pairs A1-A2, B1-B2, and C1-C2 may also maintained in a database, along with a record of corrections that have been made. This is an invaluable diagnostic aid, as it can reveal trends in correction and underlying equipment flaws that may not otherwise be noticeable. The cycle time, equivalent to the time required for one complete revolution of the conveyor belt, in an industrial conveyor system can be inordinately long. In many embodiments, the time required for a single revolution of a belt may exceed several hours. This has real repercussions for the human side of diagnostics and maintenance in such systems.

One person, or even a team of individuals, cannot adequately monitor and document such trends in correction and underlying equipment flaws. As a result, in many conveyor systems, corrections are made on an "as needed" basis, without any real knowledge of the causal factors influencing such trends. By recording and storing data regarding the type, number, and location of corrections to belt tracking which are being made, important diagnoses can be made regarding the state of the system. In the absence of recording of such tracking and correction information, this information regarding the status of the conveyor system would otherwise be lost.

For example, if trending data revealed that a belt such as 901 in the system of FIG. 9A required 60% more left-hand correction when a given product is being run, an operator or administrator may be led to investigate how that product is being loaded. On the other hand, if belt 901 constantly requires 70% right-hand correction, regardless of the product being run, this information would be indicative of an undesirable mechanical state somewhere in the system. As more ultrasonic sensor pairs are added to the system, it becomes possible to more accurately geometrically isolate these problems, assigning probabilities to their origins based on mathematical modeling.

In an ideal conveyor machine, all of the rollers are perfectly cylindrical, level, parallel to one another, and square to the belt's centerline. In addition, all other surfaces that the belt travels across, such as skid plates, hearth rails, or other components are symmetrical, level, and have identical surface features. This ideal conveyor machine employs a perfectly square and uniform conveyor belt. Until some outside force was applied to such a perfect system, the belt would always travel in a straight line.

In practice, none of the above-described attributes of the ideal conveyor machine can be true. In analyzing the myriad vectors that could potentially affect the lateral position of our moving conveyor belt, reducing them to a most significant common denominator, a key variable would be reduced to surface area. The amount of change that any component can impart to our conveyor belt's position is directed to that component's contact area with the belt. This criterion alone usually is sufficient for the purposes of such an analysis.

A first metric for a probability matrix may be established by cataloging some reasonable approximations for the contact areas between the conveyor belt and all of the surfaces with which it mates. Next, at least three constant measurement points may be used for the conveyor's lateral position. In one particular embodiment, two measurements are taken at opposing ends of the system, and a third is taken somewhere between these ends, such as at a mid-point on the return side. A simple grid matrix is established with fields for locality, that is, the area between two adjacent sensor pairs, and for the previously catalogued contact areas within that locality, along with their associated mating surfaces.

As belt 901 travels through its course in a system such as the sensor system 900 of FIG. 9A, measurements are continually recorded by the three ultrasonic transducer pairs A1-A2, B1-B2, and C1-C2, at the three respective reference positions identified above. These measurements may be stored in independent registries in a computing device, which may be local or may be remotely connected to the sensor system via any suitable communications link. Periodically, such as at a predetermined interval, the contents of each of these registries are averaged to identify trends. Such trend information may be used to identify the general locality of potential malfunction/maladjustment within a system such as 900 in FIG. 9A, and an associated probability matrix may be used to identify the probability of potential causes within that area.

FIG. 9B illustrates a top view of the conveyor system 900 depicted in FIG. 9A, with the top portion of balance-weave conveyor belt 901 again having been rendered transparent to illustrate the belt as it travels along the return portion of the system of FIG. 9B. Ten rollers, which may be evenly spaced from one another, support the length of belt between the snub roller 904, positioned adjacent the head pulley, and the tail pulley 903. Two of these rollers may be adjustable bearing rollers 910, while the other eight are generic return rollers 905, although in other embodiments, other numbers of adjustable bearing rollers 910 may be used.

In some systems, positional correction of the belt in a conveyor system is accomplished by adjusting the angular orientation of one or more rollers relative to a conveyor system's longitudinal centerline. In most cases, these adjustments are made to rollers on the slack side of the conveyor system. However, in practice, such adjustments can be made to any roller. In systems that rely on slide-plates in lieu of rollers, imparting a positive or negative vertical displacement to one side of one or more sections of the slide plates may control the belt's position. In this case, gravity provides the impetus for lateral motion and the belt's lateral position is biased towards the lowest elevation.

Collected sensor data may be compared to a predetermined setpoint by a controller. Subsequently, if an error is detected, a control output signal may be issued that is proportionate to the error. In some embodiments, such roller adjustments are made with specialized, actuated, adjustable bearing roller assemblies. These assemblies may be designed to move a single roller a finite distance within a given span of motion and report their position back to the controller.

In contrast to other actuated linear motion assemblies, all of the motion and power elements of these adjustable bearing roller assemblies may be self-contained in a single, compact unit. This unit may be dimensioned to allow for direct drop-in to an existing system. For example, the unit may share the same center height and general footprint for commonplace industrial self-aligning bearing assemblies.

The adjustable bearing roller assemblies may be modular, easily reconfigurable. The adjustable bearing roller assemblies may be designed such that they cannot be damaged by over-travel. Such adjustable bearing roller assemblies may be used both by original equipment designers as well as those seeking to retrofit/modernize existing systems. In some embodiments, the adjustable bearing roller assemblies employ a changeable eccentric cam and an interchangeable, also referred to as configurable, cam socket, instead of a screw or a piston. The adjustable bearing roller assemblies can be mated with any appropriately sized and suitable source of power, such as a rotary actuator, electric motor, pneumatics, or hydraulics.

Figure 10A:
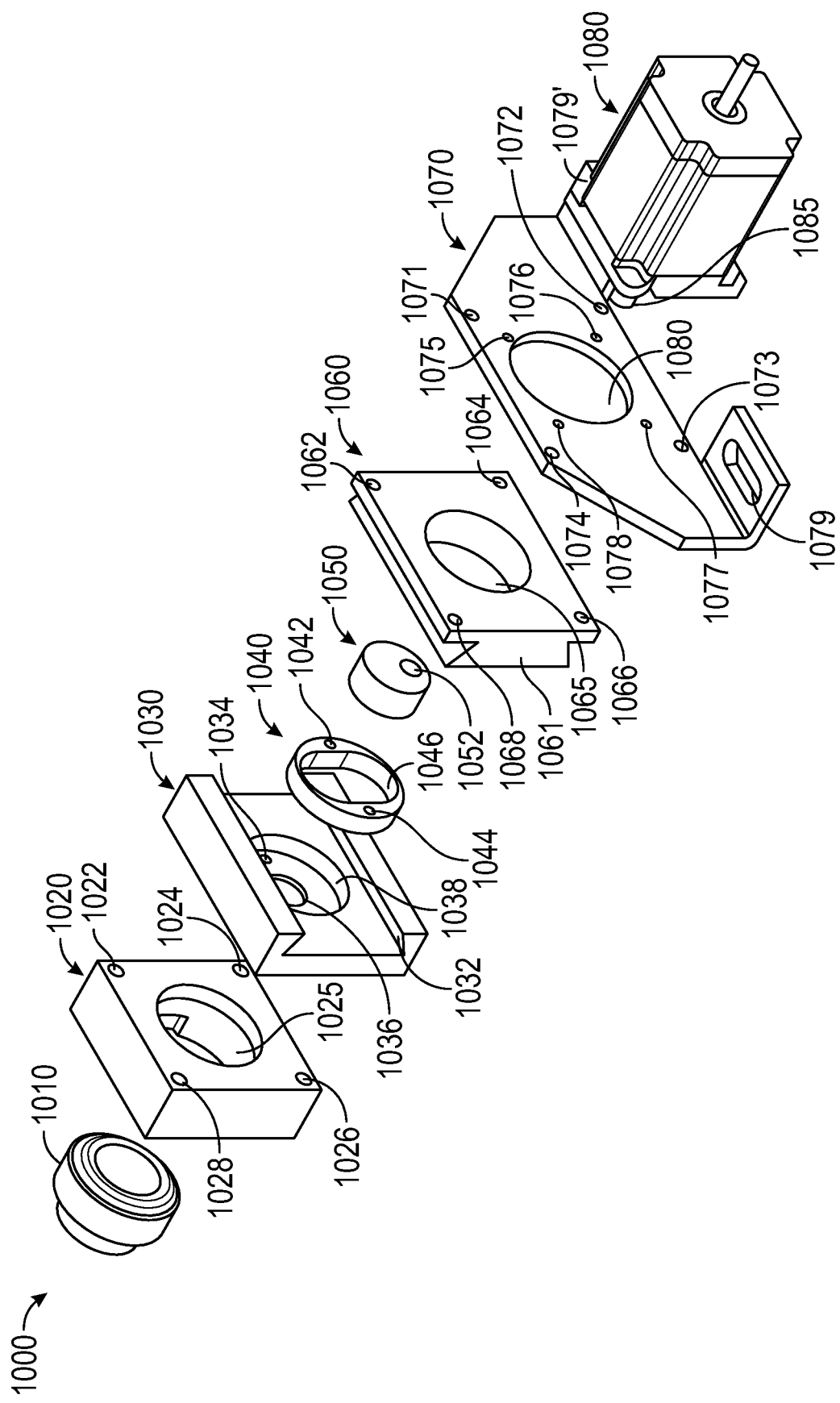
FIG. 10A illustrates an exploded view of a motorized adjustable bearing sub-assembly used to steer an adjustable bearing roller assembly, such as the adjustable bearing roller assemblies of FIGS. 9A and 9B.
Figure 10B:
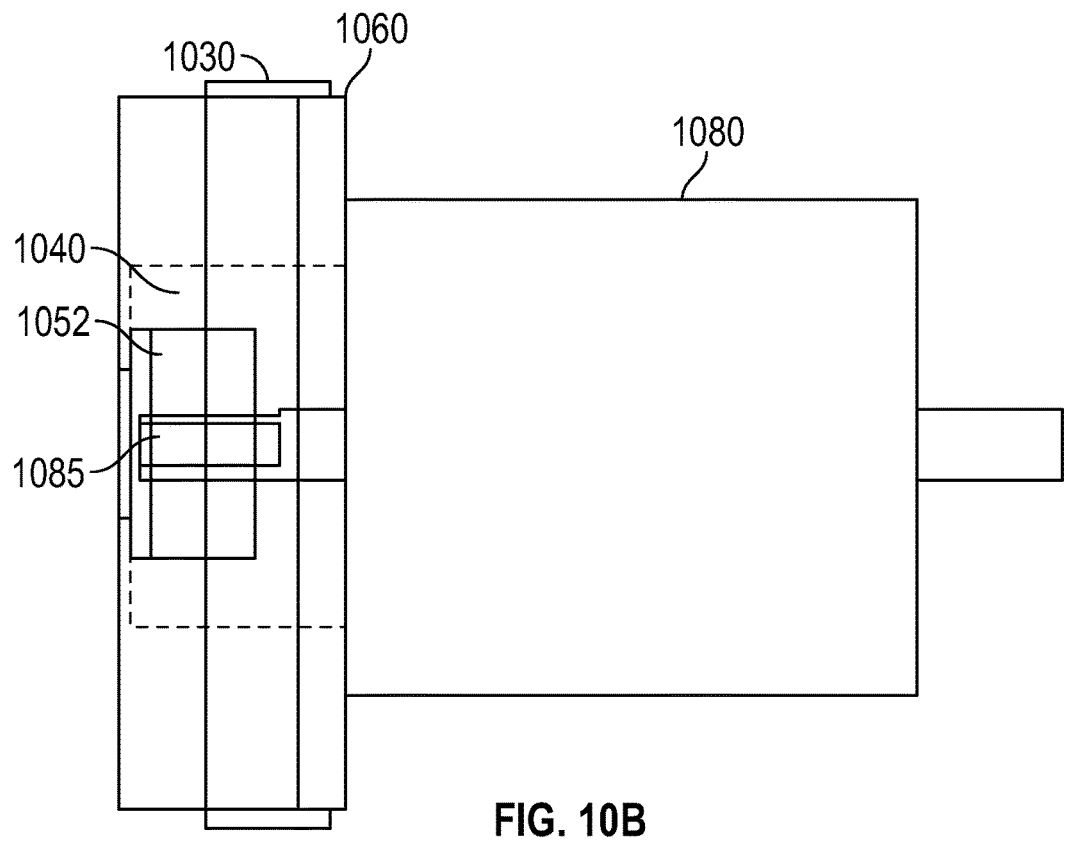
FIG. 10B illustrates a top view of an assembled version of the motorized adjustable bearing sub-assembly depicted in FIG. 10A.
Figure 10C:
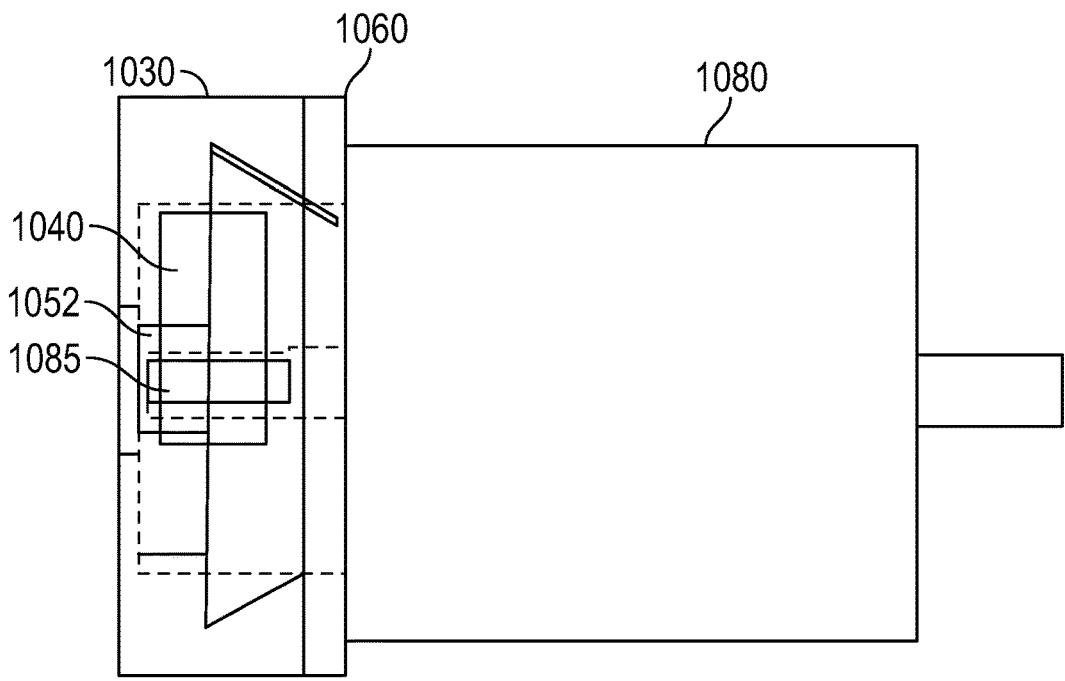
FIG. 10C illustrates a side view of an assembled version of the motorized adjustable bearing sub-assembly depicted in FIG. 10A.
Figure 10D:
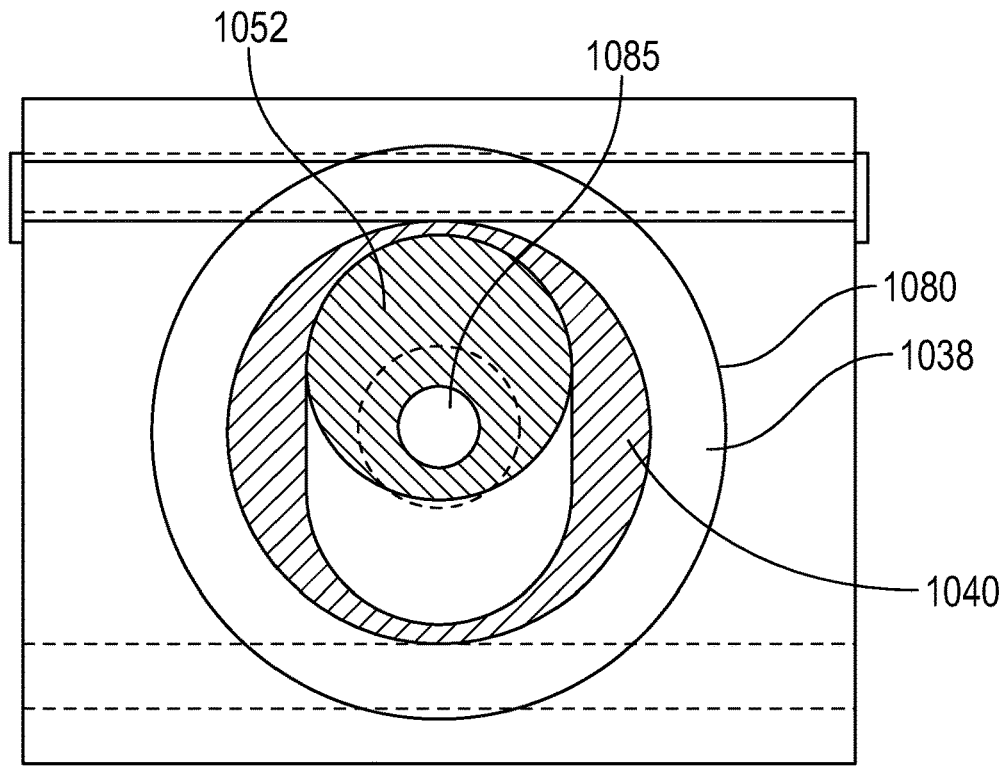
FIG. 10D illustrates a front view of an assembled version of the motorized adjustable bearing sub-assembly depicted in FIG. 10A.
Figure 10E:
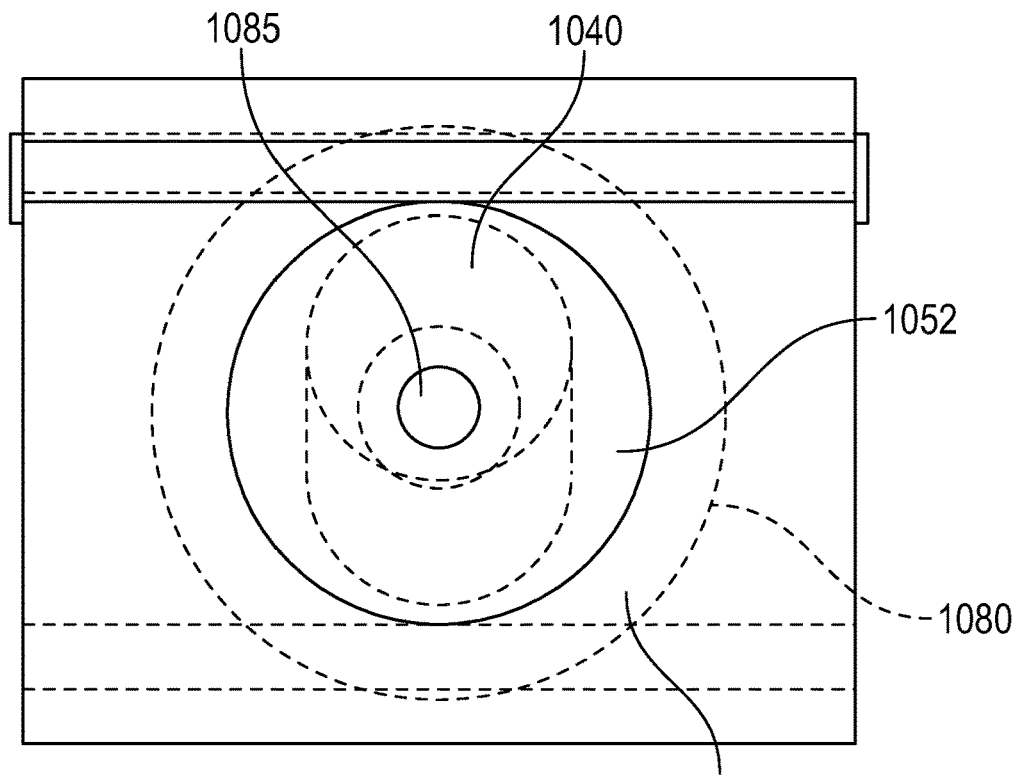
FIG. 10E illustrates a back view of an assembled version of the motorized adjustable bearing sub-assembly depicted in FIG. 10A.

FIG. 10A illustrates an exploded view of a motorized adjustable bearing sub-assembly 1000 used to steer an adjustable bearing roller assembly, such as first and second adjustable bearing roller assemblies 910a and 910b shown above in FIGS. 9A and 9B. FIG. 10B illustrates a top view of an assembled version of the motorized adjustable bearing sub-assembly 1000 described above with respect to and depicted in FIG. 10A, spherical OD bearing cartridge 1010 not visible in FIGS. 10B-10E. FIG. 10C illustrates a side view of an assembled version of the motorized adjustable bearing sub-assembly 1000 described above with respect to and depicted in FIG. 10A. FIG. 10D illustrates a front view of an assembled version of the motorized adjustable bearing sub-assembly 1000 described above with respect to and depicted in FIG. 10A. FIG. 10E illustrates a back view of an assembled version of the motorized adjustable bearing sub-assembly 1000 described above with respect to and depicted in FIG. 10A.

The roller body portion (not visible in FIG. 10A) of a fully assembled adjustable bearing roller is cylindrical in shape, longer than the conveyor belt is wide, and has two ends. The distal end of the roller body portion is in mechanical communication with a fixed pivot point (as shown above in FIGS. 9A and 9B) via an axle that extends outward from a crimped roller bearing (not shown) circumferentially disposed about the axle at the distal end of the roller body. The proximal end of the roller body portion is in mechanical communication with the adjustable bearing sub-assembly 1000 described below.

In a fully assembled adjustable bearing roller assembly, the spherical OD bearing cartridge 1010 is seated within the interior portion of an interchangeable, also referred to as configurable, bearing retainer 1020, the proximal end of the roller body (not visible in FIG. 10A) being mechanically connected to the spherical bearing cartridge 1010. As illustrated, the body of the bearing retainer 1020 has an outer planar surface, on the side opposite to that through which the spherical OD bearing cartridge is introduced and seated, that is mechanically secured with screws or other fasteners, not visible in FIG. 10A, guided through holes 1022, 1024, 1026, 1028 to the back side of a moveable plane or movable plate 1030.

As illustrated, a dovetail groove 1032 has been machined in the interior portion of moveable plane 1030. Also as illustrated, a centrally disposed circular aperture 1038 has been made in the body of moveable plate 1030. An interchangeable, also referred to as configurable, eccentric socket 1040, the outer diameter of which is circular but the inner portion of which has been milled to assume an elliptical or obround shape, is dimensioned to be mechanically affixed to the inner surface of partially occluded circular aperture 1038 via screws or other suitable fasteners, not shown, inserted through holes 1042 and 1044 of cam socket 1040 and secured in threaded holes 1034 and 1036 of moveable plane 1030.

Interchangeable eccentric cam 1050, circular in cross-section, has an off-center hole 1052. In some embodiments, the hole 1052 may be dimensioned to accommodate a camshaft 1085 from NEMA motor 1080. When adjustable bearing sub-assembly 1000 is fully assembled, the movement of eccentric cam 1052, when rotated to the left or right due to the rotation of the camshaft 1085 of motor 1080, translates moveable plane 1030 in a desired direction. This translation can be used to steer a belt to centered tracking.

Fixed plane 1060, as illustrated, has a dovetail projection 1061 dimensioned to mate with dovetail groove 1032 of moveable plane 1030. The opposite planar surface of fixed plane 1060 is mechanically affixed, such as via screws or another suitable fastener not visible in FIG. 10A, secured in threaded holes 1071, 1072, 1073, and 1074 to interchangeable or configurable motor mount and foot plate 1070. NEMA motor 1080 is secured to motor mount and foot plate 1070, via screws or another suitable fastener not visible in FIG. 10A, secured in threaded holes 1075, 1076, 1077, and 1078. As shown, two countersunk slots 1079 and 1079' have been made in foot projections of element 1070, which allows the proximal end of each adjustable bearing roller assembly to be mounted squarely with respect to the centerline of a system's belt.

Figure 11A:
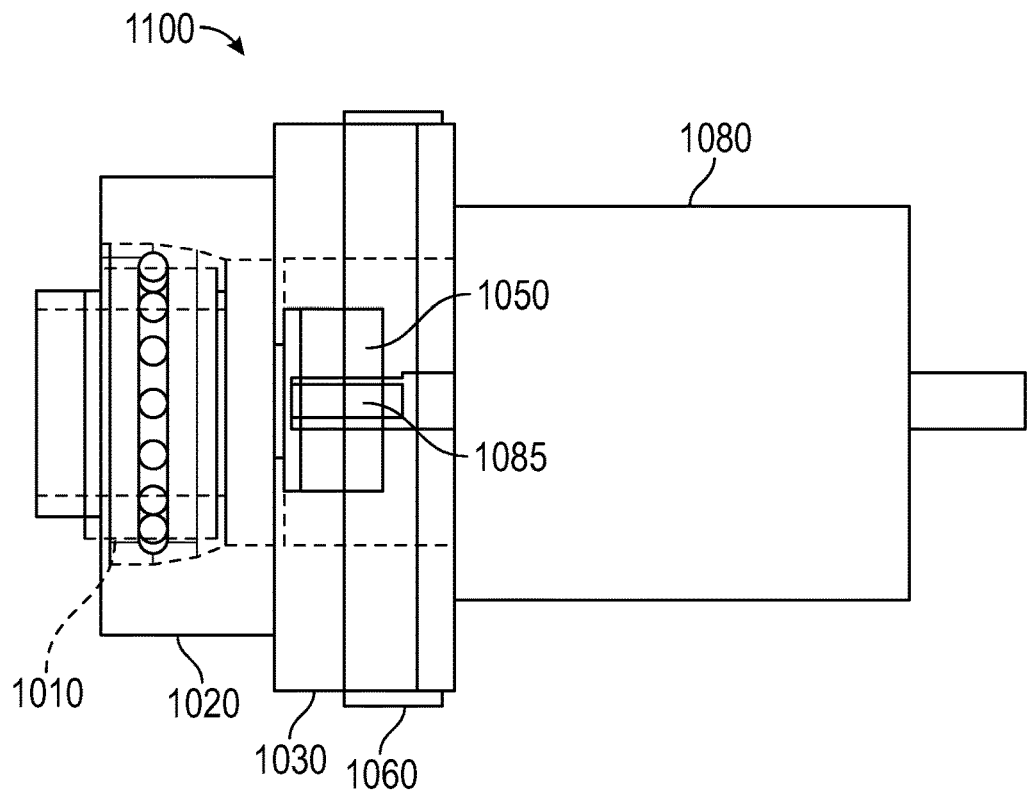
FIG. 11A illustrates a cutaway top view of a motorized adjustable bearing sub-assembly with a spherical OD bearing cartridge seated in an interchangeable bearing retainer 1020.
Figure 11B:
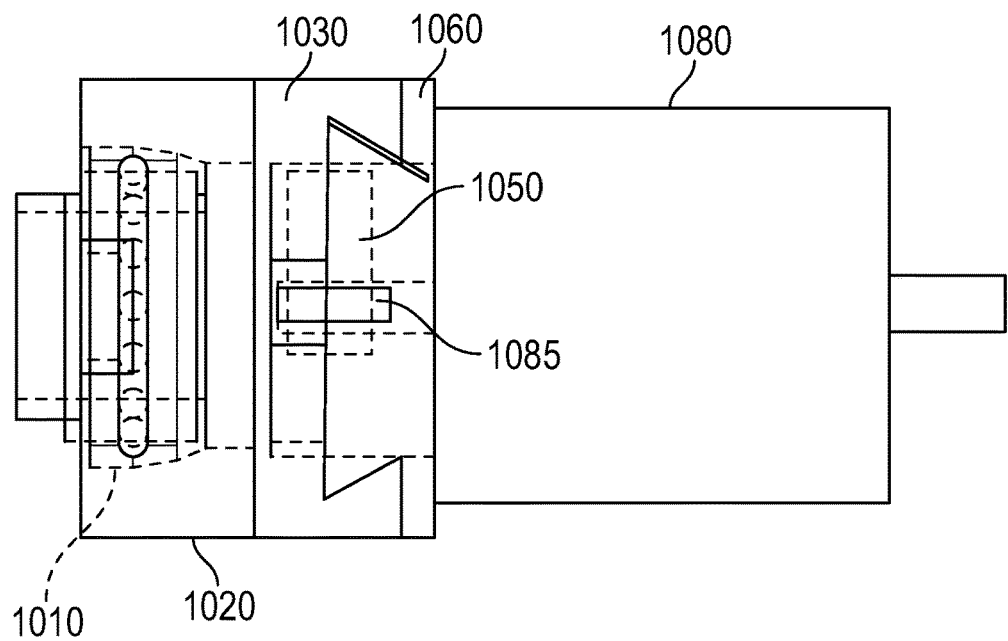
FIG. 11B illustrates a side view of the motorized adjustable bearing roller sub-assembly depicted in FIG. 11A.
Figure 11C:
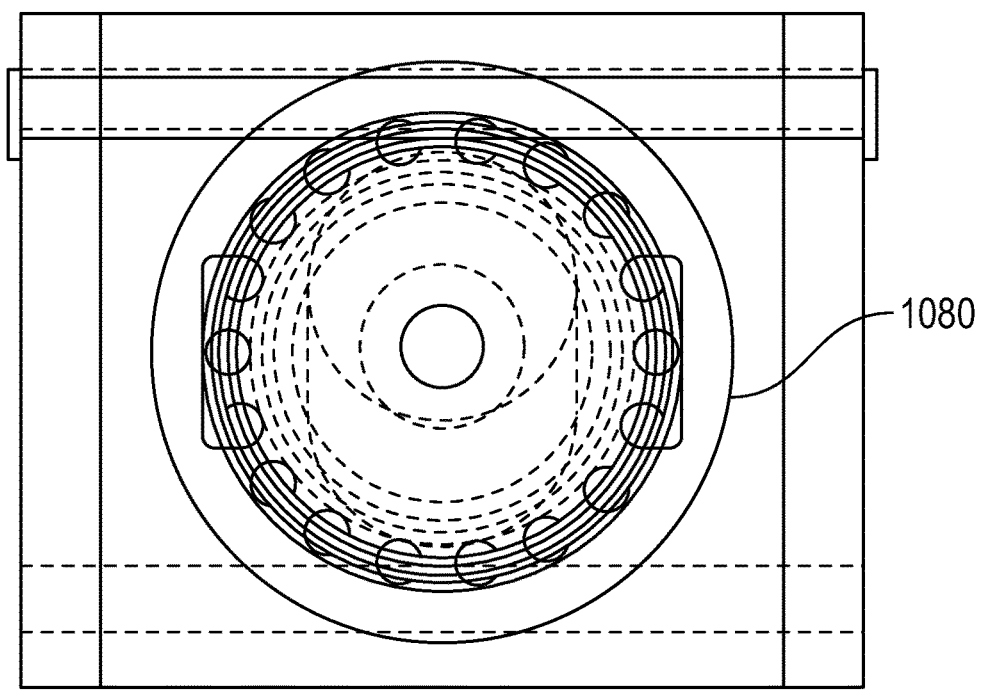
FIG. 11C illustrates a front view of the motorized adjustable bearing roller sub-assembly depicted in FIG. 11A.
Figure 11D:
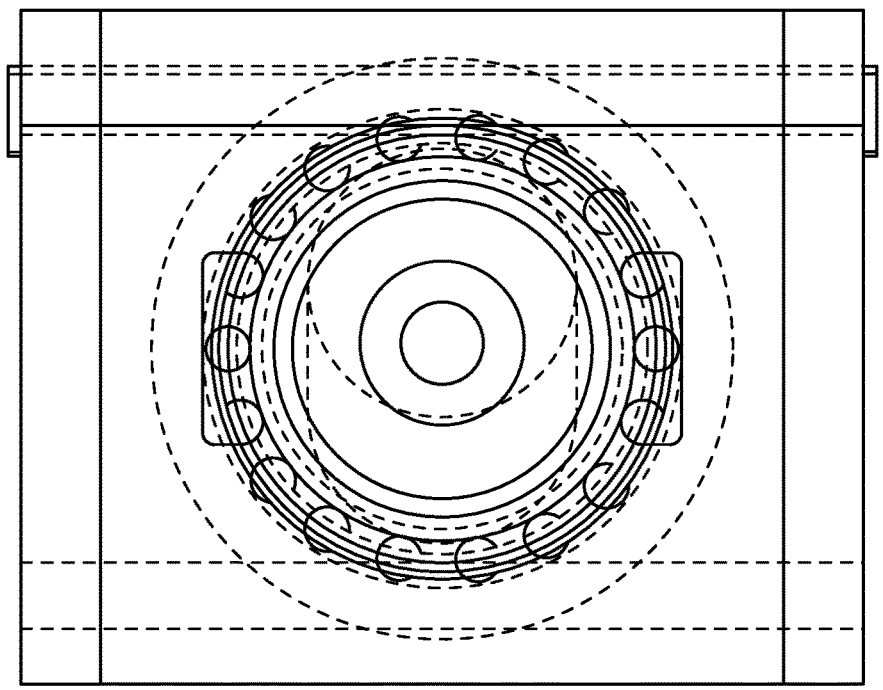
FIG. 11D illustrates a back view of the motorized adjustable bearing roller sub-assembly depicted in FIG. 11A.

FIG. 11A illustrates a cutaway top view of a motorized adjustable bearing sub-assembly 1100 with spherical OD bearing cartridge 1010 seated in interchangeable bearing retainer 1020. Bearing retainer 1020, as shown, is affixed to moveable plate 1030, which is mated to fixed plane 1060. As illustrated, eccentric cam 1050, which is connected to camshaft 1085 of NEMA motor 1080, is actuated in a neutral/centered position. FIG. 11B illustrates a side view of the motorized adjustable bearing roller sub-assembly 1100 described above with respect to and depicted in FIG. 11A. FIG. 11C illustrates a front view of the motorized adjustable bearing roller sub-assembly 1100 described above with respect to and depicted in FIG. 11A. FIG. 11D illustrates a back view of the motorized adjustable bearing roller sub-assembly 1100 described above with respect to and depicted in FIG. 11A.

Figure 12A:
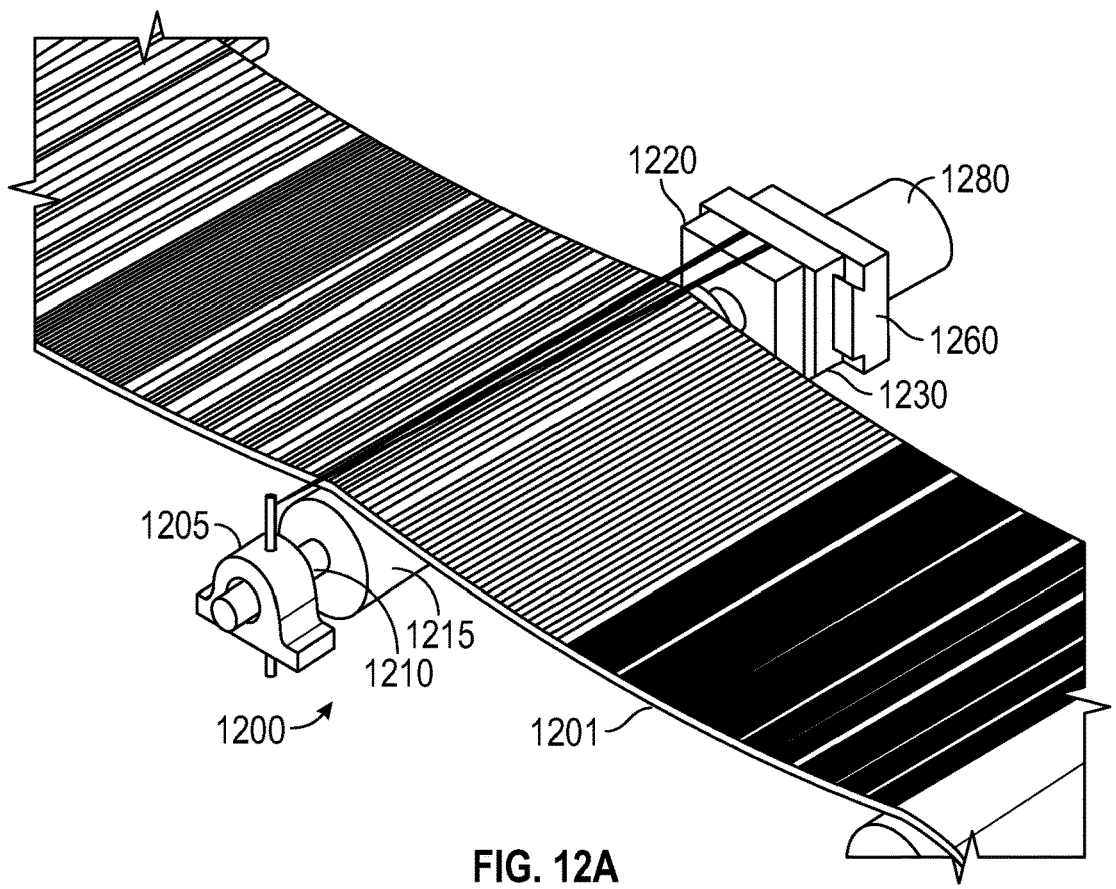
FIG. 12A illustrates an isolated view of an adjustable bearing roller positioned beneath a balanced weave belt on the return side of a system such as that depicted in FIG. 9A.

FIG. 12A illustrates an isolated view of an adjustable bearing roller 1200 positioned beneath balanced weave belt 1201 on the return side of a system such as that depicted in FIG. 9A. As depicted, moveable plate 1230 has been translated, also referred to as actuated, to the left of a centered, or perpendicular, orientation of the longitudinal axis of adjustable bearing roller 1200 relative to the centerline of belt 1201 shown in FIG. 12A.

Figure 12B:
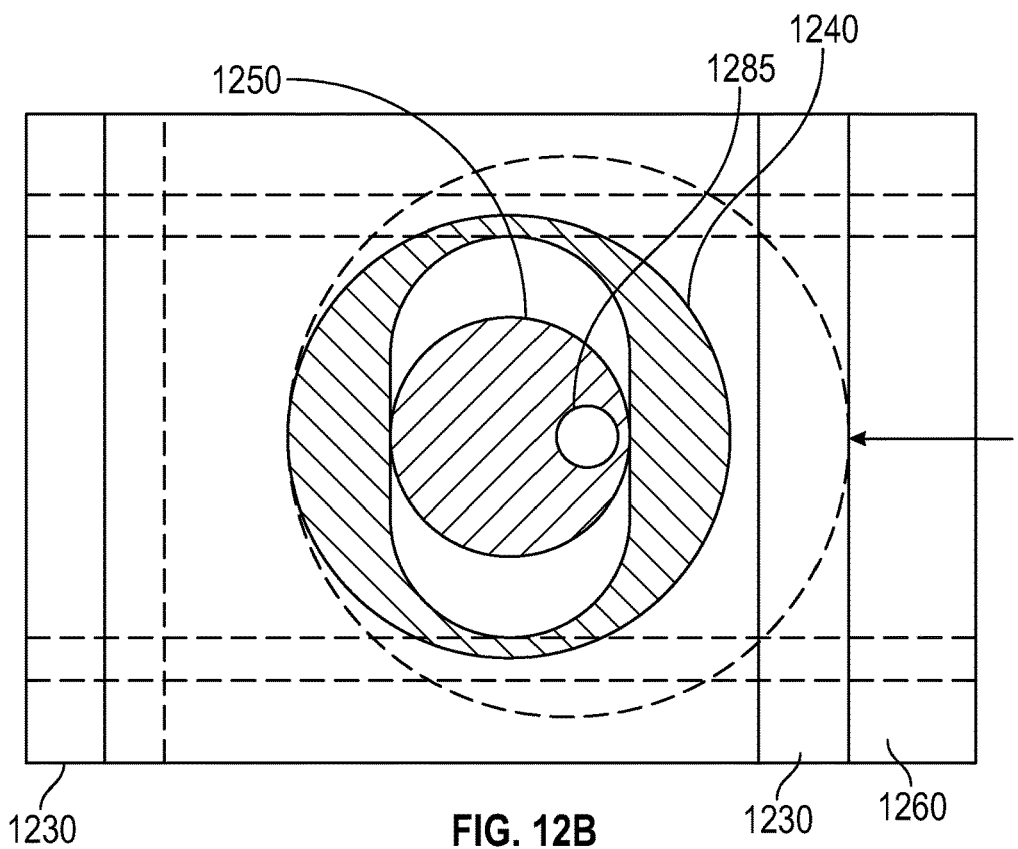
FIG. 12B illustrates a detail view of the relative positions of certain mechanical components of adjustable bearing roller assembly that have resulted in the ACTUATED LEFT position of adjustable bearing roller depicted in FIG. 12A.

FIG. 12B illustrates a detail view of the relative positions of the relevant mechanical components of adjustable bearing roller assembly 1200 that have resulted in the ACTUATED LEFT position of adjustable bearing roller 1200 relative to belt 1201 described above and depicted in FIG. 12A. More specifically, interchangeable eccentric socket 1240, which is mechanically affixed to moveable plate 1230, has translated moveable plate 1230 left of center due to the rotation of eccentric cam 1250 in eccentric socket 1240 as a result of multiple clockwise revolutions of camshaft 1285 of NEMA motor 1280 in response to one or more control signals from a controller that has received signals from a pair of ultrasonic transducers units, that belt 1201 is mistracking to the right. The controller is not depicted in FIG. 12B, but the operation of such a controller is described below with respect to the flowcharts in FIGS. 13-15.

Figure 12C:
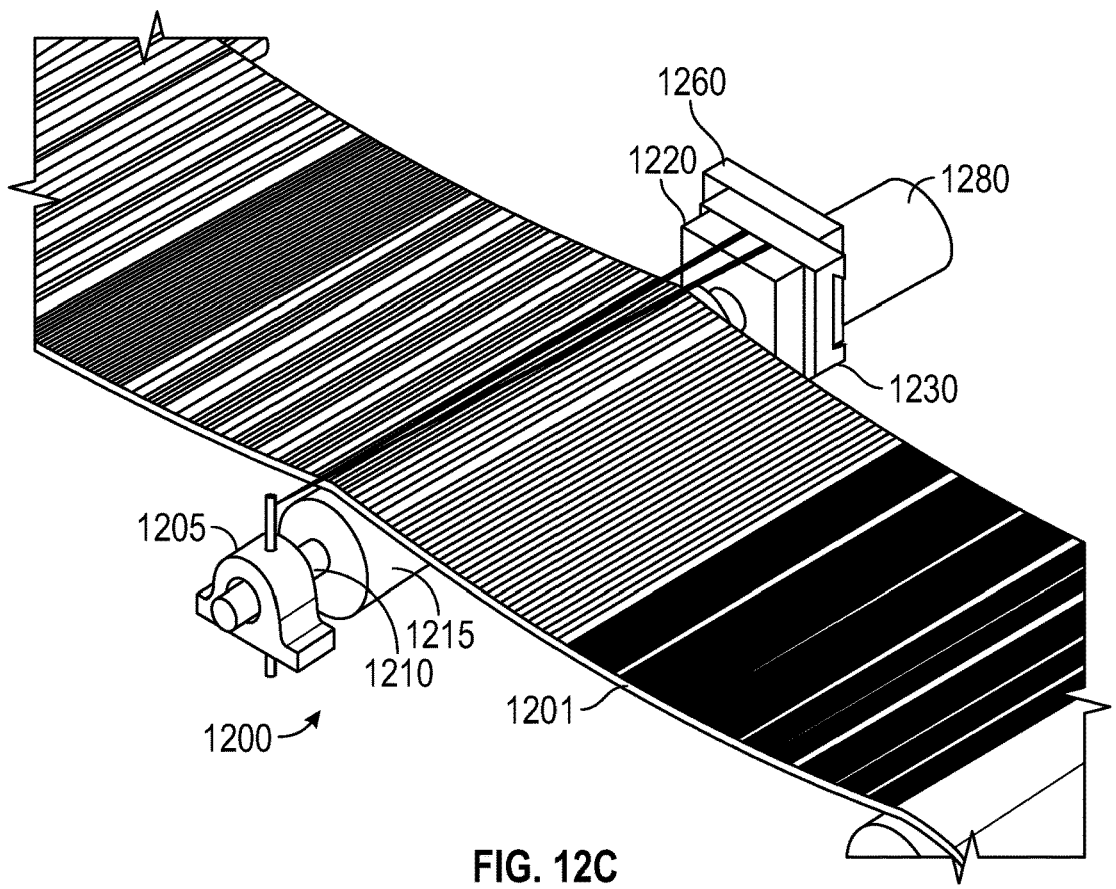
FIG. 12C illustrates an isolated view of an adjustable bearing roller positioned beneath balanced weave belt on the return side of a system such as that depicted in FIG. 9A.

FIG. 12C illustrates an isolated view of an adjustable bearing roller 1200 positioned beneath balanced weave belt 1201 on the return side of a system such as that depicted in FIG. 9A. As depicted, moveable plate 1230 has been actuated to the right of a centered, or perpendicular, orientation of the longitudinal axis of adjustable bearing roller 1200 by lateral translation relative to the centerline of belt 1201 shown in FIG. 12C.

FIG. 12C illustrates an isolated view of an adjustable bearing roller 1200 positioned beneath balanced weave belt 1201 on the return side of a system such as that depicted in FIG. 9A. More specifically, interchangeable eccentric socket 1240, which is mechanically affixed to moveable plate 1230, has translated moveable plate 1230 right of center. This translation is due to the rotation of eccentric cam 1250 in eccentric socket 1240 as a result of multiple counter-clockwise revolutions of camshaft 1285 of NEMA motor 1280 in response to control(s) from a controller that has received signals from a pair of ultrasonic transducers that belt 1201 is mistracking to the left. The controller is not depicted in FIG. 12C, but the operation of such a controller is described below with respect to the flowcharts in FIGS. 13-15.

Figure 12D:
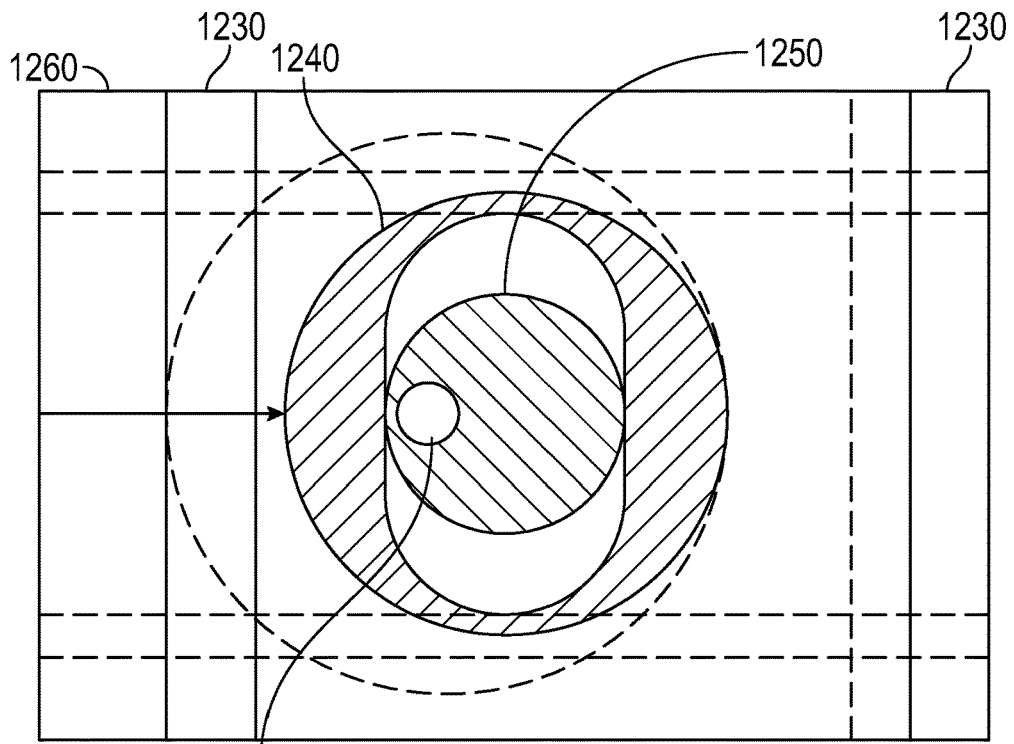
FIG. 12D illustrates a detail view of the relative positions of certain mechanical components of adjustable bearing roller assembly that have resulted in the ACTUATED RIGHT position of adjustable bearing roller depicted in FIG. 12C.
Figure 12E:
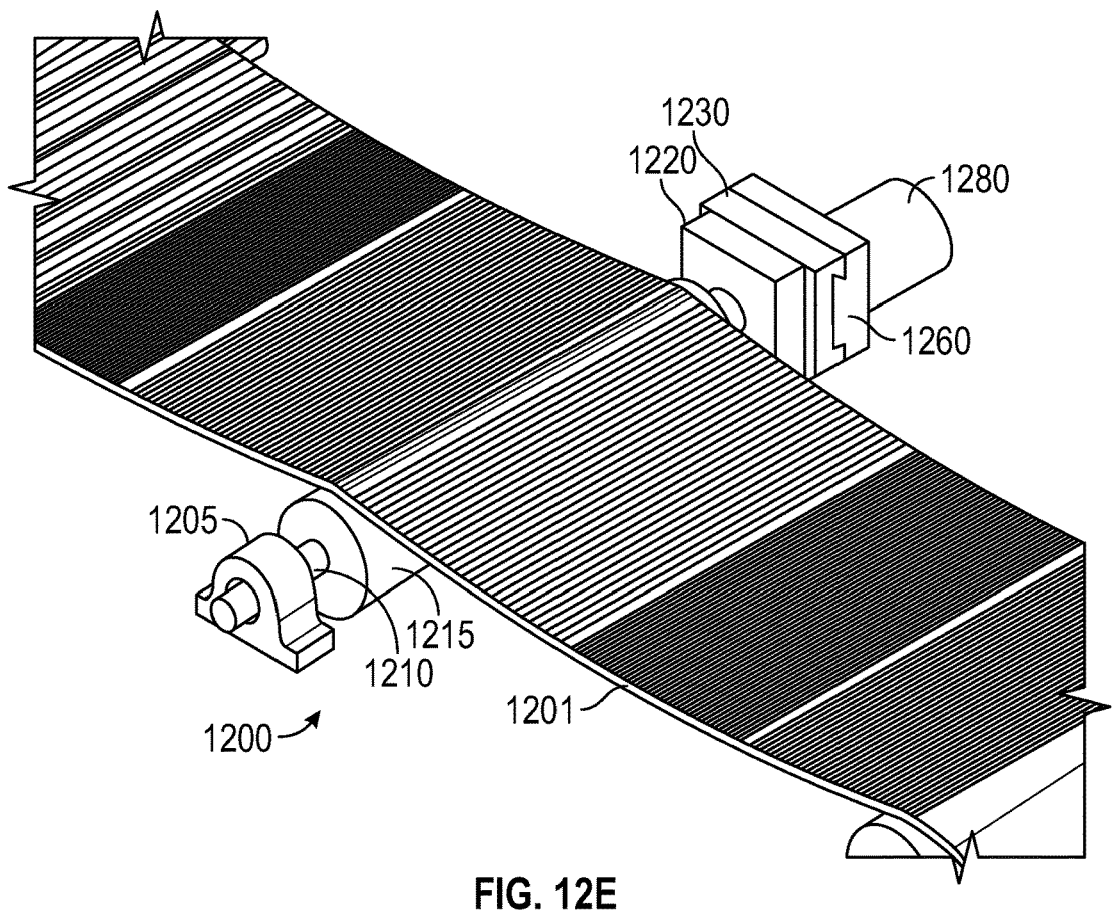
FIG. 12E illustrates an isolated view of an adjustable bearing roller positioned beneath balanced weave belt on the return side of a system such as that depicted in FIG. 9A.

FIG. 12E illustrates an isolated view of an adjustable bearing roller 1200 positioned beneath balanced weave belt 1201 on the return side of a system such as that depicted in FIG. 9A. As depicted, moveable plate 1230 has not been translated, also referred to as actuated, to either the left or right of a centered, or perpendicular, orientation of adjustable bearing roller 1200 relative to the centerline of belt 1201 shown in FIG. 12D.

Figure 12F:
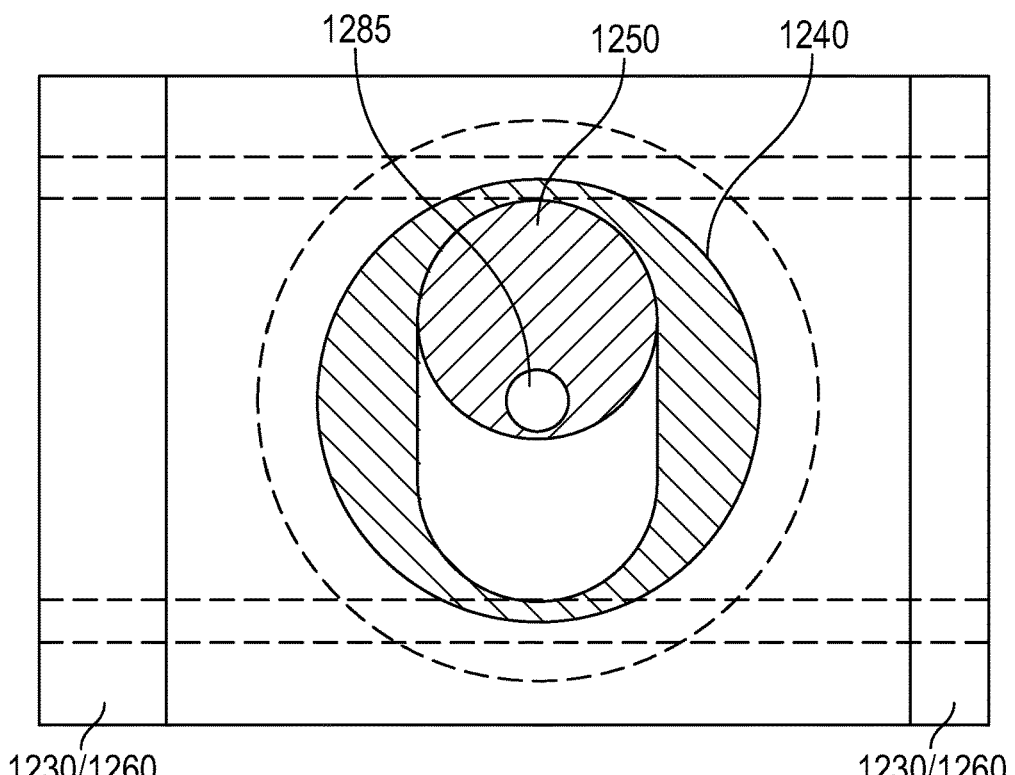
FIG. 12F illustrates a detail view of the relative positions of the relevant mechanical components of adjustable bearing roller assembly that have resulted in the NEUTRAL/CENTERED position of adjustable bearing roller relative to belt depicted in FIG. 12A.

FIG. 12F illustrates a detail view of the relative positions of the relevant mechanical components of adjustable bearing roller assembly 1200 that have resulted in the NEUTRAL/CENTERED position of adjustable bearing roller 1200 relative to belt 1201 described above and depicted in FIG. 12A. More specifically, fixed plane 1060 and moveable plane 1030, which have substantially identical heights and widths, are, as shown, in precise overlapping lateral alignment.

Figure 13A:
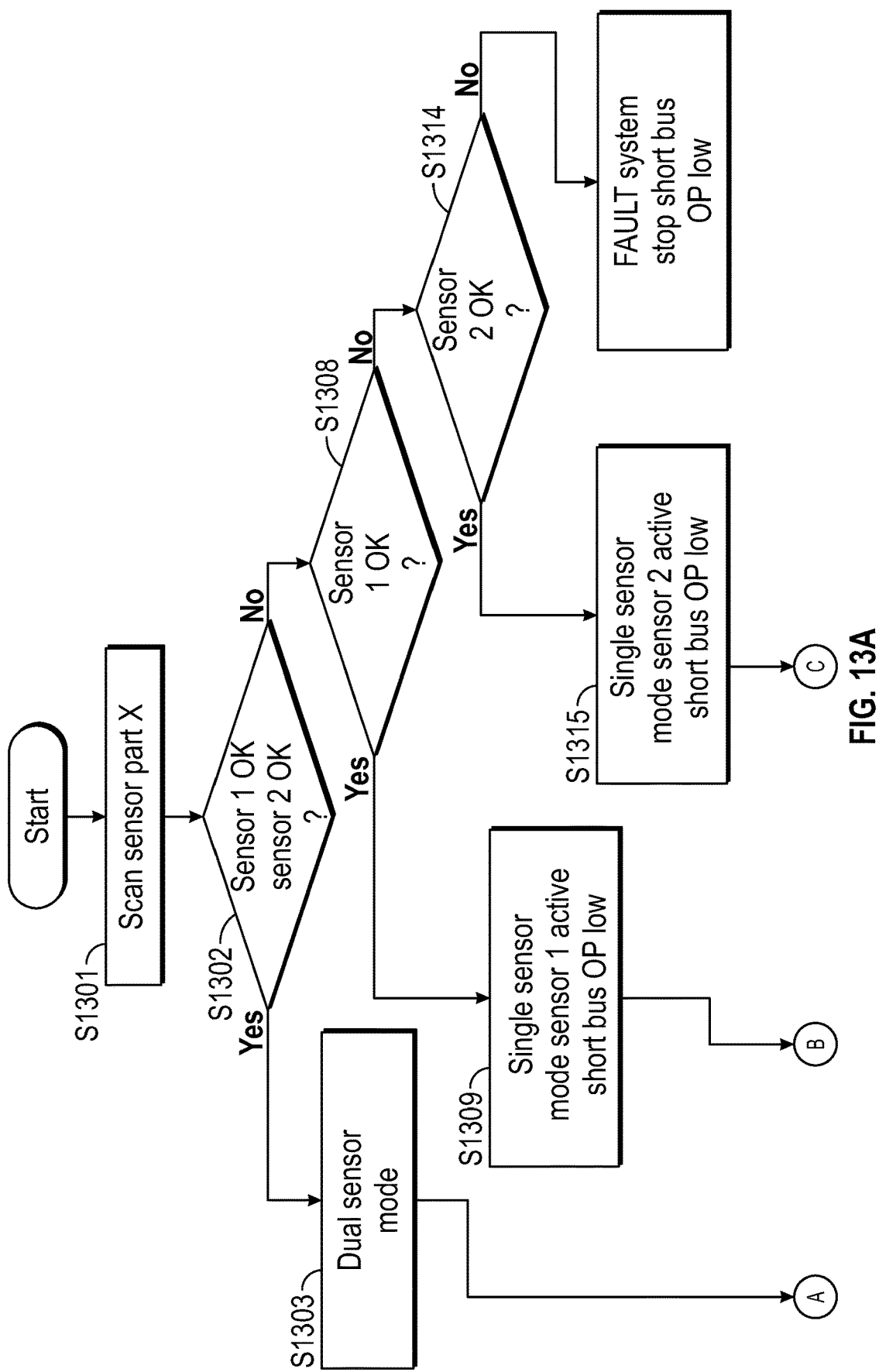
FIGS. 13A, 13B, and 13C illustrate a basic flowchart for a control loop feedback mechanism for controlling each ultrasonic transducer sensor pair.
Figure 13B:
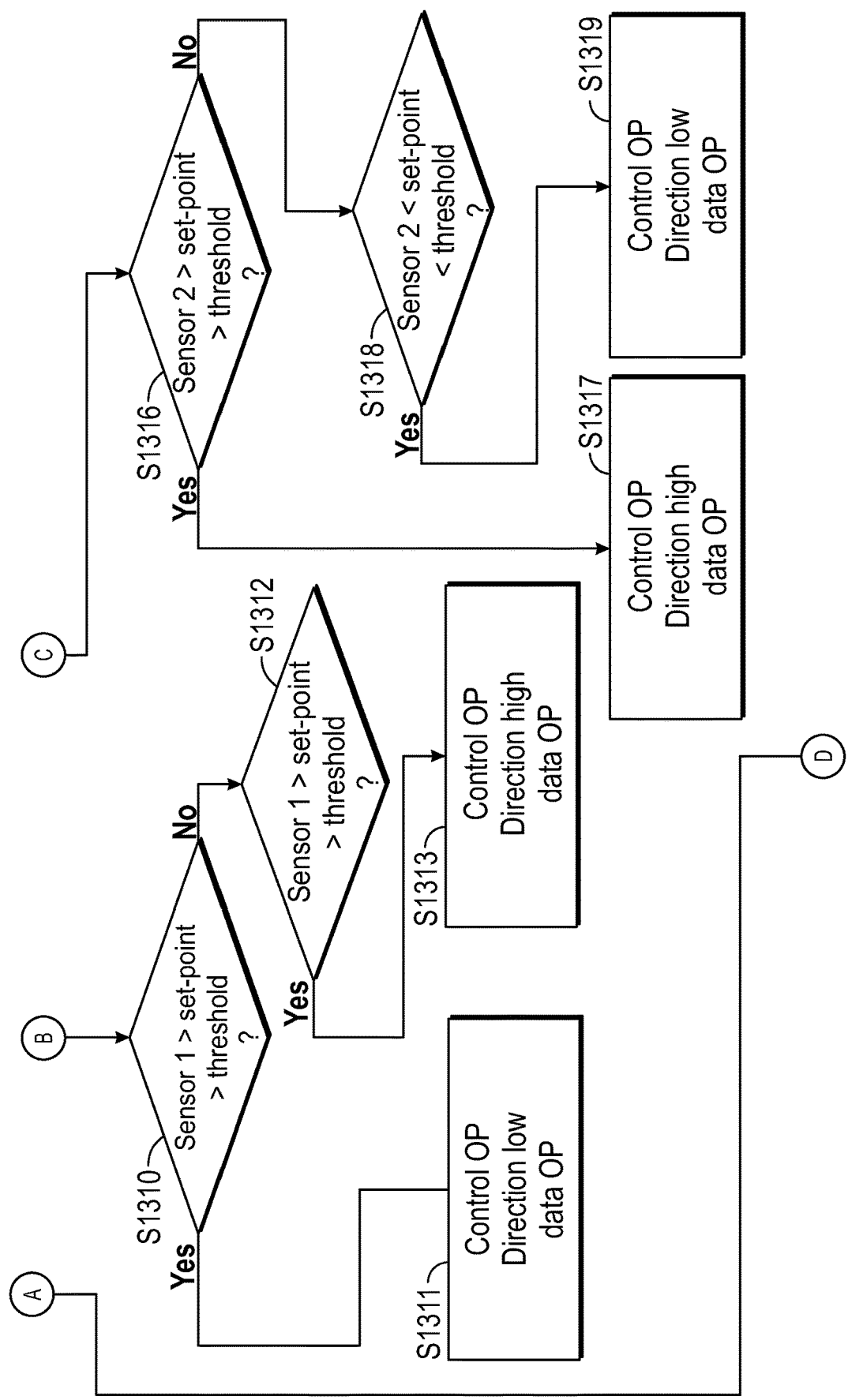
Figure 13C:
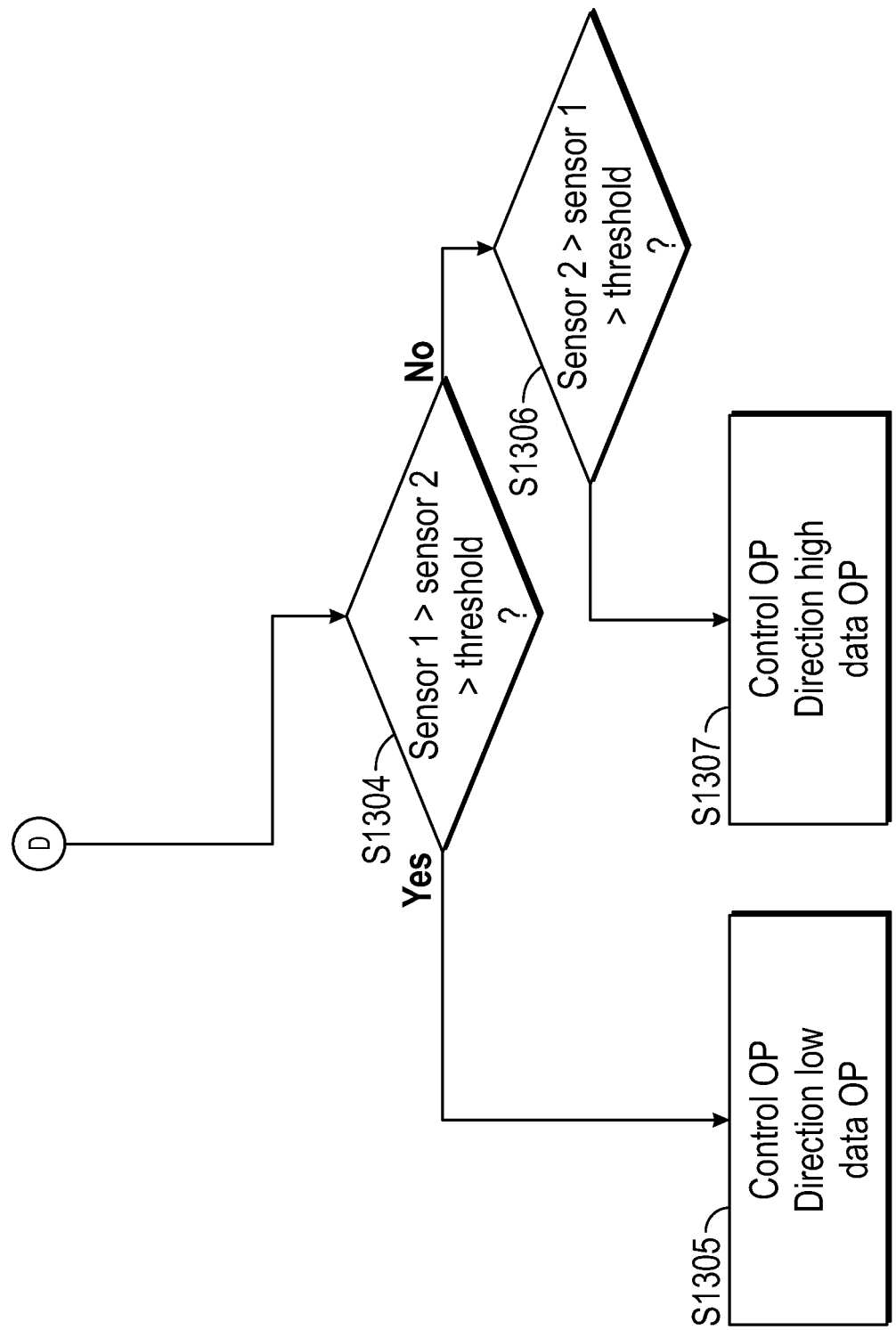

FIGS. 13A through 13C illustrate a basic flowchart for a control loop feedback mechanism for controlling each ultrasonic transducer sensor pair. In some embodiments, the control of a sensor pair may include controlling individual ultrasonic transducers, in the event that one transducer in a given sensor pair is offline, due to failure or other reasons. The resulting control system may make use of a proportional-integral-derivative (PID)-based algorithm, or any other suitable algorithmic approach. As described above with regard to FIG. 7C, in some embodiments the default operating mode for each sensor pair is a dual sensor mode. In the event of the failure of one sensor in a given sensor pair, however, the operating mode may switch to single sensor operation, and a setpoint is relied upon to ensure that output signals (OP) to one or more of the adjustable bearing roller assemblies reliably steer(s) the belt to centered tracking. This setpoint may be previously defined, such as during the initial installation of the tracking system.

At stage 1301, each sensor pair is scanned to determine whether each of Sensor 1 and Sensor 2 is functioning properly. At stage 1302 the control system makes a determination as to whether both Sensor 1 and Sensor 2 are functioning properly. If so, the process moves to a stage 1303. If one or both of Sensor 1 and 2 are not functioning properly, the control system moves to a stage 1308, where the system begins to move to a single-sensor mode.

At stage 1303, the control system continues to operate in dual sensor mode, where signals from both sensors are used to make a determination as to whether the system is operating as intended, with the conveyor belt moving along the intended path.

At stage 1304, a determination is made if the value of the signal from Sensor 1 is greater than the signal from Sensor 2. As discussed above, the value of the signal may be an average value of the signal from the sensors over a period of time, although other calculations may be used as well. This determination may be made periodically. In some embodiments, the determination at stage 1304 may be whether the value of the signal from Sensor 1 exceeds the value of the signal from Sensor 2 by a given threshold, or by a certain percentage. If so, the system moves to a stage 1305. If not, the system moves to a stage 1306.

In some embodiments, a window of time containing certain number of square wave peaks may be recorded and used averaging the sensor value. A peak-to-peak window that spans N number of peaks may be used to select a sensor window provides comparable values between the signals from Sensor 1 and Sensor 2. In some embodiments, the value may be calculated more frequently than duration of the peak-to-peak time window. For example, the value may be calculated every M peaks using a window spanning N number of peaks, where N>M.

If the system moves to stage 1305, a control operation may be performed where the system sends a control signal to a corrective element of the conveyor belt system, such as a motorized adjustable bearing sub-assembly 1000 used to steer an adjustable bearing roller assembly, as described above. This control signal may be configured to result in the conveyor belt being moved in a first direction, in the direction of the intended path of the conveyor belt.

Data indicative of this offset may also be recorded in a database, to allow for further analysis. This analysis may be contemporaneous with the operation of the system, happening in real-time, or may be performed at a later point in time.

At stage 1306, a determination is made if the value of the signal from Sensor 2 is greater than the signal from Sensor 1. As discussed above, the value of the signal may be an average value of the signal from the sensors over a period of time, although other calculations may be used as well. This determination may be made periodically. In some embodiments, the determination at stage 1304 may be whether the value of the signal from Sensor 1 exceeds the value of the signal from Sensor 2 by a given threshold, or by a certain percentage.

If the system moves to stage 1305, a control operation may be performed where the system sends a control signal to a corrective element of the conveyor belt system, such as a motorized adjustable bearing sub-assembly 1000 used to steer an adjustable bearing roller assembly, as described above. This control signal may be configured to result in the conveyor belt being moved in a second direction, the opposite of the first direction, in the direction of the intended path of the conveyor belt.

If both the determinations at stage 1304 and 1306 are negative, this is indicative that the system is operating as intended, and the process may return to either stage 1304 or stage 1301, and continue to repeat. If corrections were made, the process may return to either stage 1304 or stage 1301, to determine whether further corrections to the path of the conveyor belt are required.

If, instead of operating in dual sensor mode, the system moves to stage 1308, a determination is made as to whether or not Sensor 1 is operational. If not, the control system moves to a stage 1314. If Sensor 1 is operational, the system moves to a stage 1309 where single mode operating using Sensor 1 begins. A notification may be generated that the system is operating in single mode operation.

From stage 1309 the process moves to stage 1310 where a determination is made as to whether the Sensor 1 value exceeds a set-point. This set-point may be a predetermined value, as discussed above. The value of the signal may be an average value of the signal from the sensors over a period of time, although other calculations may be used as well. This determination may be made periodically. In some embodiments, the determination at stage 1310 may be whether the value of the signal from Sensor 1 exceeds the value of the set-point by a given threshold, or by a certain percentage. If so, the process moves to a stage 1311 where a control operation may be performed where the system sends a control signal to a corrective element of the conveyor belt system, such as a motorized adjustable bearing sub-assembly used to steer an adjustable bearing roller assembly. This control signal may be configured to result in the conveyor belt being moved in the first direction, in the direction of the intended path of the conveyor belt.

If the Sensor 1 value does not exceed a set-point the process moves to stage 1312 where a determination is made as to whether the Sensor 1 value is below the set-point. In some embodiments, the determination at stage 1312 may be whether the value of the signal from Sensor 1 exceeds the value of the set-point by a given threshold, or by a certain percentage. If so, the process moves to a stage 1313 where a control operation may be performed where the system sends a control signal to a corrective element of the conveyor belt system, such as a motorized adjustable bearing sub-assembly used to steer an adjustable bearing roller assembly. This control signal may be configured to result in the conveyor belt being moved in the second direction, in the direction of the intended path of the conveyor belt.

If the system moves to a stage 1314, a determination is made as to whether or not Sensor 1 is operational. If not, the control system may move to a fault stage 1314, as neither of Sensor 1 nor sensor 2 may be operational. A fault notification may be generated.

If Sensor 2 is operational, the system moves to a stage 1316 where single mode operating using Sensor 2 begins. A notification may be generated that the system is operating in single mode operation. Operation of the system in single sensor mode using Sensor 2 may be similar to that discussed with respect to single sensor mode using Sensor 1, except that the directions in which the correction is made may be switched due to Sensor 2 being on the opposite side of the conveyor belt.

Figure 14A:
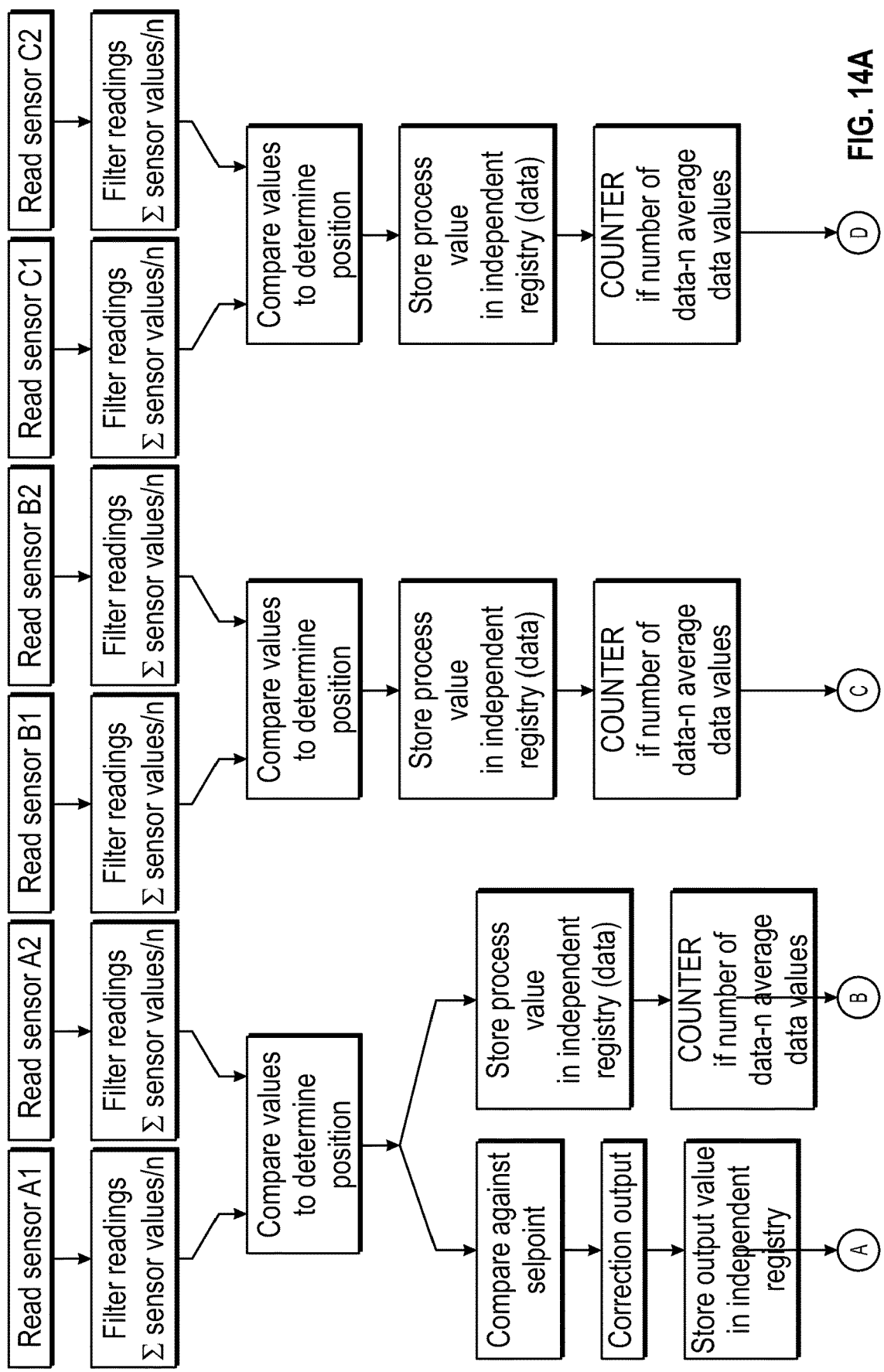
FIG. 14A illustrates a basic flowchart for a diagnostic system for analyzing output from a sensor system including a plurality of ultrasonic transducer sensor pairs as discussed herein.

FIG. 14A illustrates a basic flowchart for a diagnostic system for analyzing output from a sensor system including a plurality of ultrasonic transducer sensor pairs as discussed herein. The filter from each of the individual sensors may be summed and averaged. In addition, a filter may be applied to the sensor output. The values from each sensor may be compared to the values from the other sensor in the pair to determine the position of the conveyor belt at the location of the belt at which the sensor pair is targeted. When the sensor pairs are oriented at an oblique angle, the target location of the sensor pairs may be longitudinally offset from the physical location of the sensor pairs.

In addition, the values from at least one of the sensors may be compared against a setpoint if operating in a single sensor mode. Alternatively, such a comparison may be done with in addition to operating in dual sensor mode as confirmation of the setpoint value when operating within the desired parameters. This represents an absolute measurement, rather than a comparison to a setpoint, or other monitoring of the actual value of the measurements. In comparison to simply comparing the measured values on each side, the use of an absolute measurement of some type may also serve to identify overall changes in the width of the belt in addition to shifting of the belt from one side to the other. Simply monitoring the difference between the values on one side to the other side would not identify narrowing of the belt width over time if the narrowed belt width remained centered on the desired travel path.

Data regarding these measurements and comparisons may be stored, including but not limited to the raw measurements, filtered measurements, average values, and the calculated difference between the measurement of the sensors in each pair. This data may be stored in one or more independent registries. In addition, one or more counters can be used to track information such as the number of data measurements. These counters can be used, for example, to trigger the calculation of average data values when the counter reaches a particular value. This data storage is depicted in greater detail in FIG. 14B, which illustrates a basic flowchart for data supply and storage in a sensor system including a plurality of ultrasonic transducer sensor pairs.

In addition to comparing the data from the individual sensor pairs to determine position at the location of the sensor pairs, the data from the various sensor pairs may be compared to date from the other sensor pairs to provide an indication of the overall track of the belt. This comparison can be used to identify localized bias within specific zones. For example, if the average of sensor A is less than the average of sensor B minus the deadband, the system may send a message indicating that there is an issue within zone between sensor A and sensor B resulting in the belt being shifted to the left. The various comparisons are set forth in the box labeled "Diagnostic OP 1" of FIG. 14A.

If none of the comparisons listed in the box labeled "Diagnostic OP 1" return a positive result, but the average value of the sensors is non-zero or outside of a predetermined range, the sign of the average values will provide an indication of an overall bias in the belt to one side or another, as illustrated in the box labeled "Diagnostic OP 2" of FIG. 14A.

Figure 14B:
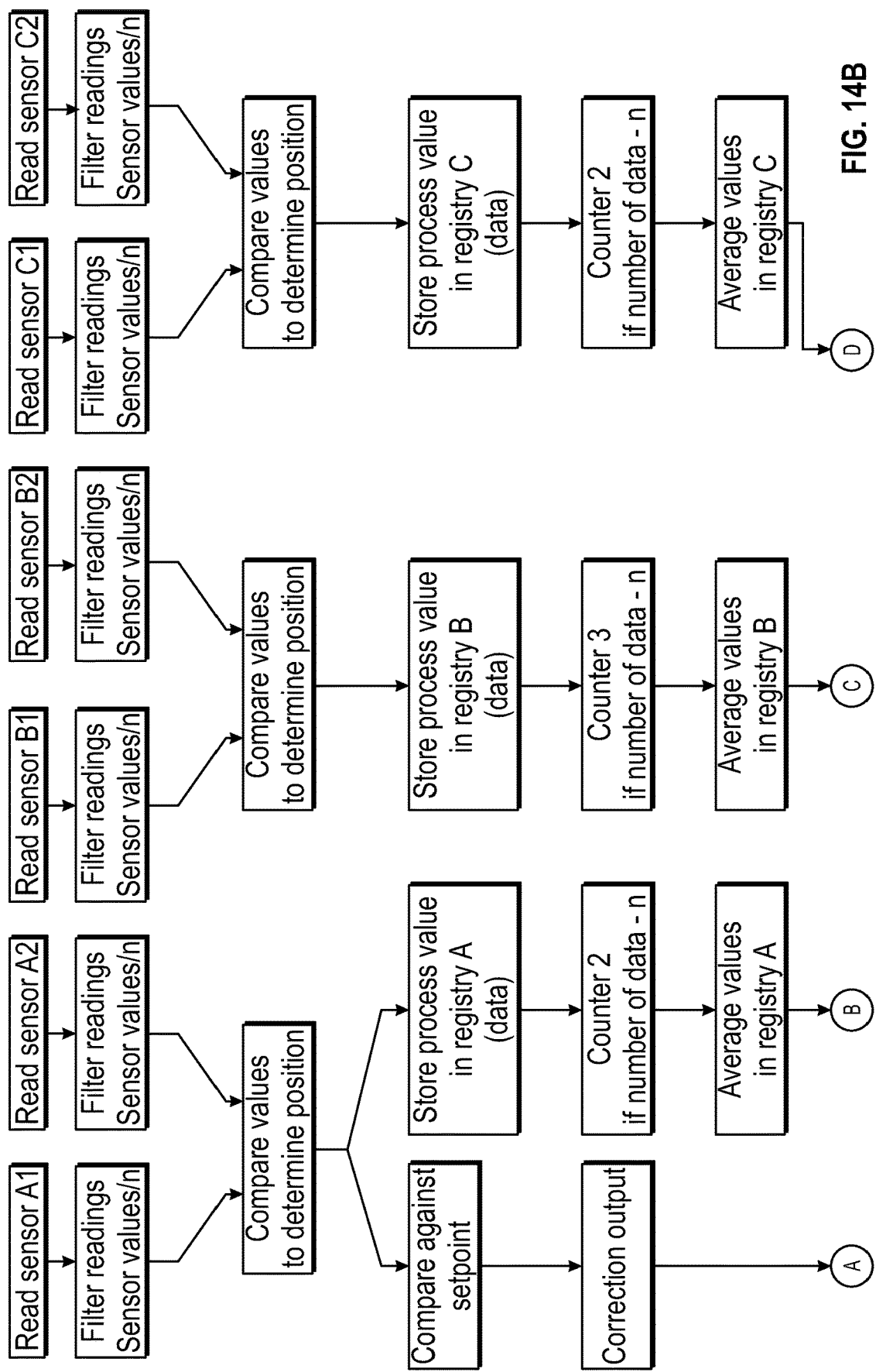
FIG. 14B illustrates a basic flowchart for data supply and storage in a sensor system including a plurality of ultrasonic transducer sensor pairs.
Figure 14B:
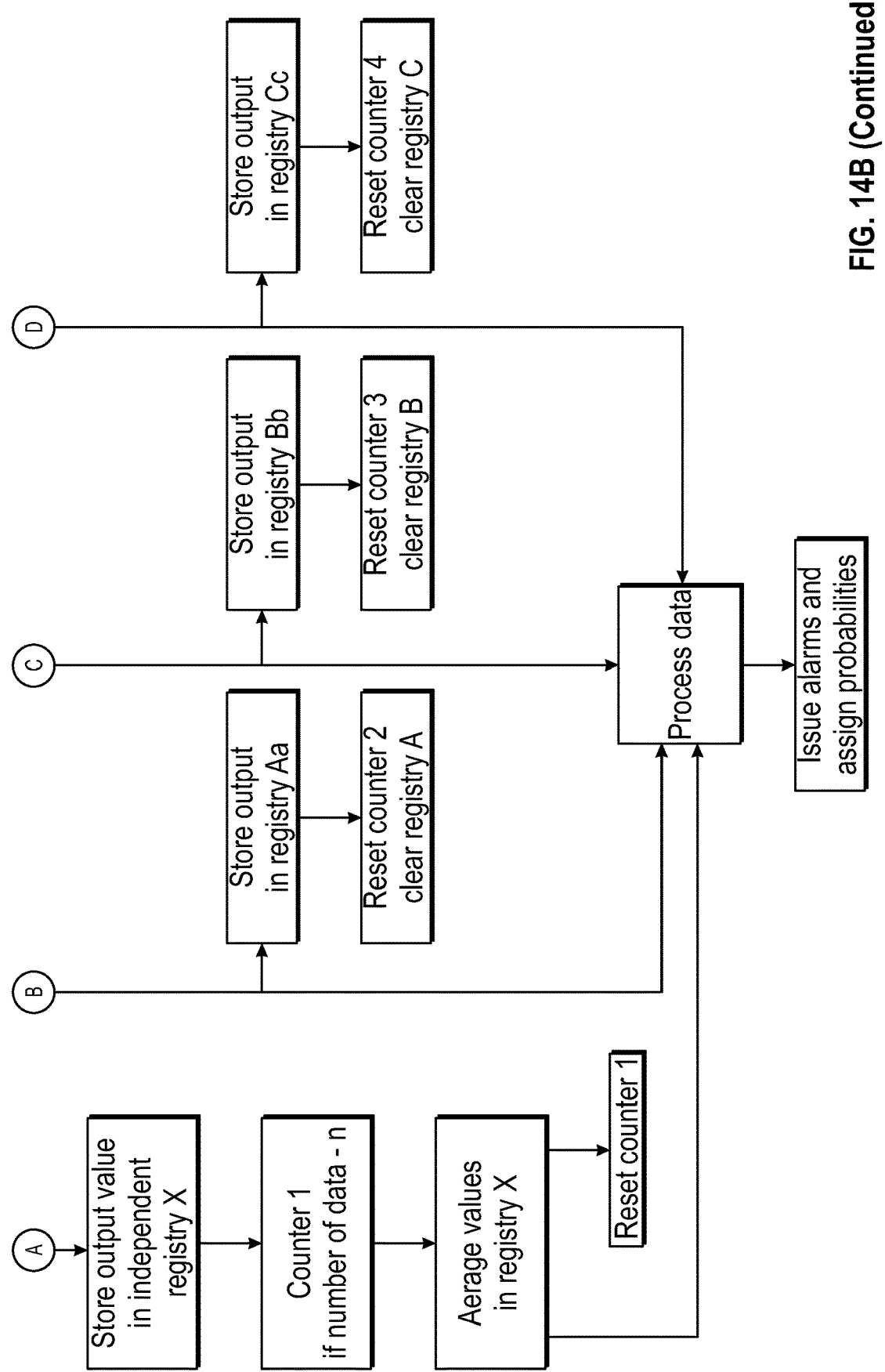

In addition, FIG. 14B illustrates the processing of the measurement and comparison data generated by the control system. Based on the result of this processing, alarms or other notifications related to the state of the conveyor belt system and the operation of the system can be generated. In addition, the data can be analyzed for trends.

Figure 15A:
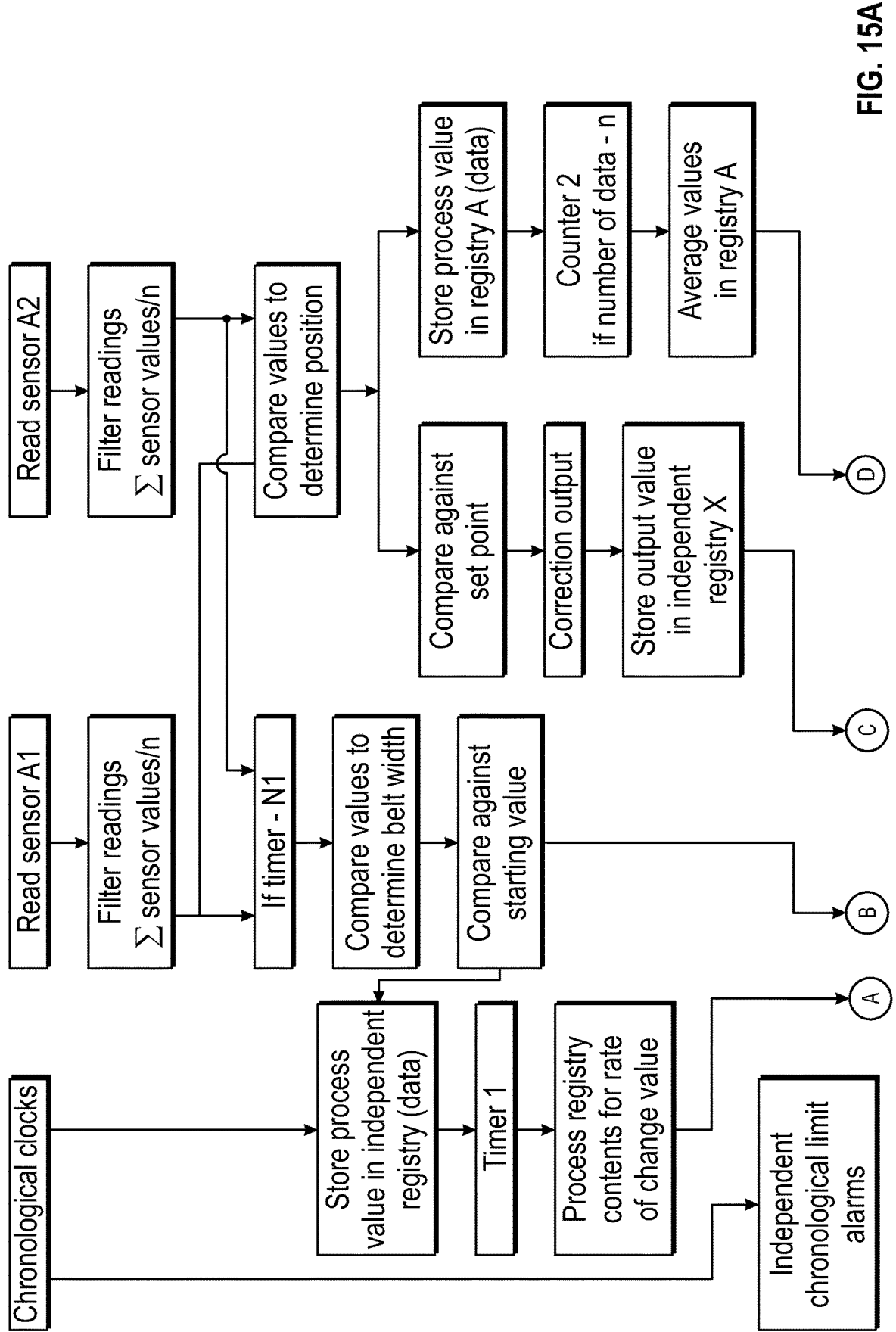
FIGS. 15A, 15B, and 15C illustrate an expanded flow chart for data supply and storage in a sensor system including a plurality of ultrasonic transducer sensor pairs.
Figure 15B:
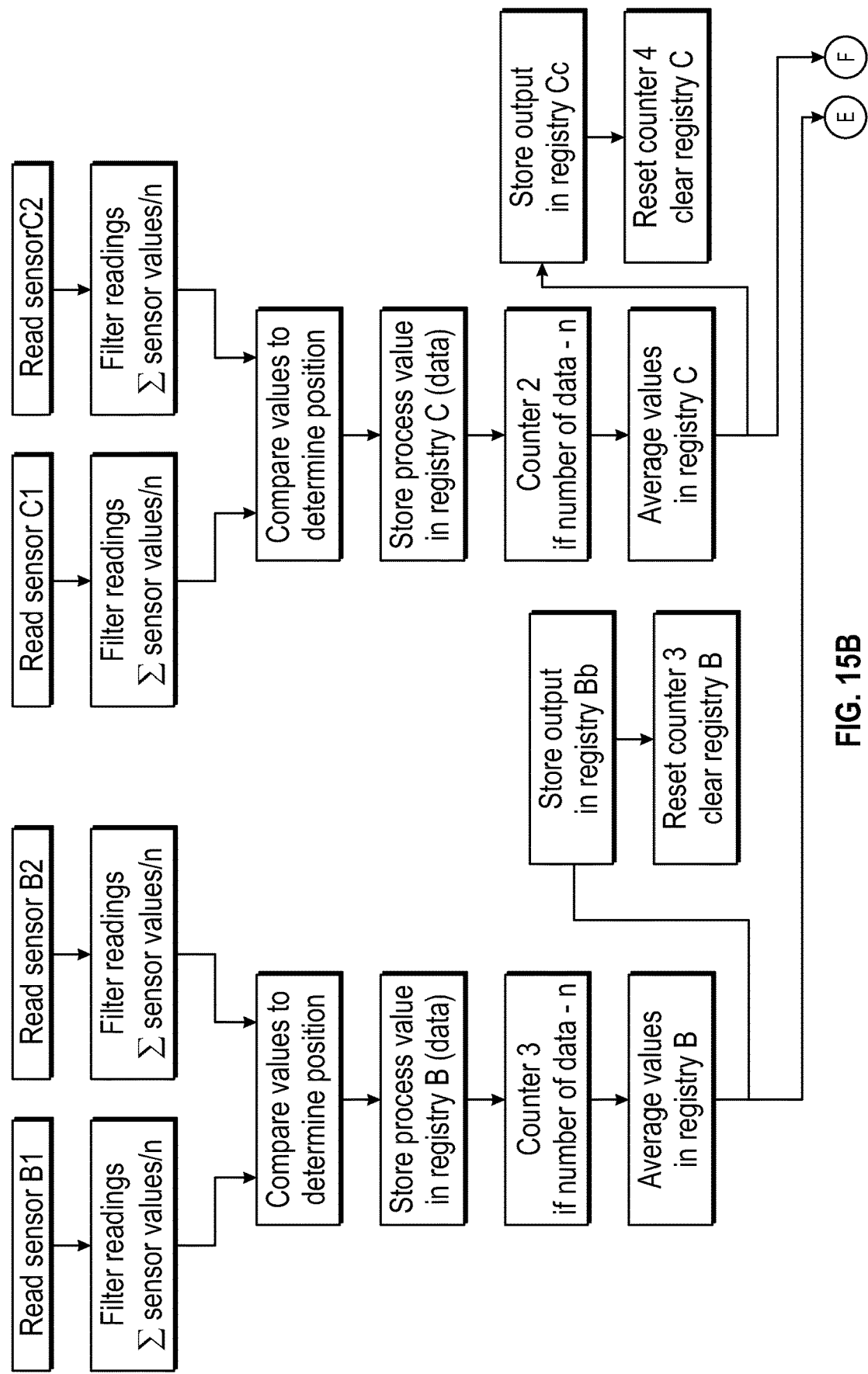
Figure 15C:
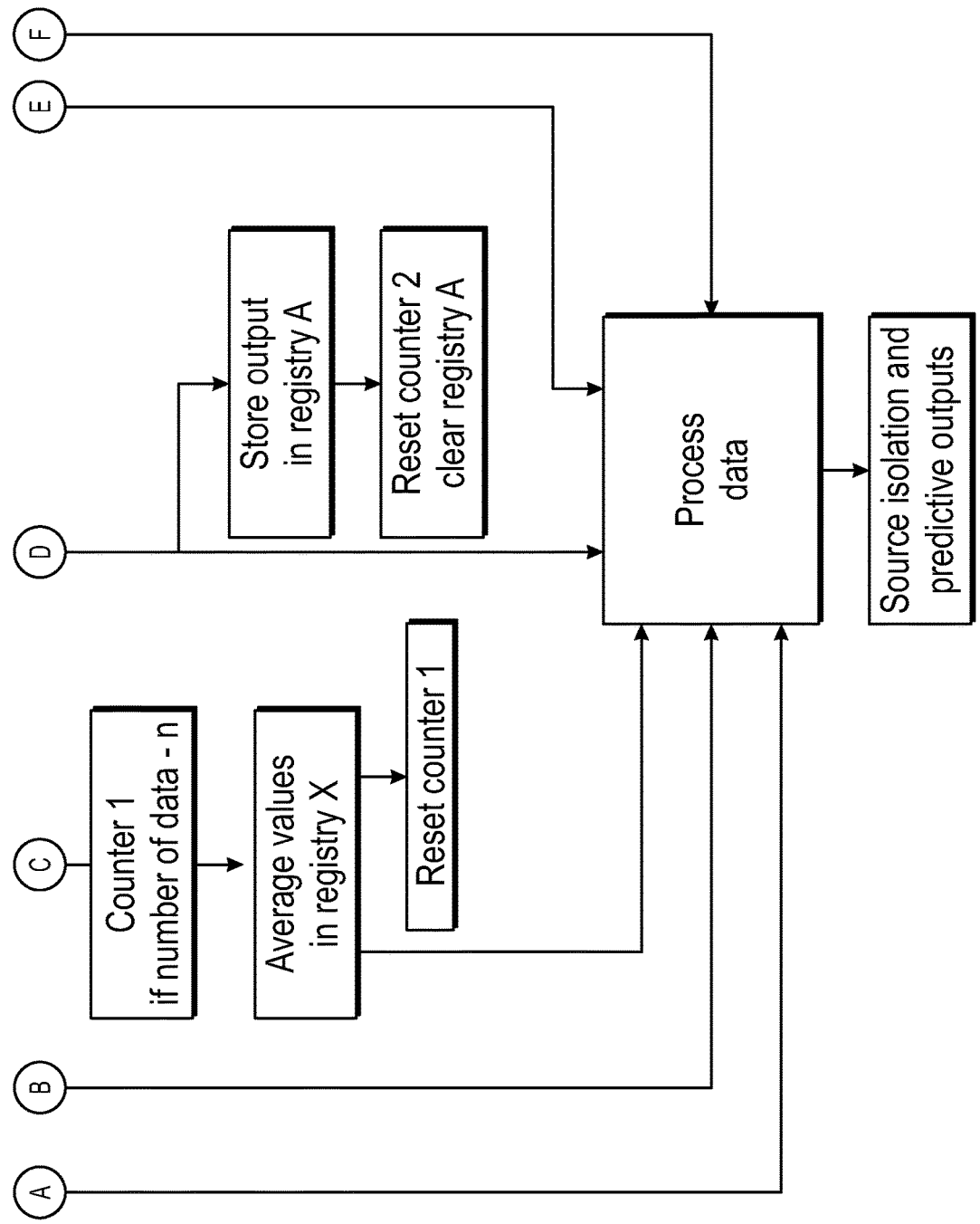

FIG. 15 is an expanded flow chart for data supply and storage in a sensor system including a plurality of ultrasonic transducer sensor pairs. In addition to the data flow and storage illustrated in FIG. 14B, the flow chart of FIGS. 15A through 15C also illustrate the determination of belt width, and the comparison of belt width to the starting value and tracking of the rate of change.

As discussed above, the measurement and comparison data can be correlated with information relating to the usage of the belt system at the time the measurement and comparison data was acquired, and trends identified regarding the possible causes of variances in operation. Probabilities may be assigned as to the likelihood of mechanical issues, loading issues, or other issues which can alter the performance of the conveyor belt system. Adjustments can be made to the operation of the conveyor belt itself, as well as to associated processes, such as the loading of the belt. Because of the accurate and continuous monitoring enabled by embodiments of such systems, earlier and more accurate diagnoses of potential issues can be made, and real-time corrections can be made to the operation of the belt system, improving the operation of the system and extending the lifetime of the various components.

While operations are depicted in the flow charts in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow chart. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described components and systems can generally be integrated together in a single system or software product or packaged into multiple systems or software products.

Figure 16A:
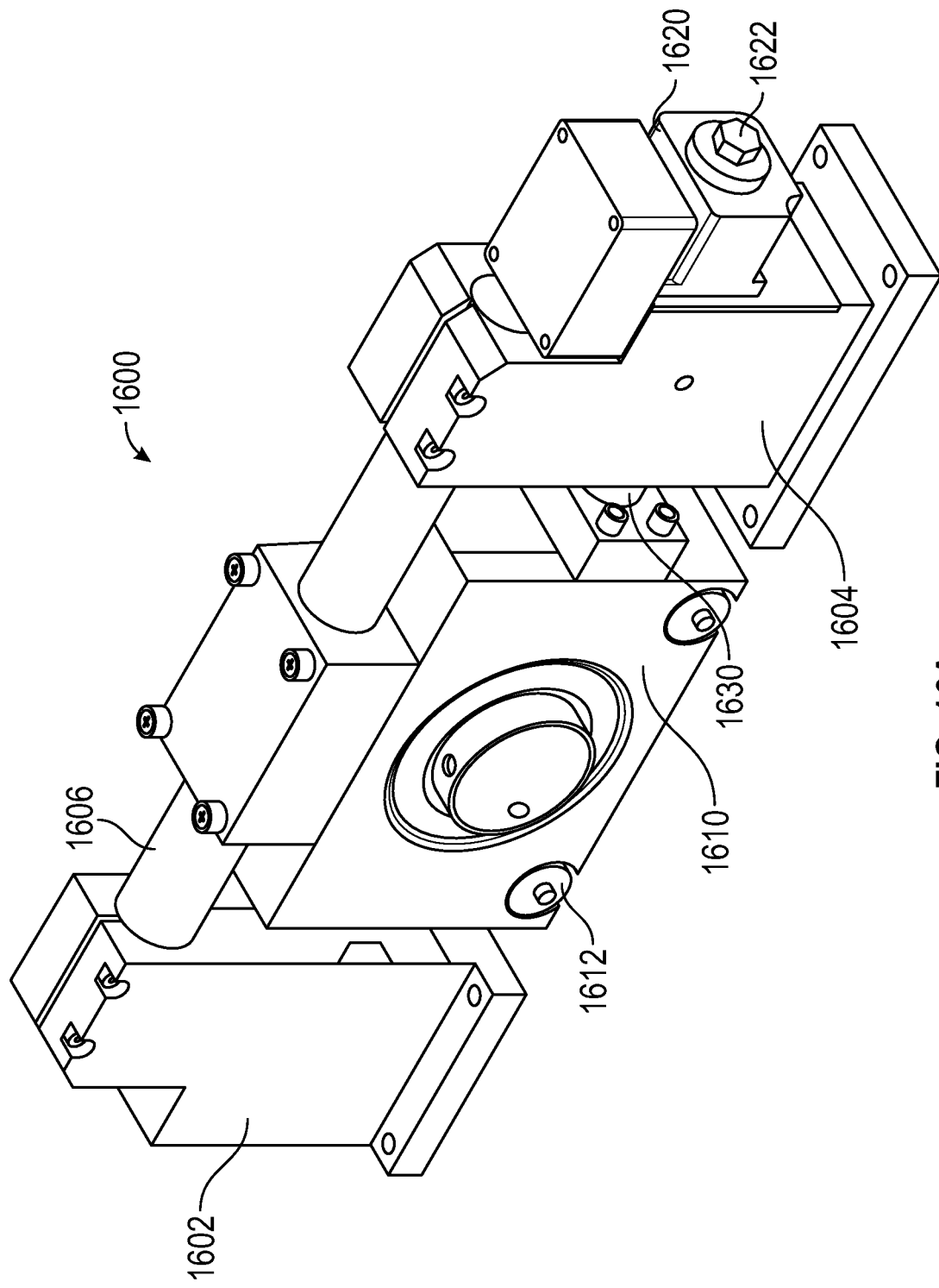
FIG. 16A is a perspective view of a screw-actuated bearing assembly.

FIG. 16A is a perspective view of a screw-actuated bearing assembly. The screw-actuated bearing assembly 1600 may be used, in some embodiments, in heavier-duty applications than those used for eccentric cam actuated bearing assemblies of the type described herein. However, embodiments of screw-actuated or piston-actuated bearing assemblies are not limited to such heavy-duty applications, and eccentric cam actuated bearing assemblies may be designed to be sufficiently robust to handle such applications.

The screw-actuated bearing assembly 1600 is secured in place at both sides. On one side, an anchor 1602 can be bolted or otherwise secured to an underlying structure. On the other, a power housing 1604 can similarly be secured to an underlying structure, and can include a motor 1620. The motor 1620 may include a manual override button 1622.

A stabilizer rail 1606 extends between the anchor 1602 and the power housing 1604, and slidably supports bearing housing 1610. The bearing housing 1610 can also be slidably supported on an underlying structure by a plurality of bearing truck wheels 1612. The bearing housing 1610 can support one end of a bearing roller (not shown), and the position of the bearing housing 1610 along the stabilizer rail 1606 can be controlled by a lead screw 1630 connected to the power housing 1604.

Control of the motor 1620 and the lead screw 1630 can be performed in conjunction with sensors and controllers located elsewhere, as described herein. In other embodiments, structures such as pistons or other linear actuators can be used in place of the lead screw 1630 to control the position of the bearing housing 1610.

The screw-actuated bearing assembly 1600 can be used in place of an existing bearing assembly in an existing conveyor belt system. For example, the screw-actuated bearing assembly 1600 can be used to replace an existing bearing support, to retrofit an existing conveyor belt system with the ability to continually adjust the belt location. In some embodiments, the screw-actuated bearing assembly 1600 may replace a bearing supporting a return roller of a conveyor belt system. In some embodiments, the screw-actuated bearing assembly may be installed in a portion of a conveyor belt in which the conditions to which the bearing assembly 1600 are unsuitable for additional components, such as ultrasonic position sensors. Such less robust components of a belt position control system may be located elsewhere along the conveyor belt.

Figure 16B:
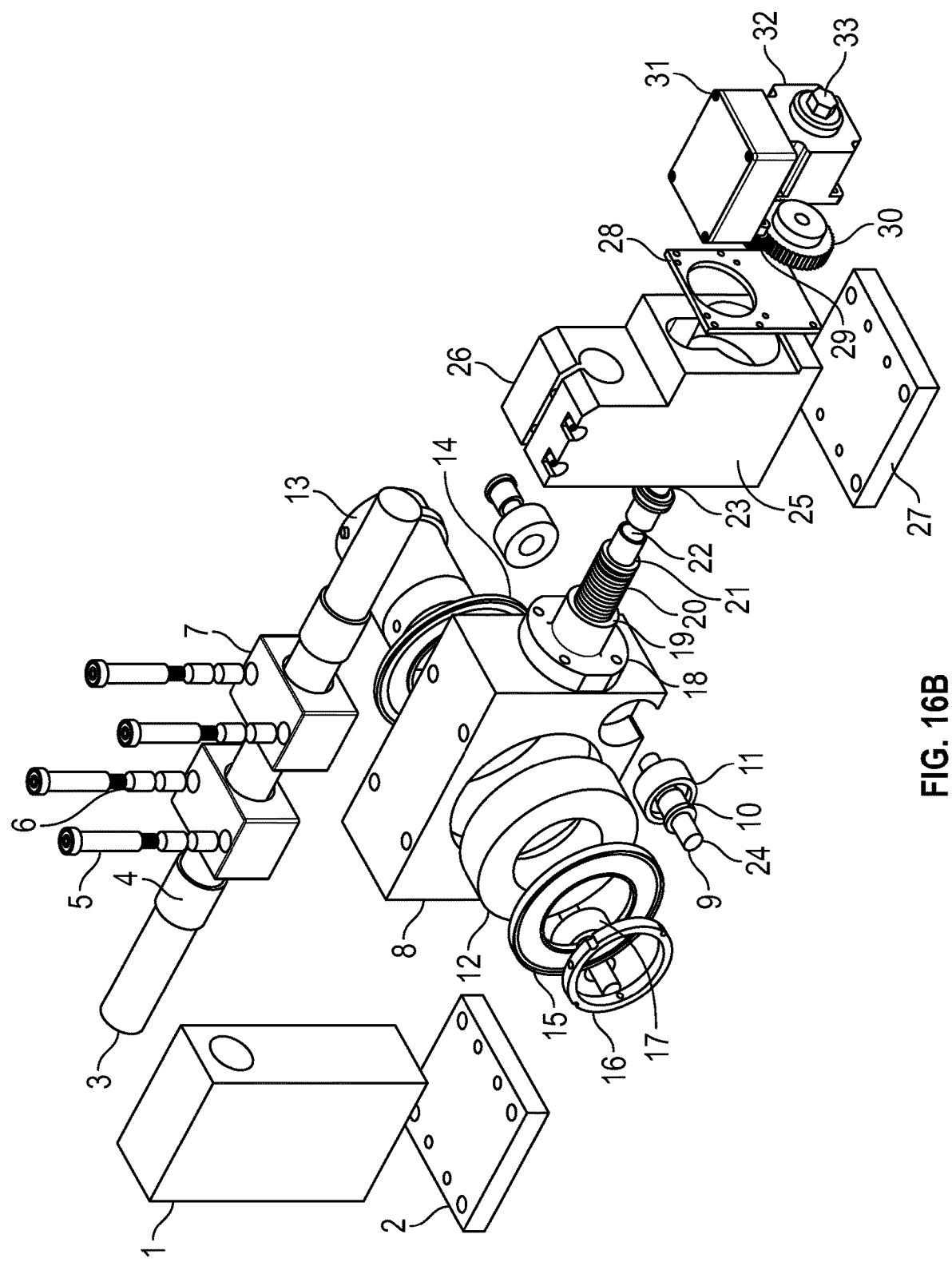
FIG. 16B is an exploded perspective view of a screw-actuated bearing assembly such as the screw-actuated bearing assembly of FIG. 16A.

FIG. 16B is an exploded perspective view of a screw-actuated bearing assembly such as the screw-actuated bearing assembly of FIG. 16A, illustrating exemplary components which can be used in a particular embodiment of a screw-actuated bearing assembly. However, these components are merely exemplary, and any other suitable components of any suitable dimension may also be used in other embodiments.

Figure 17A:
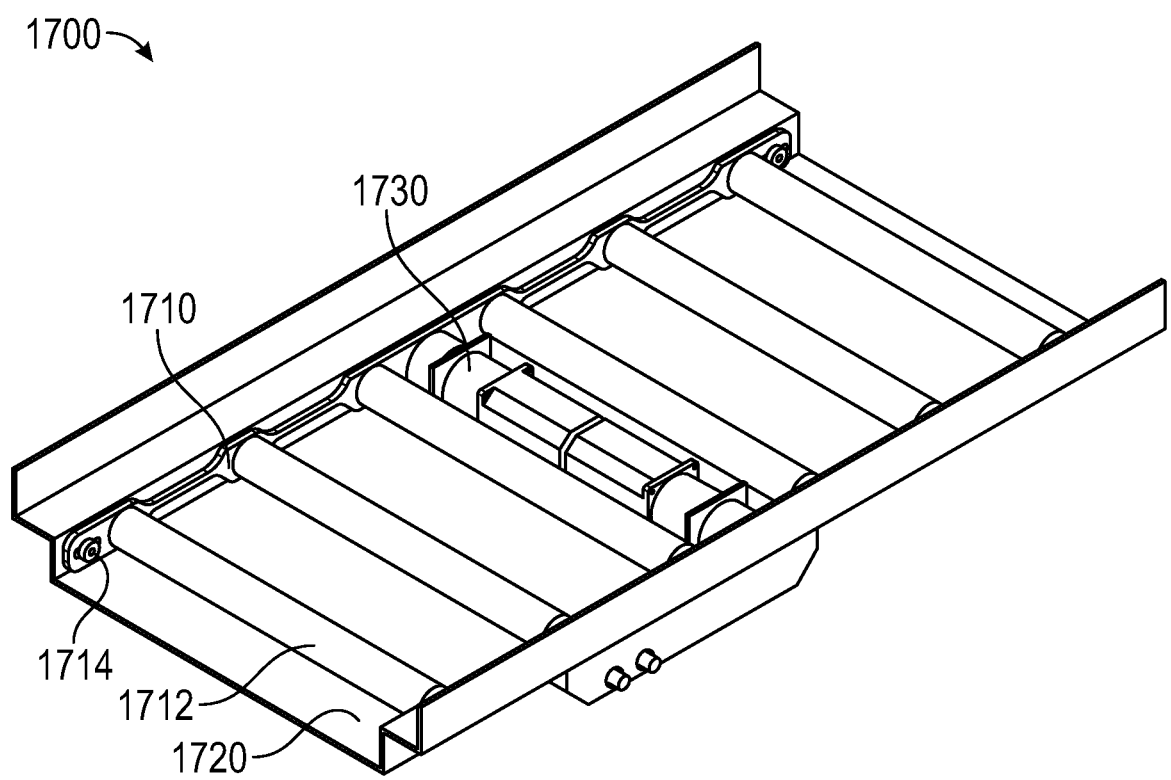
FIG. 17A is a perspective view of a tiltable tray assembly for control and adjustment of a conveyor belt.
Figure 17B:
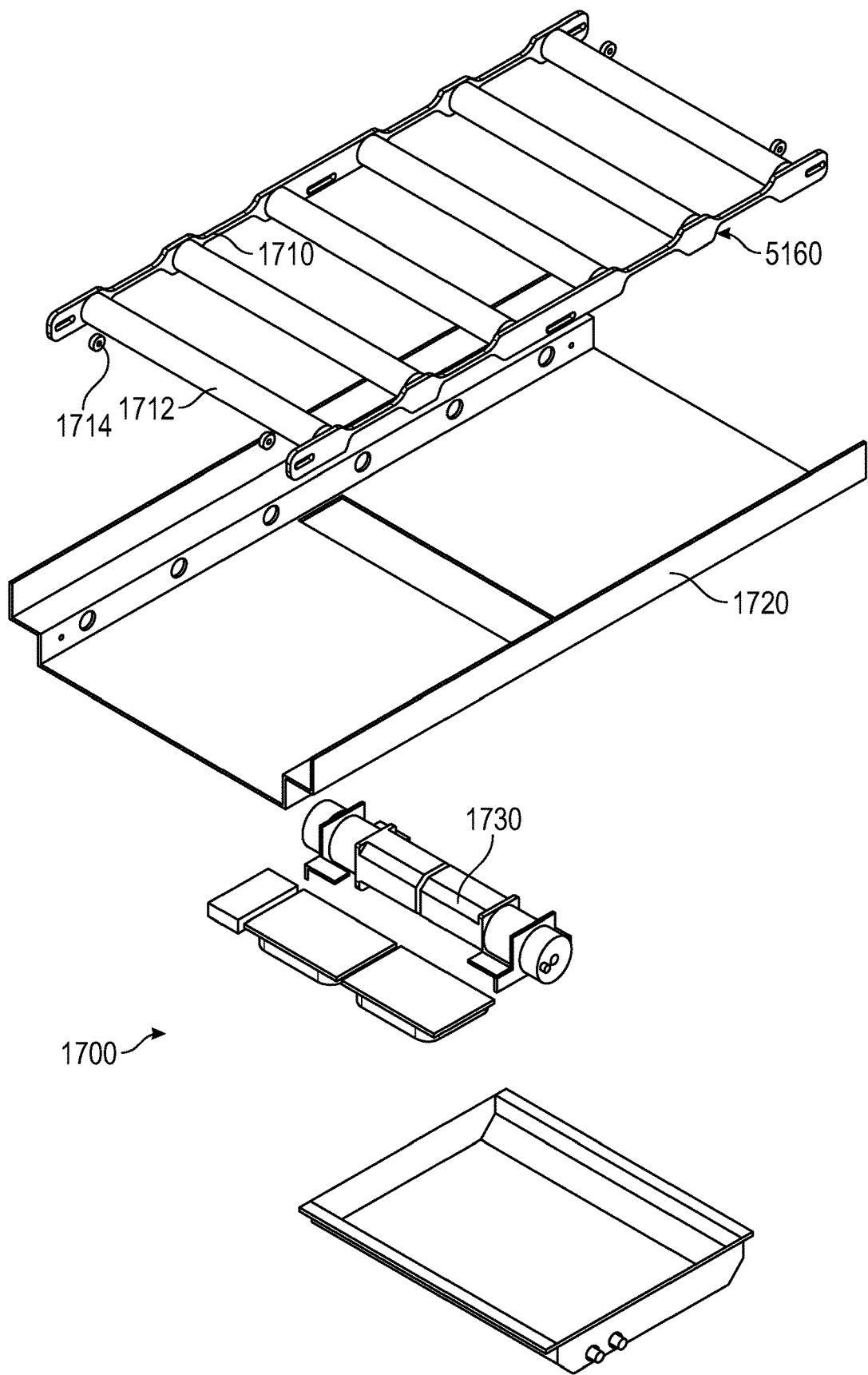
FIG. 17B is an exploded assembly view of the tiltable tray assembly of FIG. 17A.

FIG. 17A is a perspective view of a tiltable tray assembly for control and adjustment of a conveyor belt. FIG. 17B is an exploded assembly view of the tiltable tray assembly of FIG. 17A. The tiltable tray assembly 1700 includes a tray 1720 to which a roller carriage 1710 including a plurality of rollers 1712 is attached. The roller carriage 1710 can be bolted to the underlying tray 1720 using a plurality of bolts 1714, one near each corner of the tray.

An eccentric cam mechanism 1730 having an eccentric cam at one end can be used to control the tilt of the tray 1720 supported thereon. The cams of the cam mechanism 1730 can be inserted into slots near the center of either side of the tray 1720, so that rotation of the eccentric cam results in tilting of the assembly 1700, which in turn results in the tilting of the belt supported thereon.

The tiltable tray assembly 1700 can replace an existing roller structure in a conveyor belt system. In some embodiments, the tiltable tray assembly 1700 can replace the return roller assembly of a conveyor belt system, providing a turnkey solution for precise control of a conveyor belt. The tiltable tray assembly need not contain sensors, but can in some embodiments be controlled in conjunction with sensors such as ultrasonic sensors or other suitable sensors to determine whether correction of the belt position is necessary, as well as the amount and direction of such correction. In some embodiments, actuation of the tiltable tray assembly 1700 can move the belt parabolically towards either side of the tiltable tray assembly.

Figure 18:
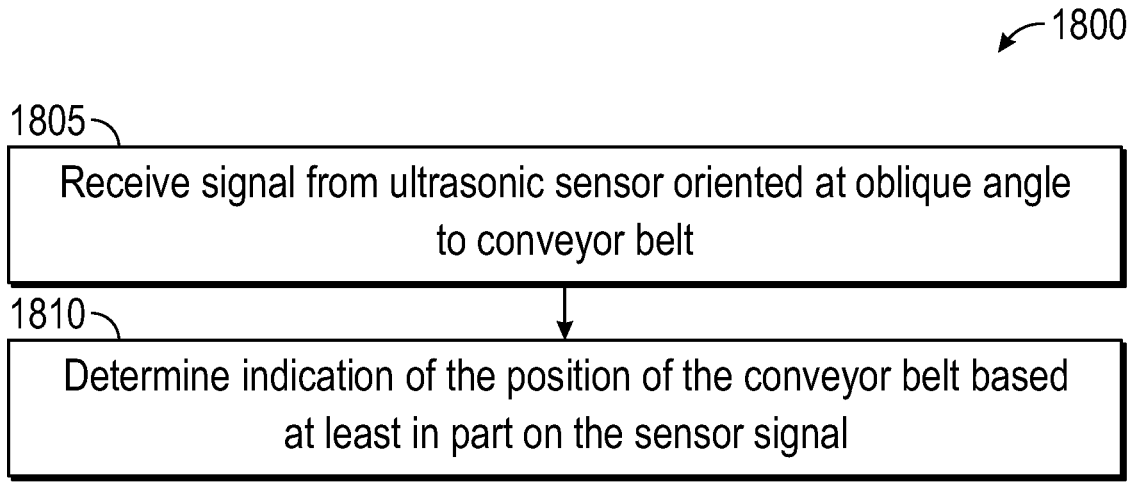
FIG. 18 illustrates a flowchart for determining a position of a conveyor belt using at least one ultrasonic sensor.

FIG. 18 illustrates a flowchart for determining a position of a conveyor belt using at least one ultrasonic sensor. The process 1800 begins at a stage 1805 where an output signal is received from an ultrasonic sensor directed at a conveyor belt. This ultrasonic sensor can be oriented at an oblique angle to the conveyor belt. In some embodiments, the output signal can take the form of a waveform varying between a low output, such as a null output when little or no ultrasonic energy is reflected back at the sensor, and a high output when ultrasonic energy is reflected back at the sensor. The magnitude of the high output value may be indicative of the distance between the conveyor belt and the sensor. Depending on the sampling speed and the construction of the conveyor belt, this waveform may be a square waveform.

The process 1800 then moves to a stage 1810 where an indication of the conveyor belt is determined based at least in part on the output signal from the sensor. The manner in which this indication is determined may vary depending on the number and position of the sensors. In some embodiments, the system may be operating in a Single Sensor Mode as described above. In such an embodiment, the mean value of the sensor output signal may be compared to a predetermined setpoint. If the difference between the mean value of the sensor output signal and the predetermined setpoint is a non-zero differential, the value and magnitude of the differential is indicative of the direction and amount of mistracking in the conveyor belt. This non-zero differential can be used to determine the position of the conveyor belt, or may be used directly or in a modified form in a feedback control system to redirect the conveyor belt to its intended position. In other embodiments, the system may be operating in a Dual Sensor Mode as described with respect to FIG. 19.

Figure 19:
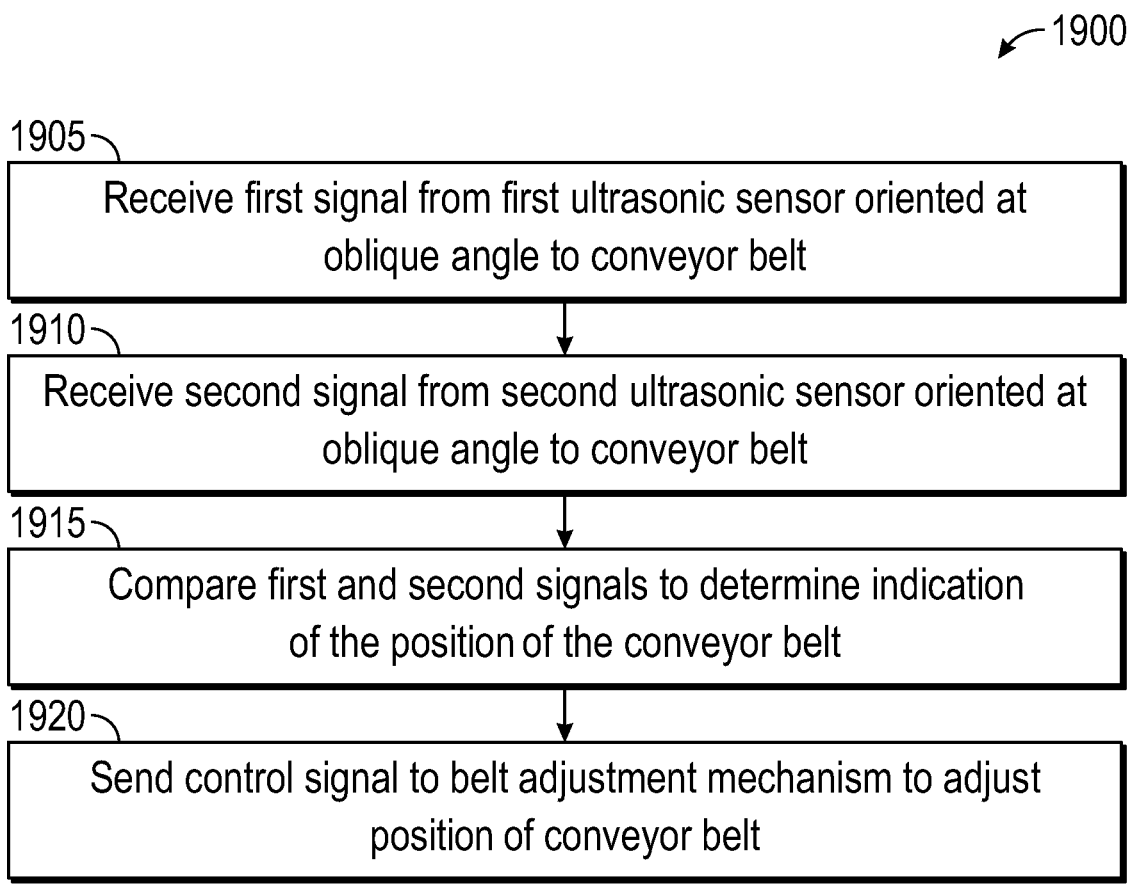
FIG. 19 illustrates a flowchart for controlling a positional correction mechanism of a conveyor belt using at least one pair of ultrasonic sensors.

FIG. 19 illustrates a flowchart for controlling a positional correction mechanism of a conveyor belt using at least one pair of ultrasonic sensors.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while certain components are presented in a given arrangement, alternative embodiments may perform similar functionalities with different components and/or topologies. Each of these components may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A monitored conveyor belt system, comprising:
a balance-weave conveyor belt comprising a first plurality of wire spirals wound in a first direction alternating along the length of the belt with a second plurality of wire spirals wound in a second direction;
an ultrasonic sensor positioned adjacent a lateral edge of the belt at an oblique angle to the lateral edge of the belt, the ultrasonic sensor configured to:
emit ultrasonic energy towards the lateral edge of the belt,
sense reflected ultrasonic energy reflected by the lateral edges of the first and second plurality of wire spirals, and
generate a first output signal indicative of the reflected ultrasonic energy sensed by the ultrasonic sensor; and
a belt adjustment mechanism operably coupled to the belt and configured to alter a path of the belt based at least in part on the first output signal generated by the ultrasonic sensor.

2. The system of claim 1, further comprising a controller in communication with the ultrasonic sensor and the belt adjustment mechanism, the controller configured to receive the first output signal generated by the ultrasonic sensor and send a control signal to the belt adjustment mechanism.

3. The system of claim 2, wherein the controller is configured to determine a position of the belt based at least in part on the first output signal.

4. The system of claim 3, wherein the controller is configured to determine a position of the belt based on a comparison between the first output signal and a second output signal generated by a second ultrasonic sensor positioned adjacent the other lateral edge of the belt at a location opposite the first ultrasonic sensor.

5. The system of claim 3, wherein the controller is configured to determine a position of the belt based on a comparison between the first output signal and a predetermined setpoint.

6. The system of claim 1, further comprising a second ultrasonic sensor positioned adjacent the other lateral edge of the belt at a location opposite the first ultrasonic sensor, the second ultrasonic sensor configured to:
emit ultrasonic energy towards the other lateral edge of the belt,
sense reflected ultrasonic energy reflected by the lateral edges of the first and second plurality of wire spirals, and
generate a second output signal indicative of the reflected ultrasonic energy sensed by the second ultrasonic sensor.

7. The system of claim 6, wherein the first ultrasonic sensor is oriented at a first oblique angle to the lateral edges of the belt, and wherein the second ultrasonic sensor is oriented at a second oblique angle to the lateral edges of the belt, the absolute values of the first and second oblique angles being equal.

8. The system of claim 1, wherein the first ultrasonic sensor is oriented at an angle substantially perpendicular to wire edges of the first plurality of wire spirals.

9. The system of claim 1, wherein the first ultrasonic sensor includes at least one field restrictor shield configured to constrain the field of ultrasonic energy emitted towards the lateral edge of the belt.

10. A control system configured to monitor the position of a balance-weave conveyor belt, the control system comprising a processor and a memory, the control system configured to:
receive a first sensor signal from an ultrasonic sensor positioned adjacent a lateral edge of the belt and oriented at an oblique angle to the lateral edge of the belt, the ultrasonic sensor configured to emit ultrasonic energy towards the lateral edge of the balance-weave conveyor belt, sense reflected ultrasonic energy, and generate the first sensor signal indicative of the reflected ultrasonic energy sensed by the ultrasonic sensor; and
determine, based at least in part on the first sensor signal, an indication of the position of the conveyor belt.

11. The control system of claim 10, wherein the control system is further configured to send a control signal to a belt adjustment mechanism operably coupled to the belt and configured to alter a path of the belt, wherein the control signal is configured to result in the belt adjustment mechanism redirecting the path of the belt towards a desired path of the belt.

12. The control system of claim 10, wherein the control system is further configured to receive a second sensor signal from an ultrasonic sensor positioned adjacent the other lateral edge of the belt at a location opposite the first ultrasonic sensor and configured to emit ultrasonic energy towards the opposite lateral edge of the belt, sense reflected ultrasonic energy, and generate the second sensor signal indicative of the reflected ultrasonic energy sensed by the ultrasonic sensor, and wherein the control system is configured to determine the indication of the position of the belt based on a comparison between the first sensor signal and the second sensor signal generated by a second ultrasonic sensor positioned adjacent the other lateral edge of the belt at a location opposite the first ultrasonic sensor.

13. The control system of claim 10, wherein the control system is configured to determine the indication of the position of the belt based on a comparison between the first sensor signal and a predetermined setpoint.

14. The control system of claim 10, wherein the control system is further configured to determine an indication of the belt width based at least on part on the first sensor signal.

15. The control system of claim 11, wherein the control system is configured to receive sensor signals from each of a plurality of ultrasonic sensors positioned at a plurality of locations adjacent the lateral edges of the belt, wherein the control system is configured to determine an indication of the position of the conveyor belt at each of a plurality of locations, based at least in part on the sensor signals from each of the plurality of ultrasonic sensors.

16. The control system of claim 10, wherein the control system is further configured to store measurement data from the plurality of ultrasonic sensors and to analyze the stored measurement data to identify potential causes of performance issues of a conveyor belt system including the belt.

17. A conveyor belt adjustment mechanism, comprising:
a driving surface configured to contact a balance-weave conveyor belt; and
an adjustment mechanism configured to, in response to a control signal, alter an orientation of the driving surface to adjust a path of the balance-weave conveyor belt in contact with the driving surface, wherein at least one of:
the conveyor belt adjustment mechanism comprises an adjustable bearing roller, the driving surface is a surface of the adjustable bearing roller, and the adjustment mechanism comprises an eccentric cam connected to a camshaft of a motor at a point radially offset from the center of the eccentric cam;
the adjustment mechanism comprises a lead screw operably coupled to a bearing housing supported by a stabilizing rail, the lead screw controllable to control a longitudinal position of the bearing housing along the rail; or
the adjustment mechanism comprises an eccentric cam support operably coupled to a tiltable tray, wherein a position of an eccentric cam in the eccentric cam support can be varied to control a tilt of the tiltable tray, and the tray supports a plurality of rollers.

18. The conveyor belt adjustment mechanism of claim 17, wherein the conveyor belt adjustment mechanism comprises an adjustable bearing roller, wherein the driving surface is a surface of the adjustable bearing roller, and wherein the adjustment mechanism comprises an eccentric cam connected to a camshaft of a motor at a point radially offset from the center of the eccentric cam.

19. The conveyor belt adjustment mechanism of claim 18, wherein the eccentric cam is seated within an obround aperture in an eccentric socket.

20. The conveyor belt adjustment mechanism of claim 18, wherein the adjustment mechanism is configured to alter the orientation of a rotational axis of the adjustable bearing roller by canting the rotational axis of the adjustable bearing roller downward in the direction of a desired correction to the path of the balance-weave conveyor belt in contact with the driving surface.

21. The conveyor belt adjustment mechanism of claim 17, wherein the conveyor belt adjustment mechanism is supported on one side of the driving surface by a fixed support and on the other side of the driving surface by a movable support, wherein the conveyor belt adjustment mechanism is configured to alter the position of the movable support based at least in part on the control signal.

22. The conveyor belt adjustment mechanism of claim 17, wherein the adjustment mechanism comprises a lead screw operably coupled to a bearing housing supported by a stabilizing rail, the lead screw controllable to control a longitudinal position of the bearing housing along the rail.

23. The conveyor belt adjustment mechanism of claim 17, wherein the adjustment mechanism comprises an eccentric cam support operably coupled to a tiltable tray, wherein a position of an eccentric cam in the eccentric cam support can be varied to control a tilt of the tiltable tray, and wherein the tray supports a plurality of rollers.

24. The conveyor belt adjustment mechanism of claim 17, further comprising a controller in electrical communication with the belt adjustment mechanism, the controller configured to:
receive a sensor output signal indicative of reflected ultrasonic energy indicative of the position of the balance-weave conveyor belt, and
send the control signal to the belt adjustment mechanism.

* * * * *